United States Patent
Bowman et al.

(10) Patent No.: US 7,669,183 B2
(45) Date of Patent: Feb. 23, 2010

(54) SYSTEM AND METHOD FOR MANIPULATING A DOCUMENT OBJECT MODEL

(75) Inventors: Gordon Bowman, Kemptville (CA); Peter Barrett, Ottawa (CA)

(73) Assignee: Corel Corporation (CA)

( * ) Notice: Subject to any disclaimer, the term of this patent is extended or adjusted under 35 U.S.C. 154(b) by 889 days.

(21) Appl. No.: 10/678,846

(22) Filed: Oct. 3, 2003

(65) Prior Publication Data
US 2005/0022116 A1 Jan. 27, 2005

(30) Foreign Application Priority Data
Dec. 9, 2002 (CA) .................................. 2414053

(51) Int. Cl.
*G06F 9/44* (2006.01)
*G06F 3/00* (2006.01)
(52) U.S. Cl. ...................... 717/113; 717/109; 717/115; 715/744; 715/760
(58) Field of Classification Search ................. 717/109, 717/113, 115; 715/744, 760, 762
See application file for complete search history.

(56) References Cited

U.S. PATENT DOCUMENTS

| | | | | |
|---|---|---|---|---|
| 5,914,714 | A | 6/1999 | Brown ......................... | 345/339 |
| 6,101,510 | A | 8/2000 | Stone et al. .................. | 707/513 |
| 6,188,401 | B1 | 2/2001 | Peyer ......................... | 345/335 |
| 6,266,681 | B1 | 7/2001 | Guthrie ....................... | 707/501 |
| 6,418,446 | B1 | 7/2002 | Lection et al. ............... | 707/103 |
| 6,446,256 | B1 | 9/2002 | Hyman et al. ................ | 717/143 |
| 6,484,149 | B1 | 11/2002 | Jammes et al. ................ | 705/26 |
| 6,493,733 | B1 | 12/2002 | Pollack et al. ............... | 707/513 |
| 6,504,554 | B1 * | 1/2003 | Stone et al. .................. | 715/760 |
| 6,732,330 | B1 * | 5/2004 | Claussen et al. ............. | 715/513 |
| 6,973,625 | B1 * | 12/2005 | Lupo et al. ................... | 715/762 |
| 6,981,211 | B1 * | 12/2005 | Claussen et al. ............. | 715/513 |
| 7,072,984 | B1 * | 7/2006 | Polonsky et al. ............. | 709/246 |
| 7,181,684 | B2 * | 2/2007 | Chittu et al. ................. | 715/514 |
| 7,210,095 | B1 * | 4/2007 | Mor ............................ | 715/513 |
| 7,246,351 | B2 * | 7/2007 | Bloch et al. .................. | 717/175 |
| 2002/0005867 | A1 | 1/2002 | Gvily .......................... | 345/760 |
| 2002/0018078 | A1 | 2/2002 | Khan et al. ................... | 345/762 |
| 2002/0023113 | A1 | 2/2002 | Hsing et al. .................. | 707/513 |
| 2002/0029296 | A1 | 3/2002 | Anuff et al. .................. | 709/311 |
| 2002/0073080 | A1 | 6/2002 | Lipkin ......................... | 707/3 |
| 2002/0078201 | A1 * | 6/2002 | Gvily .......................... | 709/225 |
| 2002/0083097 | A1 | 6/2002 | Warrington ................... | 707/513 |
| 2002/0109730 | A1 | 8/2002 | Dardick ....................... | 345/809 |
| 2002/0124071 | A1 | 9/2002 | Prochl et al. ................. | 709/223 |
| 2002/0129064 | A1 | 9/2002 | Guthrie ....................... | 707/513 |
| 2002/0143659 | A1 | 10/2002 | Keezer et al. ................. | 705/27 |
| 2002/0161805 | A1 | 10/2002 | Harris ......................... | 707/530 |
| 2006/0190561 | A1 * | 8/2006 | Conboy et al. ............... | 709/217 |

OTHER PUBLICATIONS

"Dynamic Markup Language Whitepaper" Version 10., Jul. 2001, Copyright (c) 200-2001, Rocklyte Systems, pp. 1-16.

* cited by examiner

*Primary Examiner*—Eric B Kiss
(74) *Attorney, Agent, or Firm*—Hayes Soloway P.C.

(57) ABSTRACT

A system for manipulating a document object model is provided. The system comprises a collection of document object model behavior elements, and a collection of scripts for performing actions associated with the set of behavior elements. Each behavior element comprises a name following a predetermined naming convention, an event attribute for associating the behavior element to an event, and other attributes for describing features of the behavior element. Each script is associated with a behavior element.

15 Claims, 24 Drawing Sheets dSVG sample behavior: createElement

Pressing the button will create a solid blue circle with a dark blue border over top of the transparent one.

Content of file: dsvg:createElement, dsvg:setAttribute
The dsvg:createElement will create a new solid circle over top of the transparent one when the button is selected.
The new element is inserted into the specified location within the DOM.

Figure 13A dSVG sample behavior: createElement

Pressing the button will create a solid blue circle with a dark blue border over top of the transparent one.

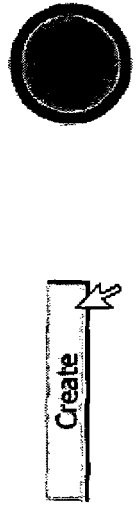

Content of file: dsvg:createElement, dsvg:setAttribute
The dsvg:createElement will create a new solid circle over top of the transparent one when the button is selected.
The new element is inserted into the specified location within the DOM.

Figure 17A dSVG sample behavior: setData

This is a sample of setData.

setData

Content of file: dsvg:setData
The dsvg:setData element will set a text node with the specified data.

Figure 18B

SYSTEM AND METHOD FOR MANIPULATING A DOCUMENT OBJECT MODEL

FIELD OF THE INVENTION

The invention relates to web application development. In particular, the invention relates to a system and method for manipulating a document object model.

BACKGROUND OF THE INVENTION

Web designers use markup languages to create and modify web sites. A document object model (DOM) is created by a viewer when accessing an extensible markup language (XML) based file. It is often desirable to manipulate the DOM.

One way to manipulate a DOM is to use scripting. However, many web designers do not have the programming skills required for DOM manipulation via scripting. Thus, programmers are needed to create the scripts for the designer. Programmers can be costly, plus it can take a long time to develop stable, fast code. Thus, it is desirable to have a system or method of manipulating a DOM that a designer with minimal programming knowledge may operate, and which could also aid even an experienced programmer to rapidly develop a web application.

One way of assisting designers and developers is to have pre-canned scripts for the most commonly required functionality. However, script is difficult to auto-generate. Supporting the insertion of pre-canned scripts via an integrated development environment (IDE) is both complicated and limiting. For example, the Microsoft (TM) Visual Studio IDE can create auto-generated code for its Microsoft Foundation Classes (MFC) (which abstract the programmer from the core Win32 API's), making it easier and quicker to program Windows applications. However, limits must be imposed on the user. User-modification of the auto-generated code is discouraged, because it makes it difficult to regenerate the code from the project file, or to automatically modify the pre-generated code as a result of new user-defined parameters to the abstractions. Auto-generated script cannot easily be customized afterwards, unless the IDE absolves itself of all responsibility should the designer make modifications.

Software exists that allows one to map input XML markup to output markup, automatically generating extensible stylesheet language transformation XSLT (the most commonly used XML markup language for transforming XML markup to a different form of markup). However, script is difficult to data-map.

Script relies on full DOM support. Scripts are only as powerful as the DOM methods that the viewer supports. Although it is desirable to have all viewers support the entire spectrum of DOM methods, they currently do not. Thus one must write script that only uses the API's supported by all viewers, in order to ensure that the script works on all viewers (i.e., one must program towards the lowest common denominator).

Script is complex. Abstracting the DOM methods using dSVG markup has allowed for the creation of a more direct linkage between the syntax and the intent of the author. Take the example of a designer creating a new element dynamically in the DOM. The designer wishes to create a circle at a particular location in the DOM tree. To do it in script is quite complicated, requiring over a hundred lines of code. One must first use getElementById( ) to find the target element, and then either the parent or sibling element. One then uses createElement( ) to create the circle. If inserting beneath a parent, parent.appendchild( ) is used. If inserting before a sibling, sibling.insertBefore( ) is used. If inserting after a sibling sibling.nextSibling.insertBefore( ) is used, unless there is no nextSibling, in which case sibling.parentNode.appendChild( ) is used. The author may wish to insert it as, say, the fourth sibling from the top or bottom, requiring a loop to be written which counts the siblings and accounts for the fact that maybe there are not that many siblings. Or the author may wish the new element to be the parent of existing elements, which requires removal of those elements and appending them as the children of the new one. Then finally setAttribute( )is used to set its identifier (ID) so that you can refer to it later.

Script is slower than native code. Scripts are interpreted, and thus provide slower performance than what would be possible with a natively-implemented markup language. Just having a script interpreter is a lot of overhead for a small device.

Script must use DOM interfaces. Scripts can only manipulate the DOM via the DOM methods, which are abstractions on top of the real object model used by the viewer. Natively-implemented markup could access the real object model directly, which may improve performance even more.

Script requires more data to transfer. Scripts greatly add to the amount of data needed to be transferred. This is a problem especially for small devices.

Finally, scripts are only as powerful as the DOM API's that the viewer supports. Currently, not all viewers support the entire spectrum of DOM API's.

The Synchronized Multimedia Integration Language (SMIL) has a <set> element that allows one to set the attributes of an element within the current document to a specific, known value. However, this <set> element does not actually call the DOM's setAttribute( ) method. Thus it does not fire a mutation event (informing any listener function that the attribute has changed). Also, the <set> element does not actually result in changes to the "core DOM", which represents the document, but rather it results in changes to the "animated DOM", which stores animated values for each attribute which may be animated. Furthermore, there is no way to monitor changes to the animated DOM. Also, the <set> element cannot affect other elements in other documents, and cannot be easily linked to events and cannot reference attributes in other elements. So, while SMIL can result in visual animation, it cannot be used for full DOM manipulation. Only script can do that by accessing the DOM methods.

SUMMARY OF THE INVENTION

It is an object of the invention to provide a novel system and method of manipulating a document object model that obviates or mitigates at least one of the problems described above.

In an aspect of the present invention, there is provided a system for manipulating a document object model. The system comprises a collection of document object model behavior elements, and a collection of scripts for performing actions associated with the set of behavior elements. Each behavior element comprises a namespace, an event attribute for associating the behavior element to an event, and other attributes for describing features of the behavior element. Each script is associated with a behavior element.

In another aspect of the present invention, there is provided a system for manipulating a document object model. The system comprises a collection of scripts for performing actions associated with markup behavior elements, and an initialization function for directing the processing of one or more behavior elements in a document object model. Each script is associated with a behavior element.

In another aspect of the present invention, there is provided a method of manipulating a document object model. The method comprises the steps of searching for a designated element in a document object model, and calling a script associated with the designated element.

In another aspect of the present invention, there is provided a method of manipulating a document object model. The method comprises the steps of adding an event listener to an element having a designated element as a child in the document object model, receiving an event which is equal to an event attribute setting in the designated element, and calling a script associated with the designated element.

In another aspect of the present invention, there is provided a method of creating an element for manipulating a document object model. The method comprises the steps of categorizing low level actions into behavior groupings, determining common attributes of a behavior grouping, and creating a behavior element having the common attributes of the behavior grouping.

BRIEF DESCRIPTIONS OF THE DRAWINGS

FIGS. 13A and 13B are before and after screen shots of an example of a createElement element, in accordance with the document object model manipulation system.

FIG. 14 is a screen shot of an example of a findElements element, in accordance with the document object model manipulation system.

FIGS. 17A and 17B are before and after screen shots of an example of a setAttribute element, in accordance with the document object model manipulation system.

FIGS. 18A and 18B are before and after screen shots of an example of a setData element, in accordance with the document object model manipulation system.

DETAILED DESCRIPTION OF THE PREFERRED EMBODIMENT

Figure 1:
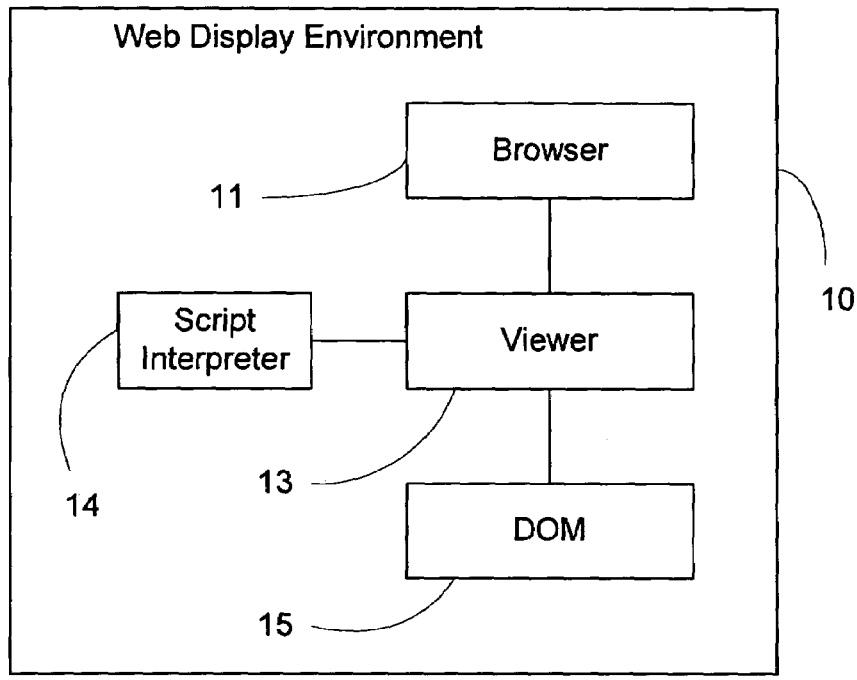
FIG. 1 shows a typical web display environment.

FIG. 1 shows a typical web display environment 10 for displaying web pages and web applications. A web display environment 10 comprises a browser 11, a viewer 13, a script interpreter 14, and a DOM 15. The browser 11 is the host application, which understands and visually renders hypertext markup language (HTML) and/or extensible hypertext markup language (XHTML). Examples of browsers include Netscape (™) and Internet Explorer (™). The browser 11 includes a window which is displayed on the display apparatus, such as a monitor, of an end user computer system. The browser 11 typically employs a plug-in architecture, in which third party software (known as the plug-in or viewer 13) can be associated with any file format that is not already natively supported by the browser 11 and is allowed to render that file within the host browser's 11 window. One type of file that the browser 11 may be asked to open is a Scalable Vector Graphic (SVG) file having a ".svg" extension. The browser 11 does not natively support the SVG markup language (which is an XML language) and so passes the SVG file to the SVG viewer 13, which has associated itself to the SVG file format, via the rules of the plug-in architecture of the browser 11.

The viewer 13 comprises software code for parsing the SVG markup, creating a DOM, rendering that DOM to the browser's window, listening for events and dispatching them to their assigned handler script functions, and interpreting/executing those script functions. An example of a viewer 13 is the Corel (™) SVG Viewer. The viewer 13 uses the SVG file received from the browser 11 to create a DOM 15. The DOM is a hierarchical tree structure of objects in memory, representing the hierarchical XML markup in the XML text file. The DOM also contains methods (also known as functions or application programming interfaces (API's)) that allow it to be queried or modified. The viewer 13 may also have access to a script interpreter/engine 14, which can execute script code created by a programmer for the purpose of making the document non-static (e.g., animation) and/or interactive with the user (e.g., the user can create events with the mouse or keyboard, which cause something to happen) via manipulation of the DOM.

The following common data types are used in this specification:

<boolean>: A <boolean> is specified as either 'true' or 'false'.

<integer>: An <integer> is specified as an optional sign character ('+' or '−') followed by one or more digits "0" to "9". If the sign character is not present, the number is non-negative.

Unless stated otherwise for a particular attribute or property, the range for a <integer> encompasses (at a minimum) −2147483648 to 2147483647.

Within the SVG DOM, an <integer> is represented as an long or an SVGAnimatedInteger.

<number> (real number value): The specification of real number values is different for property values than for XML attribute values.

The Cascading Style Sheets, level 2 (CSS2) Specification—a style sheet language that allows one to attach style (e.g. fonts, spacing and aural cues) to structured documents (e.g. HTML documents and XML applications)-states that a property value which is a <number> is specified in decimal notation (i.e., a <decimal-number>), which consists of either an <integer>, or an optional sign character followed by zero or more digits followed by a dot (.) followed by one or more digits. Thus, for conformance with CSS2, any property in SVG which accepts <number> values is specified in decimal notation only.

For SVG's XML attributes, to provide as much scalability in numeric values as possible, real number values can be provided either in decimal notation or in scientific notation (i.e., a <scientific-number>), which consists of a <decimal-number> immediately followed by the letter "e" or "E" immediately followed by an <integer>.

Unless stated otherwise for a particular attribute or property, a <number> has the capacity for at least a single-precision floating point number (ICC32) and has a range (at a minimum) of −3.4e+38F to +3.4e+38F.

It is recommended that higher precision floating point storage and computation be performed on operations such as coordinate system transformations to provide the best possible precision and to prevent round-off errors.

Conforming High-Quality SVG Viewers are required to use at least double-precision floating point (ICC32) for intermediate calculations on certain numerical operations.

Within the SVG DOM, a <number> is represented as a float or an SVGAnimatedNumber.

<length>: A length is a distance measurement. The format of a <length> is a <number> optionally followed immediately by a unit identifier. (Note that the specification of a <number> is different for property values than for XML attribute values.)

If the <length> is expressed as a value without a unit identifier (e.g., 48), then the <length> represents a distance in the current user coordinate system.

If one of the unit identifiers is provided (e.g., 12 mm), then the <length> is processed according to the description in Units.

Percentage values (e.g., 10%) depend on the particular property or attribute to which the percentage value has been assigned. Two common cases are: (a) when a percentage value represents a percent of the viewport (refer to the section that discusses Units in general), and (b) when a percentage value represents a percent of the bounding box on a given object (refer to the section that describes Object bounding box units).

Within the SVG DOM, a <length> is represented as an SVGLength or an SVGAnimatedLength.

<coordinate>: A <coordinate> represents a <length> in the user coordinate system that is the given distance from the origin of the user coordinate system along the relevant axis (the x-axis for X coordinates, the y-axis for Y coordinates).

Within the SVG DOM, a <coordinate> is represented as an SVGLength or an SVGAnimatedLength since both values have the same syntax.

<uri> (Uniform Resource Identifiers [URI] references): A URI is the address of a resource on the Web. For the specification of URI references in SVG, see URI references.

Within the SVG DOM, <uri> is represented as a DOMString or an SVGAnimatedString.

Figure 2:
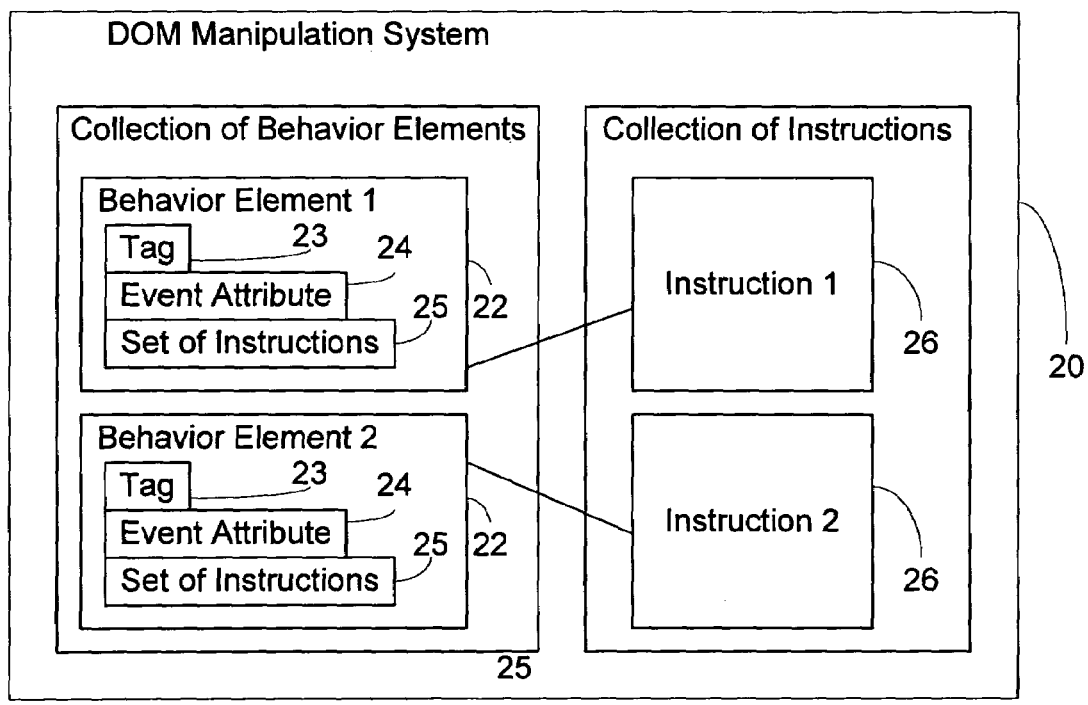
FIG. 2 shows a document object model manipulation system, in accordance with an embodiment of the present invention.

FIG. 2 shows a system for manipulating a Document Object Model (DOM) 20 in accordance with an embodiment of the present invention. The DOM manipulation system 20 comprises a collection (or set) of DOM behavior elements 22, and a collection (or set) of scripts 26. Each behavior element 22 comprises a namespace 23, an 'event' attribute 24, and other attributes 25. The namespace 23 of the behavior element 22 may follow a predetermined naming convention. These behavior elements 22 are not currently part of any official extensible markup language (XML) standard, and in one example described below, follow a naming convention of adding the namespace "dsvg:" as a prefix to the element name, so that the viewer's 13 XML parser allows it to be part of the DOM. The 'event' attribute 24 associates the behavior element 22 to an event, which will trigger its execution (i.e., make it perform whatever action it is supposed to perform). An example of an event is 'onclick', which is generated by clicking the mouse while the mouse pointer is overtop of a displayed element. Thus, when a user clicks on a displayed item associated with an object in the DOM, the behavior element 22 is executed. Until such time as the event associated with the event specified by the behavior element's 'event' attribute occurs, the behavior element remains dormant. The other attributes 25 describe the details of what the behavior element 22 is supposed to do. For example, other attributes 25 may include the identification (ID) of an object in the DOM, or in the case of the <dsvg:setAttribute> element, the 'name' attribute, which specifies the name of the attribute to be modified (e.g., 'width'), and the 'value; attribute, which specifies the value to which the attribute is to be set (e.g., 100).

Behavior elements 22 represent actions that can be executed in response to an event triggered by an SVG element. They fall into the following categories: DOM manipulation, viewer manipulation, coordinate conversion, constraints, flow control, selection ability and containers. Behaviors 22 can be associated to an element in two different ways.

The first way is to directly associate the behaviors to the element by inserting them as a children of that element. Whenever the element triggers an event, the behaviors whose 'event' attribute matches the event type are run in the order in which they are listed. To avoid specifying the same 'event' attribute for multiple associated behaviors, you can group all those behaviors with common 'event' attributes as children of an 'action' element, which specifies the 'event' attribute just once. For example, if a 'zoom' element with an 'event' attribute equal to 'onclick' is added as a child of a 'circle' element, then clicking on the circle will execute the zoom behavior, while hovering over it with the mouse will not.

The second way is to indirectly associate the behavior to the element by creating a 'listener' element, which specifies the 'event' attribute, whose 'observer' attribute is the ID of the element that will trigger the event and whose 'handler' attribute is the ID of the behavior element. It is best practice to create just one 'listener' element per event for a given observer element by pointing it to a handler element that is an 'action' element containing all the behaviors that should be run in response for that particular event. In such a case, the 'action' element should not specify the 'event' attribute, as it has already been specified by the 'listener' element. The advantage of indirectly associating behaviors to elements is that the same behaviors can be re-used by multiple elements. Note that to achieve the quickest load times, the 'action' elements should appear at the beginning of the document (beneath the root <svg> element), followed by the 'listener' elements, followed by the rest of the content.

Behaviors 22 that are to be executed at load time should be inserted as children of the root <svg> element, in the order they are to be executed, with their 'event' attributes equal to 'onload' (the default).

Objects are passive behaviors or containers, which usually get instantiated and then exist as persistent objects in memory. They usually exist as direct children of the 'svg' root element and are associated to target elements indirectly.

The DOM manipulation system 20 may further comprise an initialization function having instructions for traversing each node in the DOM immediately after the DOM has been created, searching for the behavior elements by searching for any element whose name is prefixed with the desired namespace (e.g., "dsvg:"), and calling the script 26 that is associated with each particular behavior element, whose name follows the predetermined naming convention. The scripts 26 perform functionality associated with the corresponding elements 22. Preferably, there is a one-to-one relationship between a behavior element 22 and its associated script 26. Preferably, a script 26 is created that can detect which viewer 13 it is being run on, and if the application programming interfaces (API's) are not available, work around the deficiency. Preferably, the initialization function and the scripts 26 are stored in a predetermined format either in the document text file or in a separate text file on a file system or webserver.

An alternative DOM manipulation system comprises the initialization file and the scripts 26 of the DOM manipulation system 20. The collections of behavior elements are provided independently from the alternative DOM manipulation system as markup syntax for a designer (or developer, or any user) to use when modifying an XML file, such as an SVG document.

The following is an example of the syntax of a behavior element 22:

```
<dsvg:copyElement
  id="string"
  event="string"
  newElementID="string"
  {source="xpath" | sourceFrameID="string"
  sourceObjectID="string" sourceDocID="string"
  sourceElementID="string"}
  {target="xpath" | targetFrameID="string"
  targetObjectID="string" targetDocID="string"
  targetElementID="string"}
  insertAs="{child| parent | sibling |
  replacement }"
  offset="signed integer"
  from="{top| bottom}"
  copyChildren="{true| false}"
  copyEvents="{true| false}"
  copyAttributes="{all| none |
  attr1;attr2;...attrN}"
  preserveTargetChildren="{true| false}"
  preserveTargetEvents="{true| false}"
  preserveTargetAttributes="{all| none |
  attr1;attr2;...attrN}"
/>
```

The <copyElement> element creates a copy of an existing element and inserts the copied element into the DOM at a desired location. The <dsvg:copyElement> element contains the namespace 23:

dsvg:copyElement which follows the naming convention of adding "dsvg:" as a prefix to the element name. As will be described below, this naming convention will assist the system 20 to search for behavior elements, i.e., all elements having this prefix in their namespace 23. The <dsvg:copyElement> element also contains the event attribute 24:

event="string"

The 'event' attribute 24 is set to an event which will trigger the behavior element 22. The attribute of the event attribute is the name of the event which is entered as a string. Examples of an event include "onload", "onclick", and "onmouseover". The event "onload" instructs the behavior element 22 to activate (i.e., to be processed) whenever the SVG element to which the behavior element is associated (via the <dsvg:listener> element or by nature of being a child of the SVG element) has received the 'onload' event, which occurs after the entire DOM has been created and all the scripts loaded into memory. The 'onclick' event instructs the behavior element 22 to activate whenever the SVG element to which the behavior element 22 is associated receives the 'onclick' event, which could be caused by the user clicking the mouse button while the mouse cursor is overtop of the SVG element. The 'onmouseover' event instructs the behavior element 22 to activate whenever the SVG element to which the behavior element 22 is associated receives the 'onmouseover' event, which could be caused by the user positioning the mouse overtop of the SVG element. 3The strings given in the above examples may be modified as desired. Other events may be associated with the event attribute.

In this example, the <dsvg:copyElement> element comprises other attributes 25. The 'id' attribute allows this behavior element 22 to be referenced later. The 'newElementID' attribute specifies the value of the 'id' attribute of the newly created element. The 'source' attribute is the XPath (a language for addressing parts of an XML document) pointing to the element to be copied. If the 'source' attribute is provided, the 'sourceFrameID', 'sourceObjectID', 'sourceDocID' and 'sourceElementID' attributes are ignored. The 'sourceFrameID' attribute specifies the 'id' attribute of the frame (e.g., a hypertext markup language (HTML) <frame> element) in which to find the element to be copied. If the 'sourceFrameID' attribute is not provided, the current frame is assumed. The 'sourceObjectID' attribute specifies the 'id' attribute of the object (e.g., an HTML <object> or <embed> element) in which to find the element to be copied. If the 'sourceObjectID' attribute is not provided, the current object is assumed. The 'sourceDocID' attribute specifies the "id" attribute of the document (e.g., a scalable vector graphics (SVG) or extensible hypertext markup language (XHTML) document) in which to find the element to be copied. If the 'sourceDocID' attribute is not provided, the current document is assumed. The 'sourceElementID' attribute specifies the 'id' attribute of the element to be copied.

The 'target' attribute is the XPath pointing to the element at which to insert the new element. If the 'target' attribute is provided, the 'targetFrameID', 'targetObjectID', 'targetDocID' and 'targetElementID' attributes are ignored. The 'targetFrameID' attribute specifies the 'id' attribute of the frame (e.g., an HTML <frame> element) in which to place the new element. If the 'targetFrameID' attribute is not provided, the current frame is assumed. The 'targetObjectID' attribute specifies the 'id' attribute of the object (e.g., an HTML <object> or <embed> element) in which to place the new element. If the 'targetObjectID' attribute is not provided, the current object is assumed. The 'targetDocID' attribute specifies the 'id' attribute of the document (e.g., an SVG or XHTML document) in which to place the new element. If the 'targetDocID' attribute is not provided, the current document is assumed. The 'targetElementID' attribute specifies the 'id' attribute of the element at which to insert the new element.

The copied element may be inserted at any position in the DOM relative to the target element. The 'insertAs' attribute specifies whether the new element is to be inserted as a child of the target element (the default), as the parent of the target element or as a sibling of the target element.

If inserting the copied element as a child, the 'offset' attribute specifies the number of nodes (not including comment nodes), from the top or bottom of the target element's list of children, in which to insert the new element. A negative value specifies up towards the first child. A positive value specifies down towards the last child. If there are fewer nodes than specified by the 'offset' attribute, the element will be inserted as either the first child or the last child. The 'from' attribute specifies whether the 'offset' is relative to the top (first child) or bottom (last child). The 'preserveTargetChildren', and 'preserveTargetEvents' and 'preserveTargetAttributes' attributes are ignored.

If inserting the copied element as the parent, the 'offset', 'from', 'preserveTargetChildren', 'preserveTargetEvents' and 'preserveTargetAttributes' attributes are ignored.

If inserting the copied element as a sibling, the 'from', 'preserveTargetChildren', 'preserveTargetEvents' and 'preserveTargetAttributes' attributes are ignored. The 'offset' specifies the number of nodes (not including comment nodes) before (if 'offset' is negative) or after (if 'offset' is positive) the target element at which to insert the new element. If there are fewer nodes than specified by 'offset', the element will be inserted as either the first child or the last child of the parent.

Other examples of behavior elements will be described below.

The following is an example of SVG markup used in association with an embodiment of the DOM manipulation system 20.

```
<?xml version="1.0"?>
<!DOCTYPE svg PUBLIC "-//W3C//DTD SVG 20000303 Stylable//EN"
"http://www.w3.org/TR/2000/03/WD-SVG-20000303/DTD/
svg-20000303-stylable.dtd">
<svg xmlns:dsvg="http://dsvg.corel.com/behaviors"
onload="dsvgInit(evt)" width="256" height="256">
    <desc>Example copyElement01 - copies the circle when the circle
is clicked.</desc>
    <script type="text/ecmascript" xlink:href="dsvg/dSVG.js"/>
    <script type="text/ecmascript"
xlink:href="dsvg/copyElement.js"/>
    <script type="text/ecmascript"
xlink:href="dsvg/setAttribute.js"/>
        <circle id="myCircle" cx="128" cy="34" r="16" fill="black">
            <dsvg:copyElement event="onclick"
newElementID="myCircle2" sourceElementID="myCircle"
targetElement="myCircle" insertAs="sibling"
offset="1"/>
            <dsvg:setAttribute event="onclick"
elementID="myCircle2" name="cy" value="192"/>
        </circle>
</svg>
```

Figure 3:
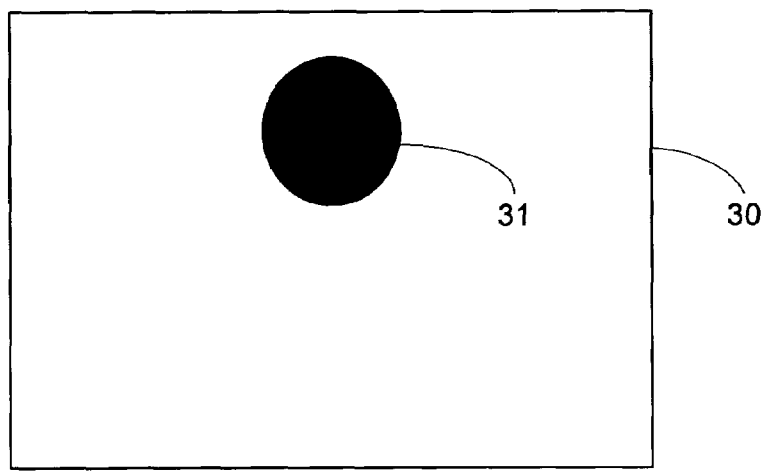
FIG. 3 is a pictorial representation of a browser window with a circle in the top of the browser window.
Figure 4:
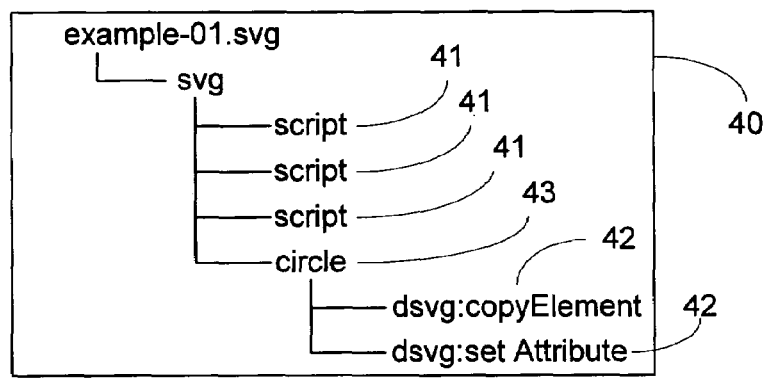
FIG. 4 is a node tree representation of an example of a document object model, in accordance with the document object model manipulation system.
Figure 5:
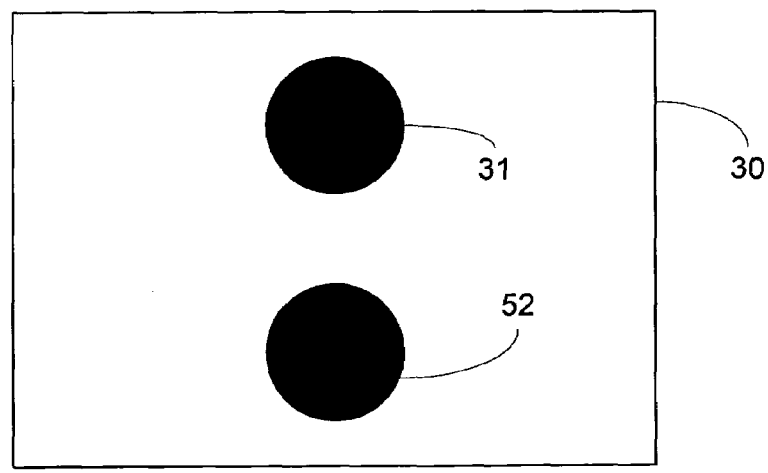
FIG. 5 is a pictorial representation of a browser window with two circles in the browser window.

FIG. 3 shows a representation of a browser 11 output display of the above SVG file. FIG. 3 shows a circle 31 in the top half of the browser window 30. FIG. 4 shows a node representation of a DOM 40 of the circle on the top half of a web page as shown in FIG. 3. The DOM contains a node for the root 'svg' element and a node for the circle 43 element. The DOM representation also contains script nodes 41 and the <dsvg:copyElement> and <dsvg:setAttribute> behavior elements 42 added as children of the <circle> node 43. The <dsvg:copyElement> behavior element 42 contains the prefix "dsvg:" in the namespace 23 and contains an 'event' attribute 24 equal to "onclick". If a user clicks on the circle 31 in the top half of the browser window 30, a second circle 52 is created below the first circle 31 as shown in FIG. 5.

The structure of behavior elements 22 allows them to be inserted in an XML file, such as an SVG file. Behavior elements 22 may be executed at load time (i.e., when the viewer 13 receives the file and creates the DOM), in response to an event, or grouped together as children of a <dsvg:action> container element, which is associated to an element via a <dsvg:listener> element.

In order for behavior elements 22 to be executed at load time, the behavior elements have their 'event' attribute set to "onload", which is the event created by the viewer 13 after the DOM has been built and all of the script is loaded into memory. All of these behavior elements are executed by the viewer's 13 script interpreter at load time, sequentially in the order in which they appear in the DOM.

Figure 6:
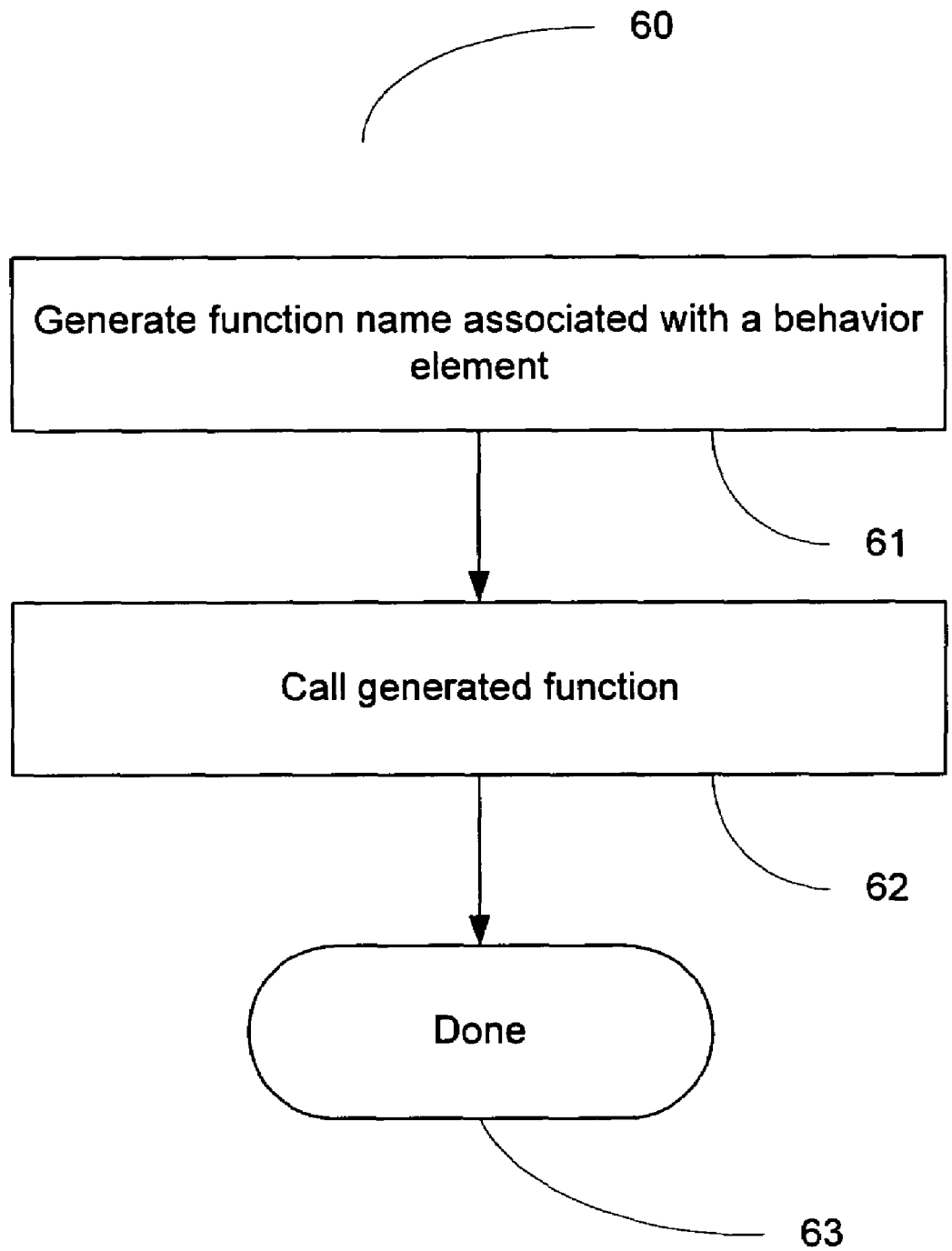
FIG. 6 is a flowchart of an example of a method of manipulating a document object model, in accordance with the document object model manipulation system.

FIG. 6 shows an example of a method of manipulating a DOM (60), in accordance with the UI control system 20. The method (60) begins with generating a function name associated with a UI control element (61). Next, the function is called (62). The method is done (63).

Figure 7:
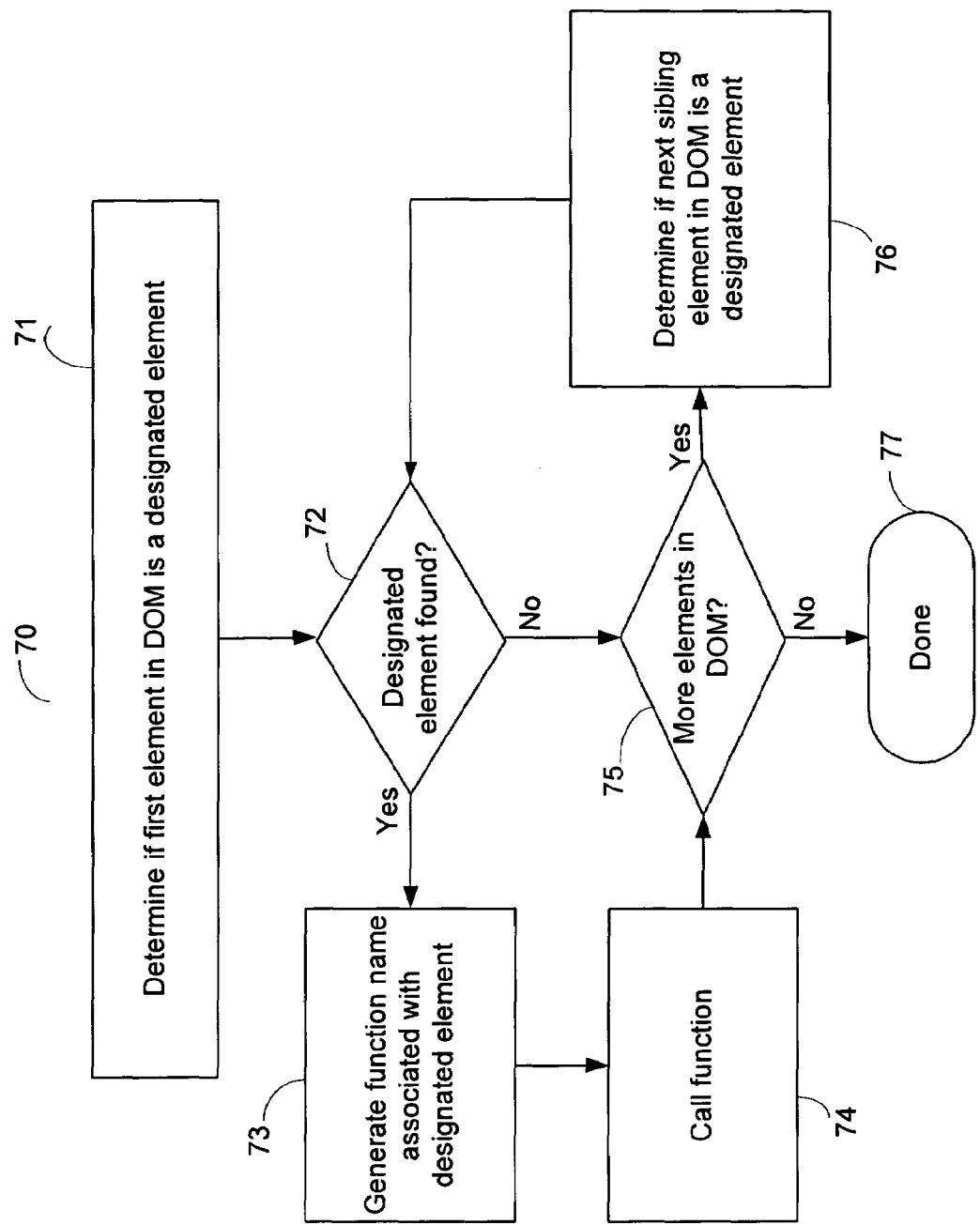
FIG. 7 is a flowchart of an example of a method of manipulating a document object model at load time, in accordance with an embodiment of the present invention.

FIG. 7 shows an example of a method of manipulating a DOM 15 at load time (70) in accordance with the DOM manipulation system 20. At load time, after the viewer has finished building the DOM and loading the script, the method (70) begins with the initialization function being run by the viewer's script interpreter, which determines if the first DOM element is a designated element (71). If a designated element is found (72), then the name of the function associated with the designated element is automatically generated (73) (in accordance with a predetermined function naming convention) and called (74). Preferably, the predetermined function naming convention is similar to the predetermined element naming convention. If a designated element is not found (72), or after a generated function is called (74), the method determines if there are more elements in the DOM to search (75). If there are more elements in the DOM (75), the method determines if the next sibling element is a designated element (76). The process is repeated until all elements in the DOM are searched. Once there are no more elements in the DOM to search (75), then the method is done (77).

The method described in FIG. 7 will be described using the above example of the SVG file and FIGS. 3, 4, and 5. The viewer's 13 script interpreter will execute the dsvgInit( ) function at load time, which will traverse each node in the DOM 40, searching for elements whose namespace 23 begin with the "dsvg:" prefix. The <dsvg:copyElement> node is found. Since it is a child of a 'circle' element that does not begin with the "dsvg:" prefix, the value of the node's 'event' attribute is retrieved (via the DOM's getAttribute( ) method) and found to be equal to "onclick". An event listener is placed on the parent 'circle' element, so that if the 'circle' element generates an "onclick" event, that event will be dispatched to the processActions(evt) handler function. The initialization function then looks fore more elements that begin with the "dsvg:" prefix and finds the <dsvg:setAttribute> node. Its 'event' attribute is determined to be "onclick", and so the initialization function attempts to place an "onclick" event listener on the 'circle' element. But it discovers that the same event listener is already on the 'circle' element, so it does not add another. The initialization function does not find any more elements beginning with the "dsvg:" namespace, and so its job is finished.

When the user clicks on the circle, the viewer creates an "onclick" event, which the event listener hears and dispatches to the processActions(evt) handler function. This function determines, from the event object passed in via the "evt" parameter, that the "onclick" event occurred on the 'circle' element. It then searches all the children of the 'circle' element, looking for any elements that begin with the "dsvg:" prefix. It finds the <dsvg:copyElement> first, and dynamically generates the string, dsvgCopyElement(element, evt)

which gets converted to a real function call, whose parameters include the <dsvg:copyElement> object itself ('element') as well as the event ('evt') object. That newly generated dsvgCopyElement( ) function is then called, expecting it to have been either included in the DOM manipulation system 20 as a script 26, or referenced from the original document. This dsvgCopyElement( ) function contains script 26 which first retrieves the values of the attributes of the object passed in via the 'element' parameter, using the DOM's getAttribute( ) method. Since the value of the 'event' attribute is "onclick", which is the same as the event that triggered this function to be called, the function does not abort, but proceeds to use all of the information from the other attributes to copy the element via its script 26.

Once the dsvgCopyElement( ) function is done, the processActions( ) handler function searches for more elements that begin with the "dsvg:" prefix and finds the <dsvg:setAttribute> element. As before, the string "dsvgSetAttribute(element, evt)" is automatically generated and converted to a real function call, which gets called, whose script 26 gets run, resulting in the newly created 'circle' element's 'cy' attribute being set, causing the new circle 52 to be displayed in the bottom half of the document.

In this example, only the 'cy' attribute of the copy 52 of the circle was changed. However, many other modifications may occur to elements in a DOM.

In the example described above, the function was dynamically generated, i.e., a string was created, having the same prefix as the designated element (without the colon) and the same name as the designated element (except with the first letter capitalized) and with the designated element's object and the trigger event object passed in as two parameters. The script 26 or set of instructions for the operations of the generated function is stored in a predetermined format either in the document text file or in a separate text file on a file system or webserver, and is loaded into memory by the viewer at load time. Alternatively, the initialization function may search for elements that begin with the "dsvg:" prefix and, using an 'if' or 'switch' statement, determine the appropriate predetermined function to call, which again are expected to have been already loaded in memory by the viewer.

It is advantageous, though, for the function names to be generated dynamically, so that the main script file containing the initialization function does not need to be updated whenever a new type of behavior element 22 has been created and is available for use.

As well, while the functions 26 that handle each type of behavior element 22 could be stored all in one file, it is advantageous to store them in separate files and reference them in the document only if their corresponding behavior element 22 is being used, so that only the code that is required is actually transmitted.

One way for a behavior element 22 to be executed in response to an event on a particular element is for the behavior element 22 to be inserted as a child of that particular element. The parent element can then be classified as the "observer element", since it has an event listener attached to it. When an event that is being listened for occurs on the observer element, the child behavior elements are then executed sequentially for each behavior element 22 that has an 'event' attribute value that matches the event that just occurred on the observer element.

Figure 8:
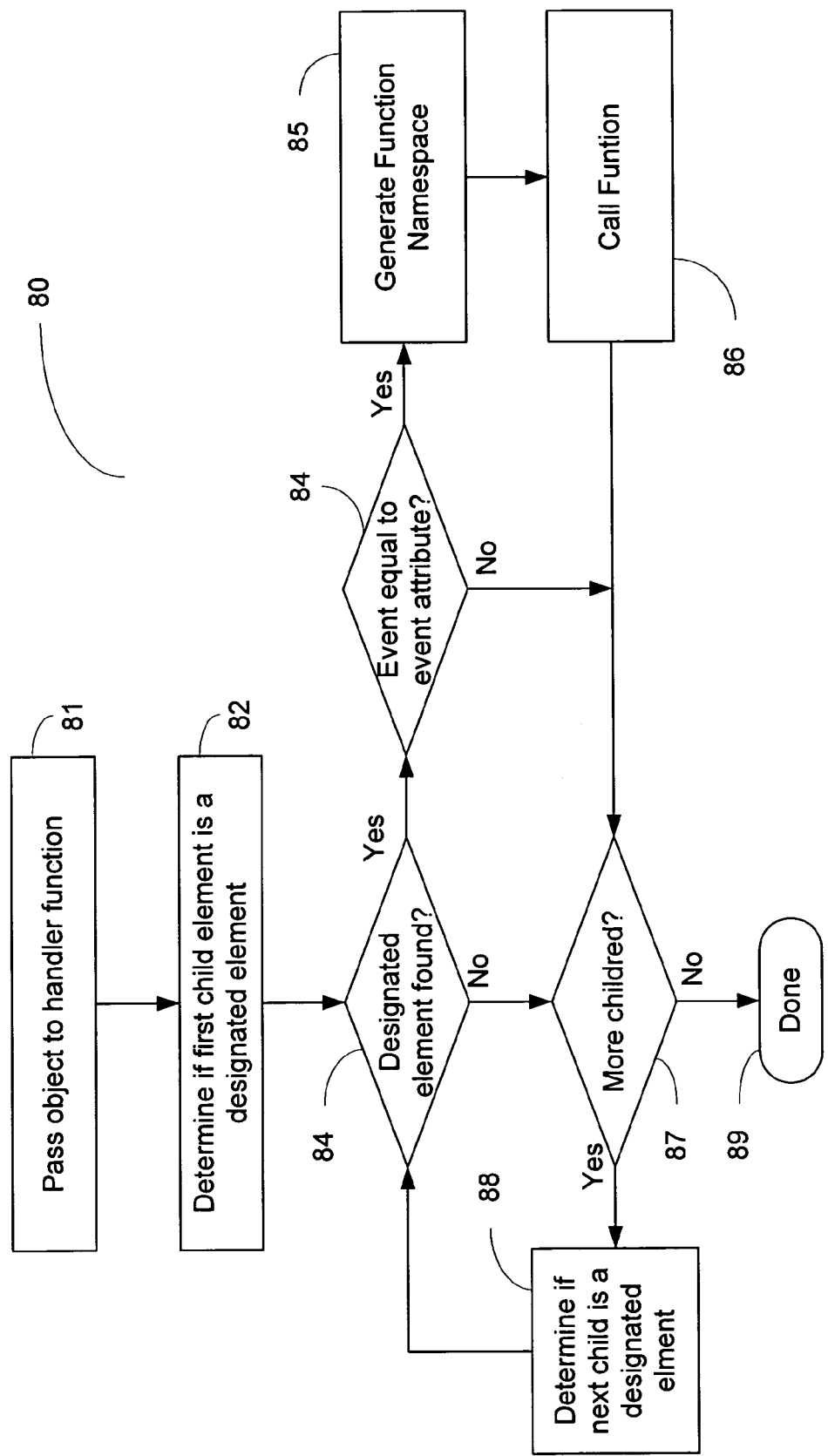
FIG. 8 is a flowchart of an example of a method of manipulating a document object model in response to an event, in accordance with an embodiment of the present invention.

FIG. 8 shows an example of a method of manipulating a DOM 15 in response to an event (80) in accordance with the DOM manipulation system 20. The DOM manipulation system 20 is built on top of an event-driven architecture, such as SVG, and XML. Once an event occurs on an SVG element (i.e., the observer element), the method (80) begins with passing the event object to a handler function (81). The handler function determines if the first child element of the SVG element associated with the object is a designated element (82). If a designated element is found (83), then the handler function determines if the event attribute 24 of the designated element is equal to the event that has occurred (84). If the event attribute 24 of the designated element is equal to the event which triggered this method (80), then the name of the function associated with the designated element is automatically generated (85) (in accordance with a predetermined function naming convention) and called (86). Preferably, the predetermined function naming convention is similar to the predetermined element naming convention. If a designated element is not found (83), or if the event attribute 24 of the designated element does not match the trigger event (84), or after a generated function is called (86), the event handler determines if there are more child elements of the observer element to search (87). If there are more child elements of the observer element (87), the event handler determines if the next child is a designated element (88). Steps (83) to (88) are repeated until all child elements of the observer element are searched. Once there are no more child elements to search (87), then the handler function is done (89).

In another example shown below, clicking on the red circle will cause a new blue square to be created beside it:

```
<circle cx="10" cy="10" r="5" fill="red">
    <dsvg:createElement event="onclick"
newElementID="myRectangle" elementName="rect"/>
    <dsvg:setAttribute elementID="myRectangle"
name="x" value="20"/>
    <dsvg:setAttribute elementID="myRectangle"
name="y" value="5"/>
    <dsvg:setAttribute elementID="myRectangle"
name="width" value="10"/>
    <dsvg:setAttribute elementID="myRectangle"
name="height" value="10"/>
    <dsvg:setAttribute elementID="myRectangle"
name="fill" value="blue"/>
</circle>
```

Many manipulations may be performed by adding a plurality of behavior elements as children to an observer element in a DOM 15. Alternatively, the behavior elements 22 may be grouped as children of a <dsvg:action> element. The following is the syntax for the <dsvg:action> element:

```
<dsvg:action
    id="string"
    event="string"
/>
```

The <dsvg:acton> element is a container for behavior elements. The <dsvg:action> element gets associated to an observer element (e.g., a circle or button that gets clicked on) via the <dsvg:listener> element. This is useful because the <dsvg:action> element and its children are not tied directly to the observer element, thus allowing them to be reused.

The <dsvg:action> element contains two attributes. The 'id' attribute allows the <dsvg:action> element to be referenced by a <dsvg:listener> element. The 'event' attribute specifies the event for which the observer element listens.

The <dsvg:action> element may then be associated with an observer element using a <dsvg:listener> element. The following is the syntax for the <dsvg:listener> element:

```
<dsvg:listener
    id="string"
    event="string"
    {observer="xpath" | observerFrameID="string"
    observerObjectID="string" observerDocID="string"
    observerElementID="string"}
    {handler="xpath" | handlerFrameID="string"
    handlerObjectID="string" handlerDocID="string"
    handlerElementID="string" |
    handlerFunction="string"}
/>
```

The <dsvg:listener> element listens for the specified event on the specified observer element and, if found, passes control to a handler element which will respond to the event. The handler element may be a behavior element 22 or a handler function. This is useful because the handler element (which may be an <action> container for many behavior elements 22 to be executed sequentially) is not tied directly to the observer element, thus allowing it to be reused.

The <dsvg:listener> element contains many attributes. The 'id' attribute allows this behavior element to be referenced later. The 'event' attribute specifies the event on the observer element to listen for. The 'observer' attribute specifies the xpath to the observer element, e.g., the element that gets clicked on. If the 'observer' attribute is specified, then the observerFrameID, observerObjectID, observerDocID and observerElementID attributes are ignored. The 'observerFrameID' attribute specifies the 'id' attribute of the frame (e.g., an HTML <frame> element) in which to find the observer element. If the 'observerFrameID' attribute is not provided, the current frame is assumed. The 'observerObjectID' attribute specifies the 'id' attribute of the object (e.g., an HTML <object> or <embed> element) in which to find the observer element. If the 'observerObjectID' attribute is not provided, the current object is assumed. The 'observerDocID' attribute specifies the 'id' attribute of the document (e.g., an SVG or XHTML document) in which to find the observer element. If the 'observerDocID' attribute is not provided, the current document is assumed. The 'observerElementID' attribute specifies the 'id' attribute of the observer element.

The 'handler' attribute specifies the XPath to the handler element, e.g., the element that gets executed. If the 'handler' attribute is specified, then the handlerFrameID, handlerObjectID, handlerDocID and handlerElementID attributes are ignored. The 'handlerFrameID' attribute specifies the 'id' attribute of the frame (e.g., an HTML <frame> element) in which to find the handler element. If the 'handlerFrameID' attribute is not provided, the current frame is assumed. The 'handlerObjectID' attribute specifies the 'id' attribute of the object (e.g., an HTML <object> or <embed> element) in which to find the handler element. If the 'handlerObjectID' attribute is not provided, the current object is assumed. The 'handlerDocID' attribute specifies the 'id' attribute of the document (e.g., an SVG or XHTML document) in which to find the handler element. If the 'handlerDocID' attribute is not provided, the current document is assumed. The 'handlerElementID' attribute specifies the 'id' attribute of the handler element. The 'handlerFunction' specifies the name of the script function (with any required variables) to be executed.

The following is the alternative syntax for the previous example of creating a blue square next to a red circle, whereby the behavior elements 22 are grouped as children of an <action> element:

```
<circle id="myCircle" cx="10" cy="10" r="5"
fill=" red"/>
<dsvg:action id="createRectangle">
    <dsvg:createElement event="onclick"
    newElementID="myRectangle" elementName="rect"/>
    <dsvg:setAttribute elementID="myRectangle"
    name="x" value="20"/>
    <dsvg:setAttribute elementID="myRectangle"
    name="y" value="5"/>
    <dsvg:setAttribute elementID="myRectangle"
    name="width" value="10"/>
    <dsvg:setAttribute elementID="myRectangle"
    name="height" value="10"/>
    <dsvg:setAttribute elementID="myRectangle"
    name="fill" value="blue"/>
</dsvg:action>
<dsvg:listener event="onclick"
observerElementID="myCircle"
handlerID="createRectangle"/>
```

The DOM manipulation system 20 also allows for behavior attributes to be added to existing regular SVG or XML elements. Preferably, the behavior attributes have a name which follows a pre-determined naming convention. A general behavior attribute 'dsvg:behaviorAttribute' can be added to the element <existingElement>:

```
<existingElement
    attribute1="value"
    attribute2="value"
    dsvg:behaviorAttribute="value"
/>
```

Accordingly, a collection (or set) of behavior attributes may be added to the DOM manipulation system 20. Similarly, a corresponding collection (or set) of scripts may be added to the DOM manipulation system 20. The corresponding scripts comprise functions or instructions which are performed in association with the regular XML or SVG element.

The initialization file may also search for attributes in elements that are not behavior elements 22. Scripts 26 may be created and associated with the 'dsvg' attribute in the same manner as with behavior elements. Script functions 26 for 'dsvg' attributes only operate on the object associated with the existing element to which a 'dsvg' attribute is added. A designer may add the 'dsvg' attribute in an SVG file, or any other XML file to be parsed by the viewer 13.

Figure 9:
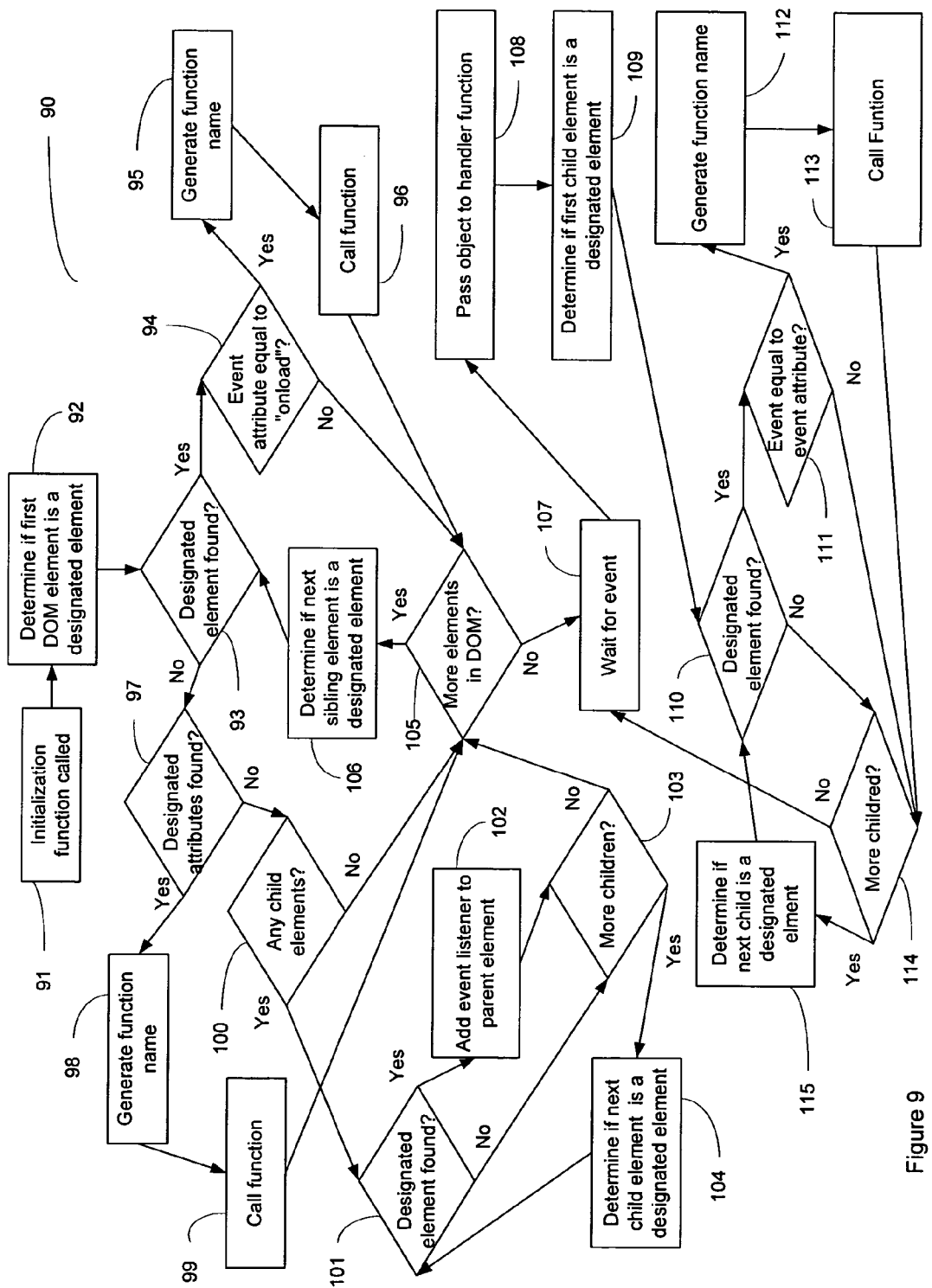
FIG. 9 is a flowchart of another example of a method of manipulating a document object model, in accordance with an embodiment of the present invention.

FIG. 9 shows another example of an method of manipulating a DOM (90) in accordance with the DOM manipulation system 20. After a user (or designer) marks up an SVG file using the markup syntax of the DOM manipulation system and the SVG file is loaded into a viewer 13, the viewer 13 creates an "onload" event which is received by an <svg> element. The method (90) begins with the initialization function. A dsvgInit( ) initialization function is called (91) by the viewer's script interpreter, which traverses the nodes of the DOM. The initialization function determines if the first DOM element is a designated element (92). If a designated element is found (93) and the 'event' attribute of the designated element is set to "onload" (94), then the name of the function associated with the designated element is automatically generated (95) (in accordance with a predetermined function naming convention) and called (96). Preferably, the predetermined function naming convention is similar to the predetermined element naming convention. If a designated element is not found (93), the initialization function determines if the regular SVG element contains any designated attributes (97). If any designated attributes are found (97), then the names of the functions associated with the designated attributes are automatically generated (98) (again, in accordance with a predetermined function naming convention) and called (99).

If a designated attribute is not found (97), then the initialization file determines if the regular SVG element has any child elements (100). If the regular SVG element has a child element (100) and the child element is a designated element 22 (101), then the initialization file determines the value of the designated element's 'event' attribute (i.e., the event that will trigger the execution of the designated element's associated function) and adds that event listener to the parent SVG element (102) (via the addEventListener( ) DOM API). If the child element is not a designated element 22 (101), then the initialization file determines if there are any other children of the regular SVG element (103). If there are more children (103), then the initialization file searches the next child of the regular SVG element (104). Steps (101) to (104) repeat until there are no more children of the regular SVG element.

If there are no more children of the regular SVG element (103), or after a generated function is called (96, 99), or if the event attribute of a designated element is not equal to "onload" (94), or there are no more child elements in a regular SVG element to search (100), the initialization file determines if there are more elements in the DOM to search (105). If there are more elements in the DOM (105), the initialization file determines if the next sibling element is a designated element (106). Steps (93) to (106) are repeated until all elements in the DOM are searched. Once there are no more elements in the DOM to search (105), then the initialization function is done and the viewer 13 waits for an event to occur (107).

Once an event occurs on an SVG element (i.e., the observer element), that event object is passed to any handler function with which it has been associated (108). The handler function determines if the first child of the observer element is a designated element (109). If a designated element is found (110), then the handler function determines if the event attribute 24 of the designated element is equal to the event that has occurred (111). If the event attribute 24 of the designated element is equal to the event (111), then the name of the function associated with the designated element is automatically generated (112) (in accordance with a predetermined function naming convention) and called (113). Preferably, the predetermined function naming convention is similar to the predetermined element naming convention. If a designated element is not found (110), or if the event attribute 24 of the designated element does not match the trigger event (111), or after a generated function is called (113), the event handler determines if there are more child elements of the observer element to search (114). If there are more child elements of the observer element (114), the method determines if the next child is a designated element (115). Steps (110) to (115) are repeated until all child elements of the observer element are searched. Once there are no more child elements to search (114), then the event handler function is done and the viewer waits for another event to occur (107).

Referencing Attributes

To create an application, a designer often desires to reference the current value of another element's attributes. An expression syntax is created to allow the attribute values of elements to be dynamic. With expressions, attribute values can be dependent on the real-time values of other attributes in the DOM. This syntax is intended to be simpler to use than XPath and ECMAScript, and to provide a subset of their most commonly used features.

In one embodiment of an expression syntax, expressions are denoted by the %% characters. Whatever is contained with the % characters gets evaluated. The basic unit of reference is elementID@attributeName. For example, %myRectangle@width% would be resolved to the numeric value of the width attribute of the element //.[@id="myRectangle"] (as denoted with the XPath expression). This syntax is therefore intended to be used in documents where elements have unique ID's. Note that the attributeName can have a namespace prefix for any namespace declared in the document.

Preferably, the following unit pattern is used for the expression syntax:

elementID@attributeName | elementID@nameSpace:attributeName

Some behaviors, like 'loadXML', can create document fragments. These are named at the time of creation and can be referred to within %% expressions, as follows:

docID.elementID@nameSpace:attributeName

Special attribute extensions include a bounding box, CDATA (the text between the opening and closing tags, e.g. <text>This is the CDATA</text>), and event attributes.

The bounding box extensions include the following:
    elementID@bbox.x: returns the x-coordinate of the element's bounding box (i.e. the left)
    elementID@bbox.y: returns the y-coordinate of the element's bounding box (i.e. the top)
    elementID@bbox.width: returns the width of the element's bounding box
    elementID@bbox.height: returns the height of the element's bounding box A CDATA extension includes:
    elementID@cdata: returns the text content of the element Event Attribute extensions included the following:
    @event.type: returns the type of event that triggered the behavior (e.g. 'mouseover', 'SVGResize', 'keypress', etc.)
    @event.targetNodeName: returns the nodeName of the element that was the target of the event that triggered the behavior
    @event.targetID: returns the 'id' attribute of the element that was the target of the event that triggered the behavior @event.currentTargetNodeName: returns the nodeName of the element that observed the event that triggered the behavior @event.currentTargetID: returns the 'id' attribute of the element that observed the event that triggered the behavior @event.shiftKey: returns 'true' if the Shift-key is pressed, 'false' otherwise.

@event.ctrlKey: returns 'true' if the Ctrl-key is pressed, 'false' otherwise.

@event.keyCode: returns the keyCode attribute of the 'keydown' or 'keyup' event that triggered the behavior.

@event.keyID: returns the key identifier—a string representation of the keyCode attribute of the 'keydown' or 'keyup' event that triggered the behavior (e.g. 'Space', 'Enter', 'a').

@event.charCode: returns the charCode attribute of the 'keypress' event that triggered the behavior.

@event.char: returns the string representation of the charCode attribute of the 'keypress' event that triggered the behavior (e.g. 'A' or 'a').

The real event object has 'target' and 'currentTarget' attributes, which are node objects. Since these would only be useful in a scripting environment, the "virtual" event attributes 'targetNodeName', 'targetID', 'currentTargetNodeName' and 'currentTargetID' are provided.

A keyCode event attribute may be automatically generated in response to the 'keydown' and 'keyup' events. For ease of authoring, dSVG offers a "virtual" event attribute called 'keyID', which is a string identifier for the various keys. These keyID's resemble, as closely as possible, the key identifiers listed in the W3C Working Draft of the DOM Level 3 Events Specification (http://www.w3.org/TR/2003/WD-DOM-Level-3-Events-20030331/keyset.html).

An attribute consists of constant string data concatenated with evaluated expressions delimited by % symbols (a double %% acts as an escape). For example:

attribute="constant_one%expression_one%constant_two%expression_two%constant_three"

Each resolution expects an expression of the form:
% complex_expression % where complex_expression can be of the form:
% simple_expression % or:
% simple_expression (complex_expression) simple_expression %

Parentheses are resolved from innermost to outermost. Note that open parentheses require leading whitespace to distinguish them from functions.

An example of a simple expression is:
simple_expression=[string, Unit_Pattern, function, variable](OpCode [string, Unit_Pattern, function, variable])*

An example of a string is:
string='some string data' resolves to some string data An example of a function is:
function=functionName(params): resolves to a function return value The following ECMA math functions are available:
abs; acos; asin; atan; atan2; ceil; cos; exp; floor; log; max; min; pow; random; sin; sqrt; and tan.

Other available functions are:
factorial;
doublefactorial;
ln;
log10;
if(boolean expression, if_true_expression, if_false_expression);
substring(string, index_start, index_end); and
length(string).

An example of a variable is:
variable (form: $variableName)=% expression %

Variables refer to 'variable' elements and are intended as a convenient way of building and (re)using complex expressions, or simply for storage. It is the author's responsibility to not create self referential variables or circular variable references.

Operation codes (OpCodes) include:

+: addition
−: subtraction
*: multiplication
/: division
,: list separator (ie. for parameters)
==: boolean equals
>=: boolean greater than or equal to
<=: boolean less than or equal to
!=: boolean not equal to Expressions using opcodes resolve any Unit_Patterns, functions, variables and strings and then follow standard ecma expression rules.

SYNTAX EXPRESSION EXAMPLE #1

```
<?xml version="1.0" standalone="no"?>
<!DOCTYPE svg SYSTEM "../SVGdSVG.dtd">
<svg xmlns:xlink="http://www.w3.org/1999/xlink"
xmlns:dsvg="http://www.corel.com/schemas/2002/dSVG" height="410px"
width="744px" onload="init(evt)" viewBox="0 0 744 410">
    <script type="text/ecmascript" xlink:href="dsvg/dSVG.js"/>
    <script type="text/ecmascript" xlink:href="dsvg/baseUI.js"/>
    <script type="text/ecmascript" xlink:href="dsvg/constraint.js"/>
    <script type="text/ecmascript" xlink:href="dsvg/focus.js"/>
    <script type="text/ecmascript" xlink:href="dsvg/setAttribute.js"/>
    <script type="text/ecmascript" xlink:href="dsvg/setStyle.js"/>
    <script type="text/ecmascript" xlink:href="dsvg/setTransform.js"/>
    <!-- template -->
    <rect height="40" width="744" y="0" x="0" fill="#5f86B1" id="title_rect"/>
    <text y="25" x="20" font-weight="bold" font-size="18" fill="white"
id="text_1">dSVG sample behavior: focus - with added attributes focusGroup and
```

-continued

```
focus</text>
    <text y="365" x="20" font-size="12" id="content">Content of file: dsvg:focus,
dsvg:setTransform, dsvg:setAttribute, dsvg:setStyle, (added attributes dsvg:focus,
dsvg:focusGroup)</text>
    <text y="380" x="20" font-size="12" id="expected">The dsvg:focusGroup
attribute adds the ability to store the ID of similar type elements that are assigned to that
group.</text>
    <text y="395" x="20" font-size="12" id="depend">Default focus can be given to
an element (red circle above) by adding the dsvg:focus attribute to that element.</text>
    <line y2="340" x2="744" y1="340" x1="0" stroke-width="2" stroke="#5f86B1"
fill="#5f86B1" id="bottom_line"/>
    <!-- adding behavior -->
    <text y="250" x="20" font-size="12" id="desc">The red, blue, green circles are
part of the focusGroup. The orange circle is not.</text>
    <text y="150" x="200" font-size="12" id="desc_2">Click on the red, green and
blue circles to set focus.</text>
    <text y="170" x="200" font-size="12" id="desc_3">Hover over the 'red', 'green'
and 'blue' text elements to set focus.</text>
    <dsvg:focus elementID="redCircle" event="onclick" id="circleGroup">
        <dsvg:setTransform scale="1.2" vAlign="middle" hAlign="middle"
absolute="true" elementID="%circleGroup@elementID%"/>
        <dsvg:setTransform scale="1" vAlign="middle" hAlign="middle"
absolute="true" elementID="%circleGroup@previousID%"/>
        <dsvg:setAttribute value="%(circleGroup@elementID)@fill%Text"
attribute="elementID" elementID="textGroup"/>
    </dsvg:focus>
    <dsvg:focus event="onmouseover" id="textGroup">
        <dsvg:setStyle value="%(textGroup@elementID)@cdata%"
property="fill" elementID="%textGroup@elementID%"/>
        <dsvg:setStyle value="black" property="fill"
elementID="%textGroup@previousID%"/>
        <dsvg:setAttribute value="%(textGroup@elementID)@cdata%Circle"
attribute="elementID" elementID="circleGroup"/>
    <dsvg:focus>
    <circle dsvg:focus="true" dsvg:focusGroup="circleGroup" r="30" cy="100"
cx="50" fill="red" id="redCircle"/>
    <circle dsvg:focusGroup="circleGroup" r="30" cy="200" cx="50" fill="blue"
id="blueCircle"/>
    <circle dsvg:focusGroup="circleGroup" r="30" cy="100" cx="50" fill="green"
id="greenCircle"/>
    <circle r="30" cy="200" cx="150" fill="orage" id="orangeCircle"/>
    <text dsvg:focus="true" dsvg:focusGroup="textGroup" y="80" x="200"
id="redText">red</text>
    <text dsvg:focusGroup="textGroup" y="80" x="250" id="blueText">blue</text>
    <text dsvg:focusGroup="textGroup" y="80" x="300"
id="greenText">green</text>
    <text y="80" x="350">orange</text>
</svg>
```

Hovering the mouse over the 'text' element with id="blueText causes the behaviors within the second 'focus' element to be run. When the first 'setStyle' behavior is run, its 'value' attribute, which is equal to:
    %(textGroup@elementID)@cdata%
resolves to:
    %blueText@cdata%
which then further resolves to:
    blue

SYNTAX EXPRESSION EXAMPLE #2

```
<dsvg:button xlink:href="dsvg/skinButton_Windows.svg#skinButton"
autoScale="true"
disabled="false" selected="false" toggle="false" height="18"
                                     width="100" y="70" x="80"
label="Evaluate" id="button1"> <dsvg:alert message="%button1@label
                                    =='false', 'is selected', 'is not
selected') %"/></dsvg:button>
```

Pushing the button will run the 'alert' behavior. Its 'message' attribute, which is equal to:
    message="% button1@label+'button'+if
    (button1@selected=='false',
    'is selected', 'is not selected')
which resolves to:
    "button1@label+'button'+if(false, 'is selected', 'is not selected')
which further resolves to:
    Evaluate button is selected The expression syntax allows a user to refer to real-time values of any attribute of any element in any accessible document or documentFragment easily without a complex syntax like XPath and without script. It also allows a user to manipulate them with mathematical operators and functions, as well as to concatenate them with strings. For instance, if a user had a circle element with id="myCircle" and a dSVG textBox element with id="myTextBox", the user could set the circle's fill colour to be the value of the textBox as follows: <dsvg: setAttribute elementID="myCircle" attribute="fill" value="%myTextBox@value%"/>.

Figure 10:
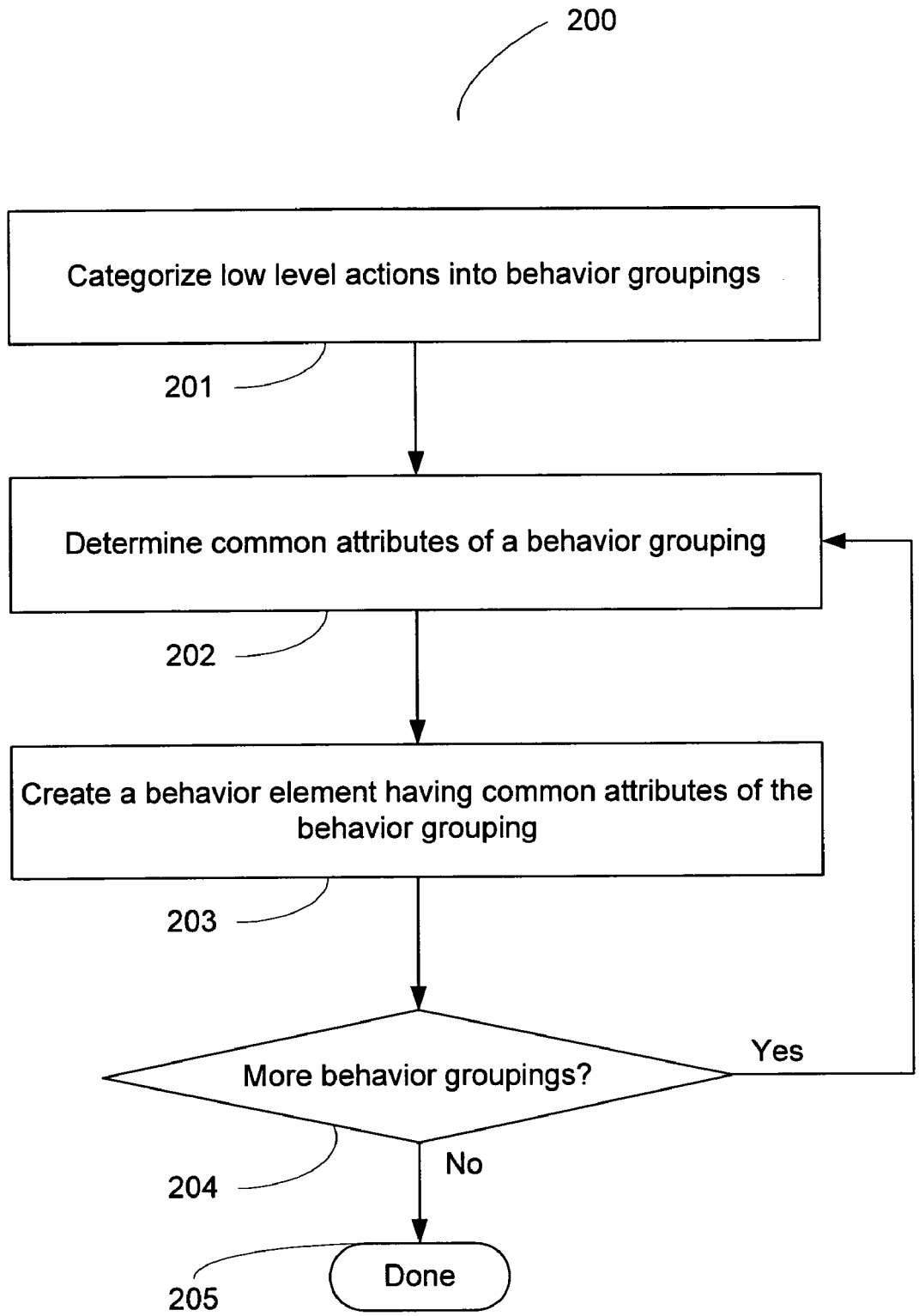
FIG. 10 is a flowchart of an example of a method of creating an element for manipulating a document object model, in accordance with an embodiment of the present invention.

FIG. 10 shows an example of a method of creating an element for manipulating a DOM (200) in accordance with the DOM manipulation system 20. The method (200) begins with categorizing low level actions into behavior groupings (201). Next, common attributes of a behavior grouping are determined (202). Next, a behavior element 22 having the common attributes of the behavior grouping is created (203). If there are more behavior groupings categorized in step (201), then steps (202) to (204) are repeated. If there are no more behavior grouping, then the method is done (205). Other steps may be added to this method (200). The method (200) may be used to create a plurality of behavior elements 22.

Figure 11:
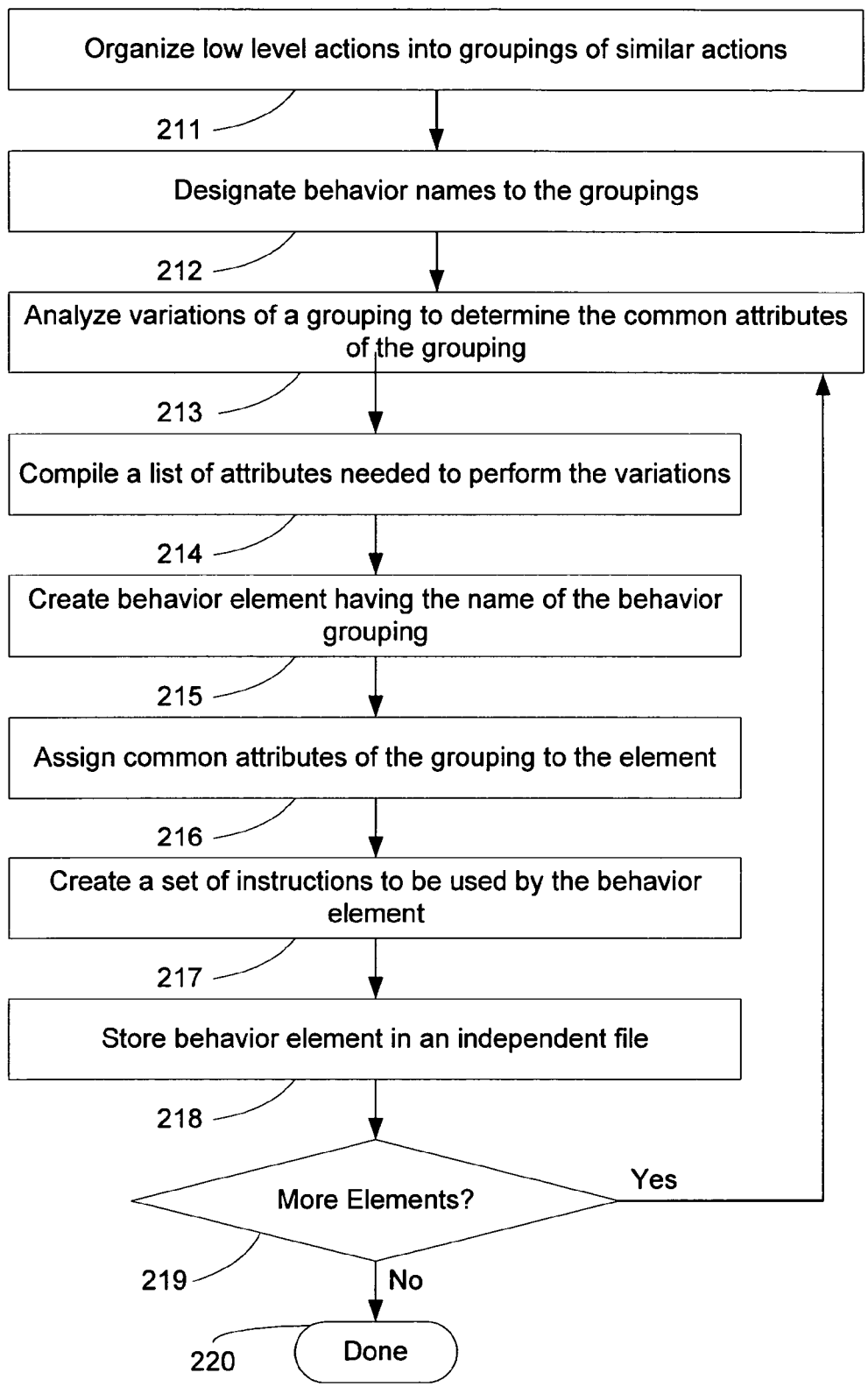
FIG. 11 is a flowchart of another example of a method of creating an element for manipulating a document object model, in accordance with an embodiment of the present invention.

FIG. 11 shows another example of a method of creating an element for manipulating a DOM (210) in accordance with the DOM manipulation system 20. The method (210) begins with organizing low level actions into groups of similar actions (211). Next behavior names are designated to the groupings (212). Next variations of a grouping are analyzed to determine common attributes of the grouping (213). A list of attributes needed to perform the variations is compiled (214). A behavior element 22 is then created. A name is assigned to the behavior element 22 pursuant to a naming convention (215). Next, the common attributes 25 of the behavior grouping are assigned to the behavior element 22 (216). Finally, a set of instructions or one or more functions (script 26) are created to be used by the behavior element 22 (217). The behavior element may be stored in an independent file (218). Once all behavior elements 22 have been created (219), the method is done (220). Default settings may be initiated for the behavior elements if desired.

There are many advantages to the DOM manipulation system 20. The system 20 enables web designers with little or no programming skills to create dynamic, interactive web applications. It also benefits experienced programmers, allowing them to write stable, robust applications extremely quickly (RAD—Rapid Application Developement)—much more quickly than via script. Because the DOM manipulation system 20 uses an XML markup language (as opposed to script libraries), the attributes and data and even the elements themselves can be made to be data-driven at run-time, using (at design-time) existing or new software that allows one to visually map input XML markup to output XML markup, resulting in an XSLT code (or any other language useful for XML transformations) which will actually modify the DOM Manipulation markup based on the input XML data/markup.

The DOM manipulation system 20 can also be natively-implemented, accessing the exposed DOM API's in the same manner as the script implementation. A native implementation could be much faster because unlike script, which gets interpreted at run-time, native code (e.g. C++ or C) gets interpreted at compile time and gets optimized by the compiler. The natively-implemented DOM manipulation system 20 could also access any unexposed, lower-level object model API's directly, rather than the exposed higher-level DOM API's, which could further improve performance. If natively implemented, the amount of data needed to be transferred is greatly reduced, since there is no script that needs to be transmitted, which is especially beneficial for wireless devices with low bandwidth and small memory. Using a markup language for the DOM Manipulation behavior elements is also beneficial because it allows for the possibility of further reduced the file size by creating a binary version of the markup language that employs opcodes—predetermined arrangements of bits (1's and 0's) that correspond to particular element names and attributes. Unlike textual markup, which must be parsed (compared to predetermine strings/text to establish the meaning of the text) in order to create the DOM, binary opcodes can be compared to identical binary opcodes, which is much faster than string comparisons, in order to build the DOM much faster.

The DOM manipulation system 20 abstracts the DOM API's to create a more direct linkage between the syntax and the intent of the author, thus making it easier to create SVG based applications. The behavior elements <setStyle>, <setClass> and <setTransform> make modifying the 'style', 'class' and 'transform' attributes much easier for the designer. These attributes are typically difficult to modify with script because they do not map directly to one value, but instead are composed of a string of separate properties or property-value pairs themselves. For instance, if a designer wishes to set an element's stroke-width to 1, the designer cannot simply set a "stroke-width" attribute because it does not exist. The designer would have to set the 'style' attribute to "stroke:1". However the 'style' attribute may already have had more style properties defined, such as style="stroke-width:2;fill:red; opacity:0.5". Therefore, if the designer simply sets the 'style' attribute to "stroke:1", then the designer would accidently remove all the other style properties already defined. Therefore, a designer needs to first get the value of the 'style' attribute, parse it, determine if it already has the property the designer wants to set, set it or replace it, and write the new delimited string. These steps are all performed with the <setStyle> behavior element.

Modifying a 'transform' attribute has similar problems and is more difficult with its syntax of transform="matrix(a b c d e f) translate(x [y]) scale(sx [sy] rotate(angle [cx cy]) skewX (angle) skewY(angle))". Further complicating matters, the final transformation depends on the order of these individual transformations. Also, applying a scale factor to an element has the effect of scaling that element's coordinates, thus causing the element's location on the screen to change. Therefore, mathematical calculations are required to determine the transformation needed to preserve the element's centre or edge coordinates. These requirements are handled by the <setTransform> behavior element.

Thus, the <setStyle>, <setClass> and <setTransform> behavior elements, as well as the <setLink> and <setStyleSheet> behavior elements, effectively abstract the designer from having to understand the details of the syntax of SVG. The % % syntax described above enables any element to reference any attribute of any element, thus enabling the creation of interactive, dynamic, client-side data driven web applications.

The DOM manipulation system 20 according to the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

Listing of Common Attributes and Behavior Elements 22

Some examples of behavior elements 22, in accordance with the DOM manipulation system 20, are provided below. The examples provide a syntax, a description and attributes of the behavior elements. Other behavior element 22 may be created. The provided behavior elements 22 are examples of one implementation of a DOM manipulation markup language. The common attributes and behavior elements 22 are presented as fragments of a sample document type definition (DTD).

Common Attributes

The following is a list of attributes common to the behavior elements 22:

```
<!ENTITY % stdBehaviorAttrs"
    id              ID      #IMPLIED
    event           %Text   #IMPLIED
    eventKeyCode    %Text   #IMPLIED
    eventKeyID      %Text   #IMPLIED
    eventCharCode   %Text   #IMPLIED
    eventChar       %Text   #IMPLIED >
``` id="name"
   Standard XML attribute for assigning a unique name to an element.

event='<string>'
   The name of the event that causes the behavior to be executed. This attribute can be set to either the event name or the event attribute name. The allowed values are:
   click, onclick, mousedown, onmousedown, mouseup, onmouseup, mouseover, onmouseover, mousemove, onmousemove, mouseout, onmouseout, SVGLoad, onload, SVGUnload, onunload, SVGResize, onresize, SVGScroll, onscroll, SVGZoom, onzoom, keydown, onkeydown, keypress, onkeypress, keyup and onkeyup. As well, it can be equal to 'callback', which is a dSVG semantic-level "virtual" event, triggered whenever one interacts with a UI control in such a manner as to cause its associated behaviours to be run. e.g. when a button is clicked on or when an item in a listBox is selected.

eventKeyCode='<string>'
   The value of the 'keycode' event attribute (automatically generated in response to 'keydown' and 'keyup' events) that causes the behavior to be executed. This attribute is only used if the 'event' attribute is set to 'keydown' or 'keyup' (or 'onkeydown' or 'onkeyup') and the actual event is equal to 'keydown' or 'keyup'.

eventKeyID='<string>'
   The key identifier for the 'keyCode' event attribute (automatically generated in response to 'keydown' and 'keyup' events) that causes the behavior to be executed. The keyID is a string representation of the 'keyCode' attribute of the 'keydown' or 'keyup' event that triggered the behavior, e.g. 'Space', 'Enter', 'A', etc. The keyID's resemble, as closely as possible, the key identifiers listed in the W3C Working Draft of the DOM Level 3 Events Specification. This attribute is only used if the 'event' attribute is set to 'keydown' or 'keyup' (or 'onkeydown' or 'onkeyup') and the actual event is equal to 'keydown' or 'keyup'. If the 'eventKeyCode' attribute is provided, this attribute is ignored.

eventCharCode='<string>'
   The value of the 'charCode' event attribute (automatically generated in response to the 'keypress' events) that causes the behavior to be executed. This attribute is only used if the 'event' attribute is set to 'keypress' (or 'onkeypress') and the actual event is equal to 'keypress'.

eventChar='<string>'
   The string representation of the 'charCode' event attribute (automatically generated in response to the 'keypress' events) that causes the behavior to be executed, e.g. 'a' or 'A'. This attribute is only used if the 'event' attribute is set to 'keypress' (or 'onkeypress') and the actual event is equal to 'keypress'. If the 'eventCharCode' attribute is provided, this attribute is ignored.

Behavior Elements 22

Some behavior elements have attributes that provide the ID of other elements. For instance, <dsvg:setAttribute> uses an 'elementID' attribute to specify the target element whose attribute is to be modified. In such cases, the method of targeting other elements could be more robust. One example would be to have additional attributes that allow for the targeting of different frames, objects and documents in an HTML page, which would allow for behaviors in multiple SVG documents embedded in a single HTML document to interact with each other. Another example would be to use XPath expressions (http://www.w3.org/TR/xpath) rather than ID's to target elements. Using XPaths could also enable some behaviors to act upon multiple targets.

<action>
   A container for behavior elements 22. It can either be used as a container for behavior elements having the same event attribute value, in which case the 'event' attribute must be defined for the 'action' element but not for the child behavior elements, or it can be associated to an observer element (e.g., a circle or button that gets clicked on) via the <listener> element, in which case its 'event' attribute is not required. The latter is useful because the <action> element and its children are not tied directly to the observer element, thus allowing them to be reused.

```
<action
    id="string"
    event="string"
/>
```

Attributes:
   'id' allows this action element to be referenced later.
   'event' specifies the event that triggers this action.

<copyElement>
   The 'copyElement' element creates a copy of an existing element and inserts it into the DOM at the specified location.

```
<!ENTITY % copyElementExt "">
<!ELEMENT dsvg:copyElement ANY >
<!ATTLIST dsvg:copyElement
    %stdBehaviorAttrs;
    sourceElementID   ID;          #IMPLIED
    targetElementID   ID;          #IMPLIED
    newElementID      ID;          #IMPLIED
    insertAs          %InsertAs;   child
    offset            %Integer;    #IMPLIED
    from              %From;       #IMPLIED
    ignoreText        %Boolean;    'false'
    ignoreCData       %Boolean;    'false'
    ignoreComments    %Boolean;    'false' >
```

Attribute definitions:
sourceElementID="name"
   The 'id' attribute of the element to be copied.
   If this attribute is not provided, the child elements are copied.
targetElementID="name"

The 'id' attribute of the element where the copied element is to be inserted.
newElementID="name"
The value of the copied element's 'id' attribute.
insertAs="(parent | sibling | child | replacement)"
Specifies whether the copied element is to be inserted as a child of the target element, as the parent of the target element, as a sibling of the target element, or as a replacement to the target element.
If this attribute is not provided, the default is "child".
offset="<integer>"
If inserting as a child, 'offset' specifies the number of nodes (not including comment nodes) from the top or bottom where the copied element will be inserted. A negative value specifies up towards the first child. A positive value specifies down towards the last child. If there are fewer nodes than specified by 'offset', the element will be inserted as either the first child or the last child.
If inserting as a sibling, 'offset' specifies the number of nodes (not including comment nodes) before (if 'offset' is negative) or after (if 'offset' is positive) the target element where the copied element will be inserted. If there are fewer nodes than specified by 'offset', the element will be inserted as either the first child or the last child of the parent.
If inserting as a parent or replacement, 'offset' is ignored.
If this attribute is not provided, the default is zero.

offset="(top | bottom)"
If inserting as a child, 'from' specifies whether 'offset' is relative to the top (first child) or bottom (last child).
If inserting as a parent, sibling or replacement, 'from' is ignored.
If this attribute is not provided, the default is "bottom".
ignoreText="(true | false)"
Specifies whether text nodes should be ignored or not when counting 'offset' nodes from the target element.
If this attribute is not provided, the default is 'false'.
ignoreCData="(true | false)"
Specifies whether CDATA nodes should be ignored or not when counting 'offset' nodes from the target element.
If this attribute is not provided, the default is 'false'.
ignoreComments="(true | false)"
Specifies whether comment nodes should be ignored or not when counting 'offset' nodes from the target element.
If this attribute is not provided, the default is 'false'.

Figure 12A:
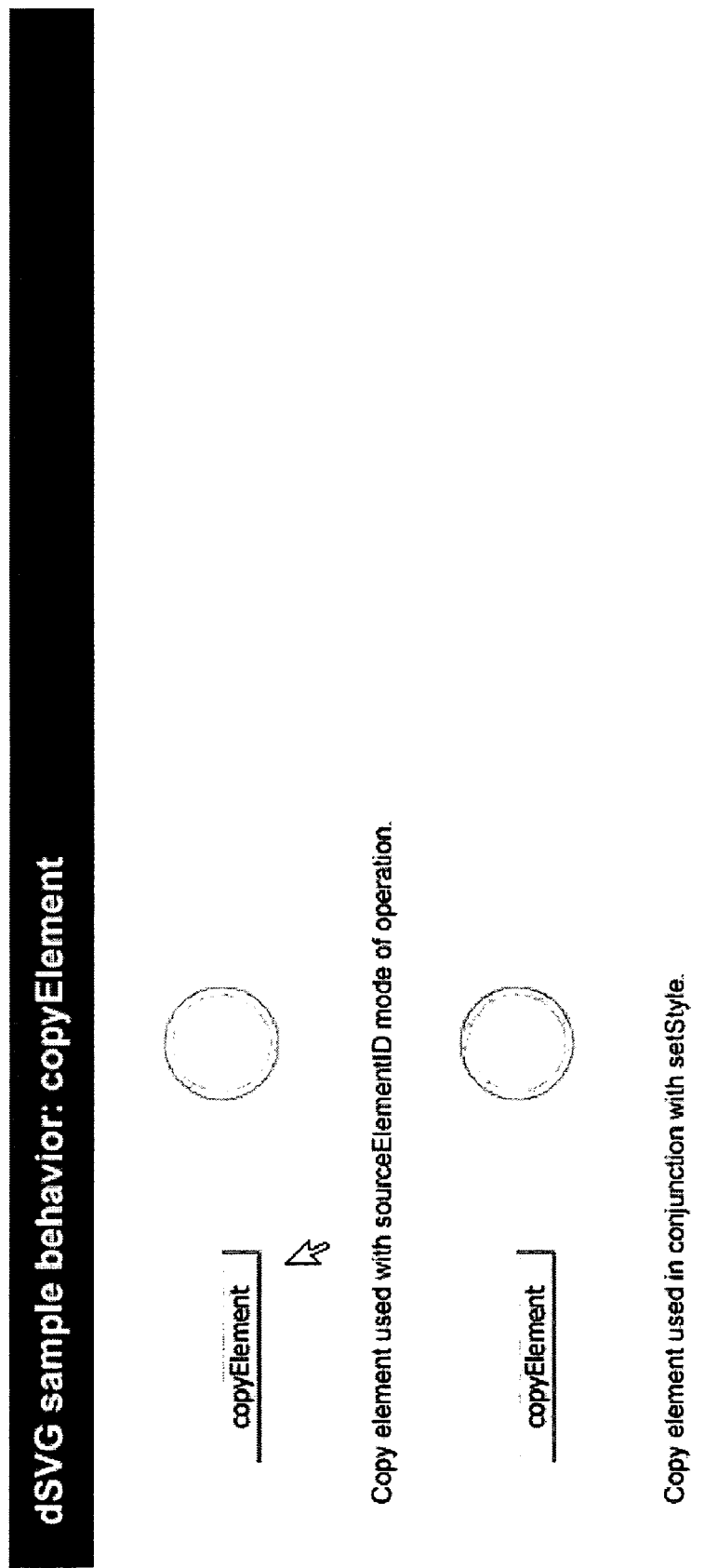
FIGS. 12A and 12B are before and after screen shots of an example of a copyElement element, in accordance with the document object model manipulation system.
Figure 12B:
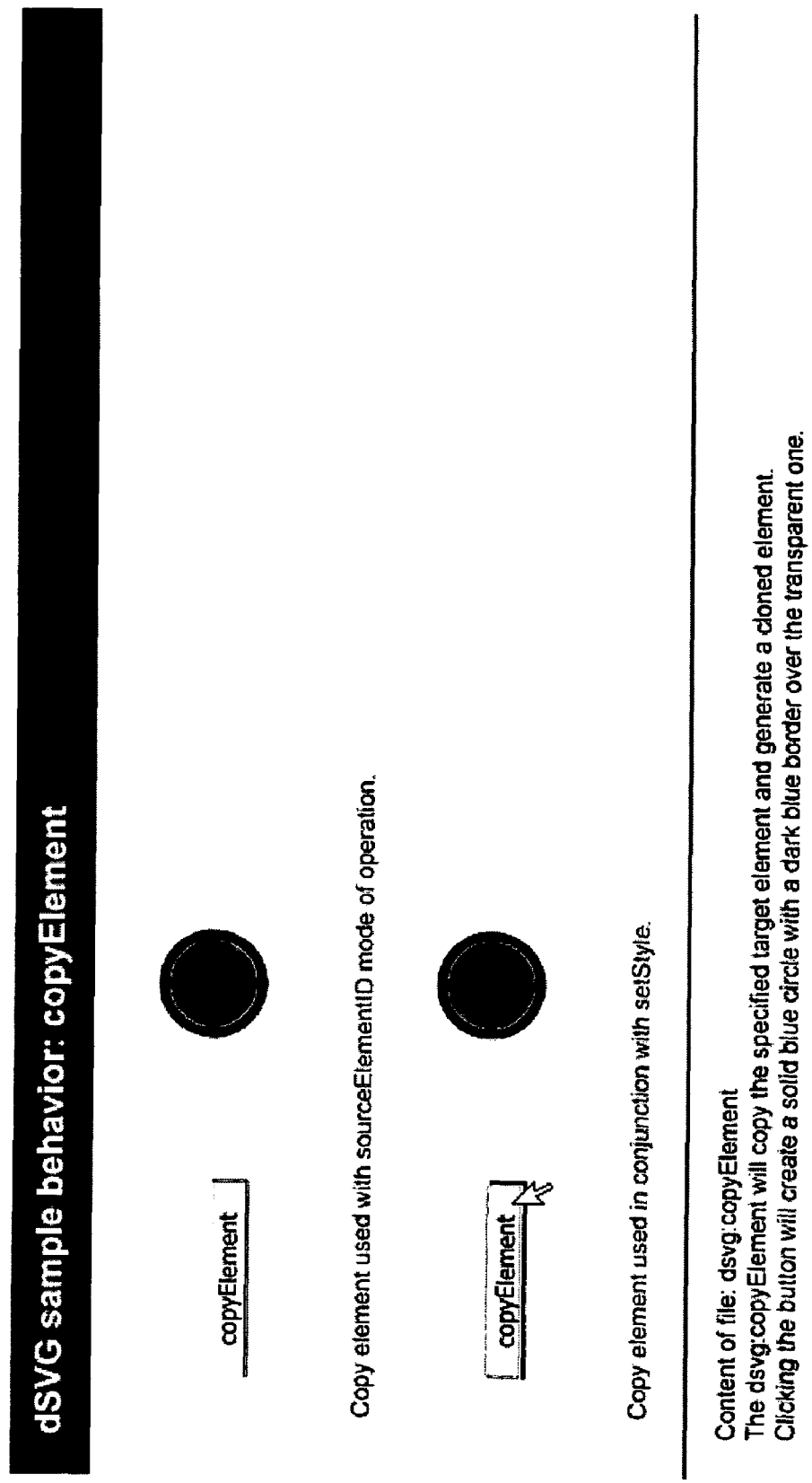

FIGS. 12A and 12B show two push buttons which invoke two different ways of using the 'copyElement' behavior. The first push button 225 has copy element used with sourceElementID mode of operation. The second push button 226 has copy element used in conjunction with setStyle. The copyElement will copy the specified target element 227 and generate a cloned element 228. Clicking the button 225 will create a solid blue circle with a dark blue border over the transparent one. The example is provided below:

```
<?xml version="1.0" standalone="no"?>
<!DOCTYPE svg SYSTEM "../SVGdSVG.dtd">
<svg xmlns:dsvg="http://www.corel.com/schemas/2002/dSVG11"
xmlns:xlink="http://www.w3.org/1999/xlink" height="410px" width="744px"
onload="init(evt)" viewBox="0 0 744 410">
    <script type="text/ecmascript" xlink:href="dsvg11/dSVG.js"/>
    <script type="text/ecmascript" xlink:href="dsvg11/baseUI.js"/>
    <script type="text/ecmascript" xlink:href="dsvg11/constraint.js"/>
    <script type="text/ecmascript" xlink:href="dsvg11/button.js"/>
    <script type="text/ecmascript" xlink:href="dsvg11/copyElement.js"/>
    <script type="text/ecmascript" xlink:href="dsvg11/setStyle.js"/>
    <script type="text/ecmascript" xlink:href="dsvg11/zoom.js"/>
    <!-- template -->
    <rect height="40" width="744" y="0" x="0" fill="#5f86B1" id="title_rect"/>
    <text y="25" x="20" font-weight="bold" font-size="18" fill="white"
id="text_1">dSVG sample behavior: copyElement
    </text>
    <text y="365" x="20" font-size="12" id="content">Content of file:
dsvg:copyElement
    </text>
    <text y="380" x="20" font-size="12" id="expected">The dsvg:copyElement will
copy the specified target element and generate a cloned element.
    </text>
    <text y="395" x="20" font-size="12" id="depend">Clicking the button will create
a solid blue circle with a dark blue border over the transparent one.
    </text>
    <line y2="340" x2="744" y1="340" x1="0" stroke-width="2" stroke="#5f86B1"
fill="#5f86B1" id="bottom_line"/>
    <!-- adding behavior -->
    <circle r="25" cy="100" cx="250" opacity="0.25" stroke-width="5"
stroke="darkblue" fill="#5f86B1" id="circle1"/>
    <circle r="25" cy="240" cx="250"
style="opacity:0.25;stroke-width:5;stroke:darkblue;fill:#5f86B1" id="circle2"/>
    <text y="180" x="30">Copy element used with sourceElementID mode of
operation.
    </text>
    <text y="320" x="30">Copy element used in conjunction with setStyle.
    </text>
    <dsvg:button xlink:href="dsvg11/skinButton_Windows.svg#skinButton"
autoScale="true" height="18" width="100" y="100" x="50" label="copyElement"
id="dsvgUniqueID_3">
        <dsvg:copyElement insertAs="child" newElementID="circle3"
event="onclick" id="dsvgUniqueID_1">
            <circle r="25" cy="100" cx="250" stroke-width="5"
```

-continued

```
stroke="darkblue" fill="#5f86B1"/>
    </dsvg:copyElement>
  </dsvg:button>
  <dsvg:button xlink:href="dsvg11/skinButton_Windows.svg#skinButton"
autoScale="true" height="18" width="100" y="240" x="50" label="copyElement"
id="button2">
    <dsvg:copyElement insertAs="sibling" sourceElementID="circle2"
newElementID="circle4" event="onclick"/>
    <dsvg:setStyle value="1" property="opacity" elementID="circle4"
event="onclick"/>
  </dsvg:button>
</svg>
```

<createCDATASection>
  Creates a CDATA section, with data, as a child of the specified element.

```
<createCDATASection
    id="string"
    event="string"
    {target="xpath" | frameID="string" objectID="string" docID="string"
  elementID="string"}
    data="string"
    />
```

Attributes:
  'id' allows this action element to be referenced later.
  'event' specifies the event that triggers this action.
  'target' is the xpath pointing to the element that is to be the parent of the CDATA block. If provided, 'frameID', 'objectID', 'docID' and 'elementID' are ignored.
  'frameID' specifies the 'id' attribute of the frame (e.g. an HTML <frame> element) in which to find the element that is to be the parent of the CDATA block. If not provided, the current frame is assumed. If 'target' is provided, this attribute is ignored.
  'objectID' specifies the 'id' attribute of the object (e.g., an HTML <object> or <embed> element) in which to find the element that is to be the parent of the CDATA block. If not provided, the current object is assumed. If 'target' is provided, this attribute is ignored.
  'docID' specifies the 'id' attribute of the document (e.g., an SVG or XHTML document) in which to find the element that is to be the parent of the CDATA block. If not provided, the current document is assumed. If 'target' is provided, this attribute is ignored.
  'elementID' specifies the 'id' attribute of the element that is to be the parent of the CDATA block. If 'target' is provided, this attribute is ignored.
  'data' specifies the text within the CDATA section.

<createDocument>
  Creates a new XML document or documentFragment.

```
<createDocument
    id="string"
    event="string"
    {target="xpath" | frameID="string" objectID="string" docID="string"}
    namespaceURI="string"
    qualifiedName="string"
    fragment="{true | false}
    />
```

Attributes:
  'id' allows this action element to be referenced later.
  'event' specifies the event that triggers this action.
  'target' is the xpath pointing to the location at which the new document is to be inserted. If provided, 'frameID', 'objectID' and 'docID' are ignored.
  'frameID' specifies the 'id' attribute of the frame (e.g., an HTML <frame> element) in which to place the new document. If not provided, the current frame is assumed. If 'target' is provided, this attribute is ignored.
  'objectID' specifies the 'id' attribute of the object (e.g., an HTML <object> or <embed> element) in which to place the new document. If not provided, the current object is assumed. If 'target' is provided, this attribute is ignored.
  'docID' specifies the ID that the newly created document should have. If not provided (and 'target' is also not provided), no document will be created. If 'target' is provided, this attribute is ignored.
  'namespaceURI' specifies the URI of the namespace, e.g., http://www.w3.org/TR/2000/03/WD-SVG-20000303/DTD/svg-20000303-stylable.dtd.
  'qualifiedName' specifies the local name of the root element, e.g., "svg".
  'fragment' specifies whether to create a document (false) or a documentFragment (true). A documentFragment is a lightweight document used for such purposes as constructing or rearranging elements to be inserted back into the real document, or storing XML data of a non-native format.

<createElement>
  The 'createElement' element creates a new element and inserts it into the DOM at the specified location.

```
<!ENTITY % createElementExt "" >
<!ELEMENT dsvg:createElement ANY >
<!ATTLIST dsvg:createElement
%stdBehaviorAttrs;
newElementID        ID;          #IMPLIED
elementID           ID;          #IMPLIED
```

-continued

| | | |
|---|---|---|
| elementName | %Text; | #IMPLIED |
| ns | %Text; | #IMPLIED |
| insertAs | %InsertAs; | child |
| from | %From; | #IMPLIED |
| offset | %Integer; | #IMPLIED |
| ignoreText | %Boolean; | 'false' |
| ignoreCData | %Boolean; | 'false' |
| ignoreComments | %Boolean; | 'false' > |

Attribute definitions:
newElementID="name"
　　The value of the created element's 'id' attribute.
elementID="name"
　　The 'id' attribute of the element where the created element will be inserted.
elementName='<string>'
　　The name of the element to be created (e.g. rect, ellipse, etc.).
ns='<string>'
　　The namespace of the element. The associated prefix for this namespace will be added in front of the element name, separated by a colon.
insertAs="(parent | sibling | child | replacement)"
　　Specifies whether the created element is to be inserted as a child of the target element, as the parent of the target element, as a sibling of the target element, or as a replacement to the target element.
　　If this attribute is not provided, the default is "child".
offset="<integer>"
　　If inserting as a child, 'offset' specifies the number of nodes (not including comment nodes) from the top or bottom where the new element will be inserted. A negative value specifies up towards the first child. A positive value specifies down towards the last child. If there are fewer nodes than specified by 'offset', the element will be inserted as either the first child or the last child.
　　If inserting as a sibling, 'offset' specifies the number of nodes (not including comment nodes) before (if 'offset' is negative) or after (if 'offset' is positive) the target element where the new element will be inserted. If there are fewer nodes than specified by 'offset', the element will be inserted as either the first child or the last child of the parent.
　　If inserting as a parent or replacement, 'offset' is ignored.
　　If this attribute is not provided, the default is zero.
offset="(top | bottom)"
　　If inserting as a child, 'from' specifies whether 'offset' is relative to the top (first child) or bottom (last child).
　　If inserting as a parent, sibling or replacement, 'from' is ignored.
　　If this attribute is not provided, the default is "bottom".
ignoreText="(true | false)"
　　Specifies whether text nodes should be ignored or not when counting 'offset' nodes from the target element.
　　If this attribute is not provided, the default is 'false'.
ignoreCData="(true | false)"
　　Specifies whether CDATA nodes should be ignored or not when counting 'offset' nodes from the target element.
　　If this attribute is not provided, the default is 'false'.
ignoreComments="(true | false)"
　　Specifies whether comment nodes should be ignored or not when counting 'offset' nodes from the target element.
　　If this attribute is not provided, the default is 'false'.

FIGS. 13A and 13B show a push button 230 that creates a circle 232 with the 'createElement' behavior. The createElement will create a solid circle 232 over top of the transparent one 231 when the button is selected. The new element is inserted into the specified location within the DOM. The example is provided below:

```
<?xml version="1.0" standalone="no"?>
<!DOCTYPE svg SYSTEM "../SVGdSVG.dtd">
<svg xmlns:dsvg="http://www.corel.com/schemas/2002/dSVG11"
xmlns:xlink="http://www.w3.org/1999/xlink" height="410px" width="744px"
onload="init(evt)" viewBox="0 0 744 410">
    <script type="text/ecmascript" xlink:href="dsvg11/dSVG.js"/>
    <script type="text/ecmascript" xlink:href="dsvg11/baseUI.js"/>
    <script type="text/ecmascript" xlink:href="dsvg11/constraint.js"/>
    <script type="text/ecmascript" xlink:href="dsvg11/createElement.js"/>
    <script type="text/ecmascript" xlink:href="dsvg11/setAttribute.js"/>
    <script type="text/ecmascript" xlink:href="dsvg11/button.js"/>
    <!-- template -->
    <rect height="40" width="744" y="0" x="0" fill="#5f86B1" id="title_rect"/>
    <text y="25" x="20" font-weight="bold" font-size="18" fill="white"
id="text_1">dSVG sample behavior: createElement
    </text>
    <text y="365" x="20" font-size="12" id="content">Content of file:
dsvg:createElement, dsvg:setAttribute
    </text>
    <text y="380" x="20" font-size="12" id="expected">The dsvg:createElement will
create a new solid circle over top of the transparent one when the button is selected.
    </text>
    <text y="395" x="20" font-size="12" id="depend">The new element is inserted
into the specified location within the DOM.
    </text>
    <line y2="340" x2="744" y1="340" x1="0" stroke-width="2" stroke="#5f86B1"
fill="#5f86B1" id="bottom_line"/>
    <!-- adding behavior -->
    <circle r="25" cy="140" cx="250" opacity="0.25" stroke-width="5"
stroke="darkblue" fill="#5f86B1"/>
    <text y="70" x="30">Pressing the button will create a solid blue circle with a dark
blue border over top of the transparent one.
    </text>
```

-continued

```
<dsvg:button xlink:href="dsvg11/skinButton_Windows.svg#skinButton"
autoScale="true" height="18" width="100" y="130" x="50" label="Create"
id="dsvgUniqueID_7">
    <dsvg:createElement insertAs="child" elementID="thedoc"
elementName="circle" newElementID="circle2" event="onclick"/>
    <dsvg:setAttribute value="25" attribute="r" elementID="circle2"
event="onclick"/>
    <dsvg:setAttribute value="250" attribute="cx" elementID="circle2"
event="onclick"/>
    <dsvg:setAttribute value="140" attribute="cy" elementID="circle2"
event="onclick"/>
    <dsvg:setAttribute value="#5f86B1" attribute="fill" elementID="circle2"
event="onclick"/>
    <dsvg:setAttribute value="darkblue" attribute="stroke"
elementID="circle2" event="onclick"/>
    <dsvg:setAttribute value="5" attribute="stroke-width"
elementID="circle2" event="onclick"/>
</dsvg:button>
</svg>
```

<createEvent>
Creates an event and dispatches (sends) it to the desired target.

```
<createEvent
    id="string"
    event="string"
    eventName="string"
    {source="xpath" | sourceFrameID="string" sourceObjectID="string"
sourceDocID="string" sourceElementID="string"}
    {target="xpath" | targetFrameID="string" targetObjectID="string"
targetDocID="string" targetElementID="string"}
    eventPhase="unsigned integer"
    bubbles="{true| false}"
    cancelable="{true | false}"
    timeStamp="string"
    stopPropagation="{true | false}"
    preventDefault="{true | false}"
/>
```

Attributes:
  'id' allows this action element to be referenced later.
  'event' specifies the event that triggers this action.
  'eventName' specifies the type of the event, e.g., mouseover. Note that only events that are supported by the software (e.g., the SVG Viewer) can be created.
  'source' specifies the xpath to the element that the target will "think" created the event. If not specified, and sourceElementID is also not specified, the source will be the <createElement> itself. If specified, then sourceFrameID, sourceObjectID, sourceDocID and sourceElementID are ignored.
  'sourceFrameID' specifies the 'id' attribute of the frame (e.g., an HTML <frame> element) in which to find the element that the target will "think" created the event. If not provided, the current frame is assumed. If 'source' is provided, this attribute is ignored.
  'sourceObjectID' specifies the 'id' attribute of the object (e.g., an HTML <object> or <embed> element) in which to find the element that the target will "think" created the event. If not provided, the current object is assumed. If 'source' is provided, this attribute is ignored.
  'sourceDocID' specifies the 'id' attribute of the document (e.g., an SVG or XHTML document) in which to find the element that the target will "think" created the event. If not provided, the current document is assumed. If 'source' is provided, this attribute is ignored.
  'sourceElementID' specifies the 'id' attribute of the element that the target will "think" created the event. If 'source' is provided, this attribute is ignored.
  'target' specifies the xpath to the element that the event is being dispatched to. If specified, then targetFrameID, targetObjectID, targetDocID and targetElementID are ignored.
  'targetFrameID' specifies the 'id' attribute of the frame (e.g., an HTML <frame> element) in which to find the element that the event is being dispatched to. If not provided, the current frame is assumed. If 'source' is provided, this attribute is ignored.
  'targetObjectID' specifies the 'id' attribute of the object (e.g., an HTML <object> or <embed> element) in which to find the element that the event is being dispatched to. If not provided, the current object is assumed. If 'source' is provided, this attribute is ignored.
  'targetDocID' specifies the 'id' attribute of the document (e.g., an SVG or XHTML document) in which to find the element that the event is being dispatched to. If not provided, the current document is assumed. If 'source' is provided, this attribute is ignored.
  'targetElementID' specifies the 'id' attribute of the element that the event is being dispatched to. If 'source' is provided, this attribute is ignored.
  'eventPhase' specifies which phase of event flow is currently being evaluated.
  'bubbles' specifies whether the event can bubble (true) or not (false).
  'cancelable' specifies whether the event can have its default actions prevented (true) or not (false).
  'timeStamp' specifies the time (in milliseconds since the epoch) at which the event was created. If not supplied, the current system time is used. If not available, zero is used. Examples of epoch time are the time of the system start or 0:0:0 UTC 1 Jan. 1970.
  'stopPropagation' prevents further propagation of an event during event flow. If true, the event will complete its dispatch to all listeners and then cease propagating through the tree.
  'preventDefault' specifies (if true) that the event is to be cancelled, so that any default action normally taken by the implementation as a result of the event will not occur. This has no effect, however, on non-cancelable events, i.e., it has no effect if 'cancelable' is false.

<createProcessingInstruction>

Creates a processingInstruction for the document, e.g., <?xml version="1.0"?>

```
<createProcessingInstruction
    id="string"
    event="string"
    data="string"
/>
```

Attributes:
   'id' allows this action element to be referenced later.
   'event' specifies the event that triggers this action.
   'data' specifies the processingInstruction; e.g., xml version=" 1.0".

<dispatchEvent>

Dispatches whatever event triggered this action-element to the desired target.

```
<dispatchEvent
    id="string"
    event="string"
    {target="xpath" | frameID="string" objectID="string" docID="string" elementID="string"}
/>
```

Attributes:
   'id' allows this action element to be referenced later.
   'event' specifies the event that triggers this action.
   'target' specifies the xpath to the element that the event is being dispatched to. If specified, then targetFrameID, targetObjectID, targetDocID and targetElementID are ignored.
   'targetFrameID' specifies the 'id' attribute of the frame (e.g., an HTML <frame> element) in which to find the element that the event is being dispatched to. If not provided, the current frame is assumed.
   'targetObjectID' specifies the 'id' attribute of the object (e.g., an HTML <object> or <embed> element) in which to find the element that the event is being dispatched to. If not provided, the current object is assumed.
   'targetDocID' specifies the 'id' attribute of the document (e.g., an SVG or XHTML document) in which to find the element that the event is being dispatched to. If not provided, the current document is assumed.
   'targetElementID' specifies the 'id' attribute of the element that the event is being dispatched to.

<findElements>

The 'findElements' element finds all the elements that match the specified search criteria, as defined by the 'attributeCondition', 'elementCondition', 'and' and 'or' elements.

```
<!ENTITY % findElementsExt "" >
<!ELEMENT dsvg:findElements ANY >
<!ATTLIST dsvg:findElements
    %stdBehaviorAttrs;
    parentID       ID;         #IMPLIED
    recursive      %Boolean;   #IMPLIED
    nodeList       %Text;      #IMPLIED
    targetDocID    ID;         #IMPLIED >
```

Attribute definitions:

parentID="name"
   The 'id' attribute of the element whose children are to be searched.

recursive="(true | false)"
   Specifies whether the all child elements should be searched (true) or just the immediate/direct child elements should be searched (false).
   If this attribute is not provide, the default is 'false'.

nodeList='<string>'
   The identifier for the resulting nodelist, which will be stored in memory. This identifier can be used by the 'loop' element.

targetDocID="name"
   The identifier for the documentFragment used to store actual copies of the elements with matching search criteria. This identifier can be used by the 'postURL' element.

Figure 14:
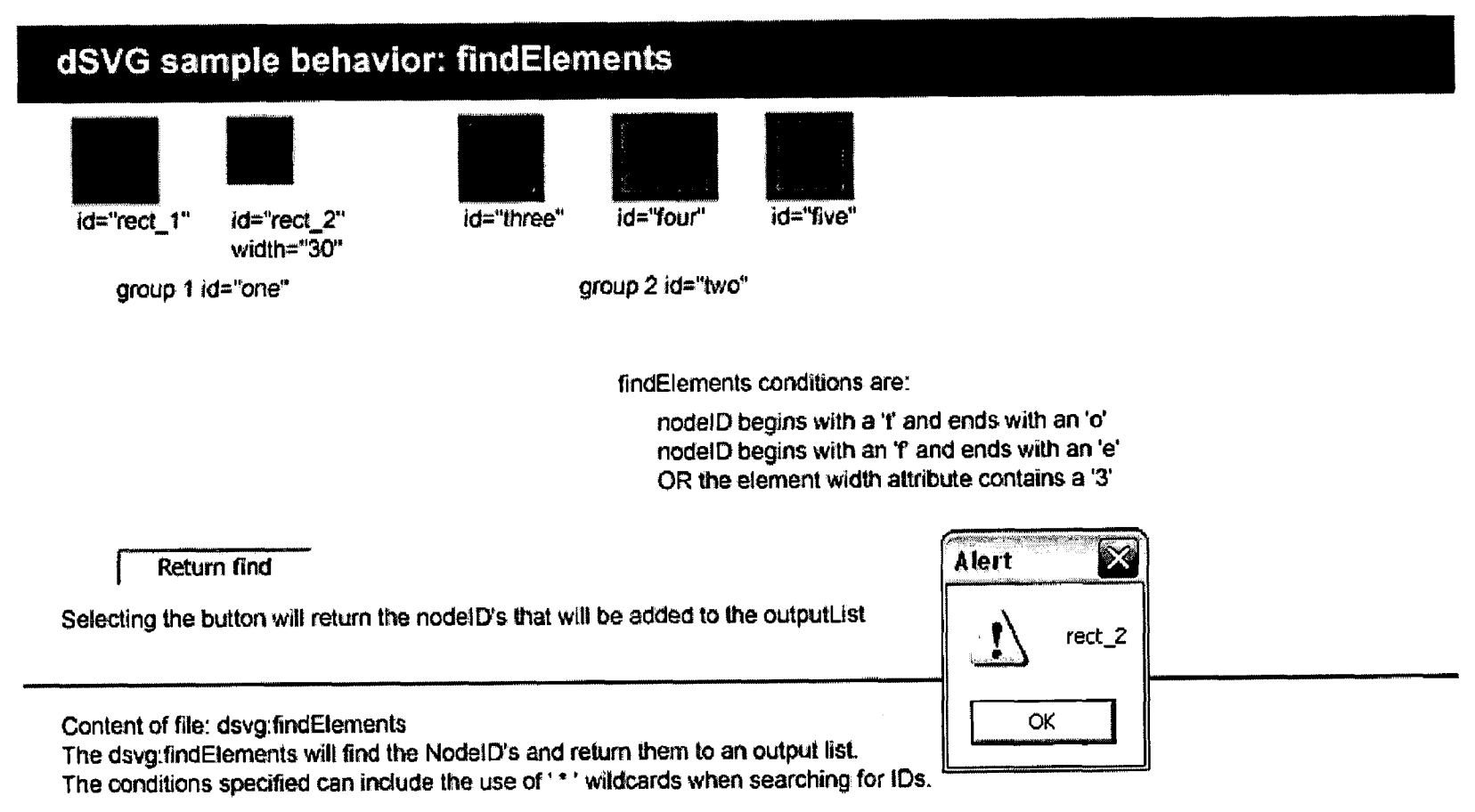

FIG. 14 shows a push button 235 that invokes the 'findElements' behavior, storing the matches in a nodelist, and using the 'loop' element to display the ID's of the nodes via the 'alert' element. In this example, findElement conditions are:
   nodeID begins with a 't' and ends with an 'o'
   nodeID begins with an 'f' and ends with an 'e'
   OR the element width attribute contains a '3'

Selecting the button 235 will invoke the findElements behavior which will wind the nodeID's and return them to an outputList. The conditions specified can include the use of '*' wildcards when searching for Ids. The example is provided below:

```
<?xml version="1.0" standalone="no"?>
<!DOCTYPE svg SYSTEM "../SVGdSVG.dtd">
<svg xmlns:dsvg="http://www.corel.com/schemas/2002/dSVG11"
  xmlns:xlink="http://www.w3.org/1999/xlink" height="410px" width="744px"
  onload="init(evt)" viewBox="0 0 744 410">
    <script type="text/ecmascript" xlink:href="dsvg11/dSVG.js"/>
    <script type="text/ecmascript" xlink:href="dsvg11/baseUI.js"/>
    <script type="text/ecmascript" xlink:href="dsvg11/constraint.js"/>
    <script type="text/ecmascript" xlink:href="dsvg11/alert.js"/>
    <script type="text/ecmascript" xlink:href="dsvg11/findElements.js"/>
    <script type="text/ecmascript" xlink:href="dsvg11/button.js"/>
    <script type="text/ecmascript" xlink:href="dsvg11/loop.js"/>
    <!-- template -->
    <rect height="40" width="744" y="0" x="0" fill="#5f86B1" id="title_rect"/>
    <text y="25" x="20" font-weight="bold" font-size="18" fill="white"
```

-continued

```
id="text_1">dSVG sample behavior: findElements
    </text>
        <text y="365" x="20" font-size="12" id="content">Content of file:
dsvg:findElements
    </text>
        <text y="380" x="20" font-size="12" id="expected">The dsvg:findElements will
find the NodeID's and return them to an output list.
    </text>
        <text y="395" x="20" font-size="12" id="depend">The conditions specified can
include the use of ' * ' wildcards when searching for IDs.
    </text>
        <line y2="340" x2="744" y1="340" x1="0" stroke-width="2" stroke="#5f86B1"
fill="#5f86B1" id="bottom_line"/>
        <!-- Tree structure -->
        <text y="140" x="50" id="text_g1ID">group 1 id="one"
    </text>
        <text y="140" x="290" id="text_g2ID">group 2 id="two"
    </text>
    <g id="one">
        <rect height="40" width="40" y="50" x="30" stroke-width="5"
stroke="darkgreen" fill="green" id="rect_1"/>
        <text y="105" x="30" id="text_rect1">id="rect_1"
        </text>
        <rect height="30" width="30" y="50" x="110" stroke-width="5"
stroke="darkgreen" fill="green" id="rect_2"/>
        <text y="105" x="110" id="text_rect2">id="rect_2"
        </text>
        <text y="120" x="110" id="text_textwidth">width="30"
        </text>
        <g id="two">
            <rect height="40" width="40" y="50" x="230" stroke-width="5"
stroke="darkblue" fill="#5f86B1" id="three"/>
            <text y="105" x="230" id="text_three">id="three"
            </text>
            <rect height="40" width="50" y="50" x="310" stroke-width="5"
stroke="darkblue" fill="#5f86B1" id="four"/>
            <text y="105" x="310" id="text_four">id="four"
            </text>
            <rect height="40" width="40" y="50" x="390" stroke-width="5"
stroke="darkblue" fill="#5f86B1" id="five"/>
            <text y="105" x="390" id="text_five">id="five"
            </text>
        </g>
        <text y="190" x="310" id="condition_title">findElements conditions are:
        </text>
        <text y="210" x="330" id="text_a">nodeID begins with a 't' and ends with
an 'o'
        </text>
        <text y="225" x="330" id="condition_b">nodeID begins with an 'f' and
ends with an 'e'
        </text>
        <text y="240" x="330" id="condition_c">OR the element width attribute
contains a '3'
        </text>
    </g>
    <!-- adding behavior -->
    <dsvg:findElements recursive="true" nodeList="outputList" parentID="one"
id="test">
        <dsvg:or>
            <dsvg:and>
                <dsvg:elementCondition nodeID="t*"/>
                <dsvg:elementCondition nodeID="*o"/>
            </dsvg:and>
            <dsvg:and>
                <dsvg:elementCondition nodeID="f*"/>
                <dsvg:elementCondition nodeID="*e*"/>
            </dsvg:and>
            <dsvg:attributeCondition value="*3*" name="width"/>
        </dsvg:or>
    </dsvg:findElements>
    <dsvg:button xlink:href="dsvg11/skinButton_Windows.svg#skinButton"
autoScale="true" height="18" width="100" y="270" x="50" label="Return find"
id="button_find">
        <dsvg:loop nodeList="outputList" id="LOOP">
            <dsvg:alert message="%LOOP@elementID%"/>
        </dsvg:loop>
    </dsvg:button>
        <text y="310" x="20" id="text_select">Selecting the button will return the
nodeID's that will be added to the outputList
```

```
    </text>
</svg>
<and>
```

The 'and' element is used as a container for the 'elementCondition' and 'attributeCondition' elements, which are used as children of the 'findElements' element to define the search parameters. If all of the conditions defined as children of the 'and' element are met, then the element being analyzed is a match (subject to any other conditions that may also be defined).

```
<!ENTITY % andExt "" >
<!ELEMENT dsvg:and
    (dsvg:elementCondition|dsvg:attributeCondition|dsvg:
        or|dsvg:and)* >
<!ATTLIST dsvg:and
id ID; #IMPLIED>
```

Attribute definitions:
id="name"
    Standard XML attribute for assigning a unique name to an element.

<or>

The 'or' element is used as a container for the 'elementCondition' and 'attributeCondition' elements, which are used as children of the 'findElements' element to define the search parameters. If any of the conditions defined as children of the 'or' element are met, then the element being analyzed is a match (subject to any other conditions that may also be defined).

```
<!ENTITY % orExt "" >
<!ELEMENT dsvg:or
    (dsvg:elementCondition|dsvg:attributeCondition|dsvg:
        or|dsvg:and)* >
<!ATTLIST dsvg:or
id ID; #IMPLIED>
```

Attribute definitions:
id="name"
    Standard XML attribute for assigning a unique name to an element.

<attributeCondition>

The 'attributeCondition' element is used as a child of the 'findElements' element to define the search parameters for the attributes. If the condition is met, then the element being analyzed is a match (subject to any other conditions that may also be defined).

```
<!ENTITY % attributeConditionExt "" >
<!ELEMENT dsvg:attributeCondition EMPTY >
<!ATTLIST dsvg:attributeCondition
id      ID;      #IMPLIED
name    %Text;   #IMPLIED
value   %Text;   #IMPLIED >
```

Attribute definitions:
id="name"
    Standard XML attribute for assigning a unique name to an element.
name='<string>'
    The name of the attribute being evaluated. e.g. 'width'.
value='<string>'
    The value that the specified attribute must have in order to be considered a match.
    This string may include wildcard "*" characters. e.g. name="width" value="*3*" would match all elements whose 'width' attribute contains the digit "3".

<elementCondition>

The 'elementCondition' element is used as a child of the 'findElements' element to define the search parameters for the element ID's. If the condition is met, then the element being analyzed is considered to be a match (subject to any other conditions that may also be defined).

```
<!ENTITY % elementConditionExt "" >
<!ELEMENT dsvg:elementCondition EMPTY >
<!ATTLIST dsvg:elementCondition
id       ID;     #IMPLIED
nodeID   ID;     #IMPLIED >
```

Attribute definitions:
id="name"
    Standard XML attribute for assigning a unique name to an element.
nodeID="name"
    The value that the 'id' attribute must have in order to be considered a match. This string may include wildcard "*" characters. e.g. nodeID="t*" would match all elements whose 'id' attribute begins with the letter "t".

<listener>

Listens for the specified event on the specified observer element and, if found, passes control to the handler element (such as a behavior element 22) or handler function for processing. This is useful because the handler element (which may be an <action> container for many behavior elements 22 to be executed sequentially) is not tied directly to the observer element, thus allowing it to be reused.

```
<listener
    id="string"
    event="string"
    {observer="xpath"|observerFrameID="string"
        observerObjectID="string"  observerDocID="string"
        observerElementID="string"}
    {handler="xpath"|handlerFrameID="string"
        handlerObjectID="string"   handlerDocID="string"
        handlerElementID="string"|handlerFunction="string"}
/>
```

Attributes:
    'id' allows this action element to be referenced later.
    'event' specifies the event on the observer element to listen for.
    'observer' specifies the xpath to the observer element, e.g. the element that gets clicked on. If specified, then observerFrameID, observerObjectID, observerDocID and observerElementID are ignored.
    'observerFrameID' specifies the 'id' attribute of the frame (e.g., an HTML <frame> element) in which to find the observer element. If not provided, the current frame is assumed.

'observerObjectID' specifies the 'id' attribute of the object (e.g., an HTML <object> or <embed> element) in which to find the observer element. If not provided, the current object is assumed.

'observerDocID' specifies the 'id' attribute of the document (e.g., an SVG or XHTML document) in which to find the observer element. If not provided, the current document is assumed.

'observerElementID' specifies the 'id' attribute of the observer element.

'handler' specifies the xpath to the handler element, e.g., the element that gets executed. If specified, then handlerFrameID, handlerObjectID, handlerDocID and handlerElementID are ignored.

'handlerFrameID' specifies the 'id' attribute of the frame (e.g., an HTML <frame> element) in which to find the handler element. If not provided, the current frame is assumed.

'handlerObjectID' specifies the 'id' attribute of the object (e.g., an HTML <object> or <embed> element) in which to find the handler element. If not provided, the current object is assumed.

'handlerDocID' specifies the 'id' attribute of the document (e.g., an SVG or XHTML document) in which to find the handler element. If not provided, the current document is assumed.

'handlerElementID' specifies the 'id' attribute of the handler element.

'handlerFunction' specifies the name of the script function (with any required variables) to be executed.

<loadXML>

The 'loadXML' element loads a document or fragment (an element, possibly with children) and inserts it into the specified location of the DOM or into a new documentFragment (a lightweight document useful for storing XML data of a non-native format).

```
<!ENTITY % loadXMLExt "" >
<!ELEMENT dsvg:loadXML(%Behaviors;) >
<!ATTLIST dsvg:loadXML
%stdBehaviorAttrs;
%XlinkAttrs;
synchronous      %Boolean;      "false"
elementID        ID;            #IMPLIED
insertAs         %InsertAs;     "sibling"
from             %From;         #IMPLIED
offset           %Integer;      #IMPLIED
ignoreText       %Boolean;      'false'
ignoreCData      %Boolean;      'false'
ignoreComments   %Boolean;      'false' >
```

Attribute definitions:

synchronous="(true | false)"
  Specifies whether the XML should be loaded synchronously or asynchronously. If synchronously, the next behavior will not be executed until the XML has successfully loaded. If asynchronously, the next behavior will be executed immediately, without waiting for the XML to be loaded. For best performance, synchronous loading should only be used when subsequent behaviors will be accessing the XML data being loaded.
  If this attribute is not provided, the default is "false".

elementID="name"
  The 'id' attribute of the element where the loaded element will be inserted.

InsertAs="(parent | sibling | child | replacement)"
  Specifies whether the created element is to be inserted as a child of the target element, as the parent of the target element, as a sibling of the target element, or as a replacement to the target element.
  If this attribute is not provided, the default is "child".

offset="<integer>"
  If inserting as a child, 'offset' specifies the number of nodes (not including comment nodes) from the top or bottom where the new element will be inserted. A negative value specifies up towards the first child. A positive value specifies down towards the last child. If there are fewer nodes than specified by 'offset', the element will be inserted as either the first child or the last child.
  If inserting as a sibling, 'offset' specifies the number of nodes (not including comment nodes) before (if 'offset' is negative) or after (if 'offset' is positive) the target element where the new element will be inserted. If there are fewer nodes than specified by 'offset', the element will be inserted as either the first child or the last child of the parent.
  If inserting as a parent or replacement, 'offset' is ignored.
  If this attribute is not provided, the default is zero.

from="(top | bottom)"
  If inserting as a child, 'from' specifies whether 'offset' is relative to the top (first child) or bottom (last child).
  If inserting as a parent, sibling or replacement, 'from' is ignored.
  If this attribute is not provided, the default is "bottom".

ignoreText="(true | false)"
  Specifies whether text nodes should be ignored or not when counting 'offset' nodes from the target element.
  If this attribute is not provided, the default is 'false'.

ignoreCData="(true | false)"
  Specifies whether CDATA nodes should be ignored or not when counting 'offset' nodes from the target element.
  If this attribute is not provided, the default is 'false'.

ignoreComments="(true | false)"
  Specifies whether comment nodes should be ignored or not when counting 'offset' nodes from the target element.
  If this attribute is not provided, the default is 'false'.

Figure 15A:
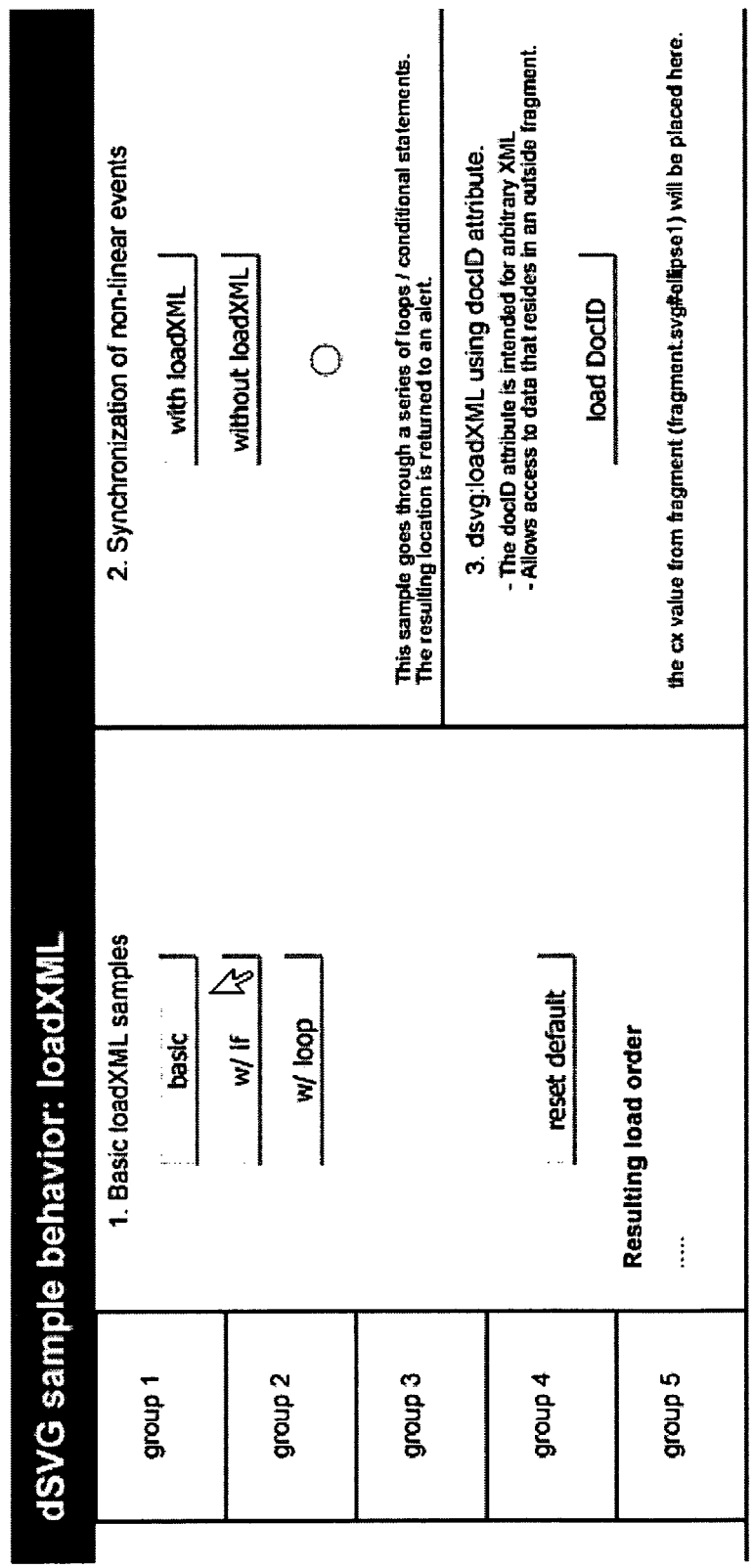
FIGS. 15A and 15B are before and after screen shots of an example of a loadXML element, in accordance with the document object model manipulation system.
Figure 15B:
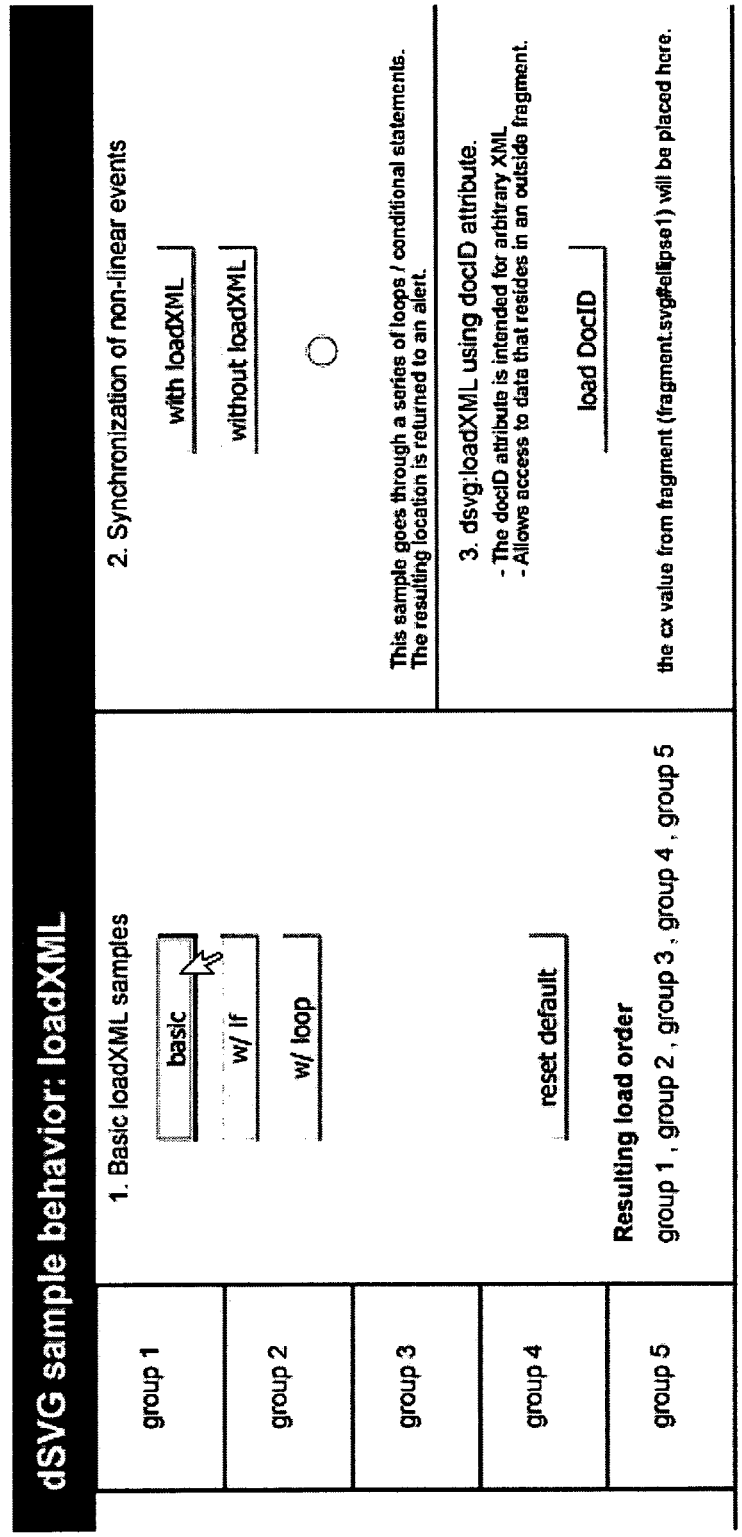

FIGS. 15A and 15B show the basic and advanced uses of the 'loadXML' behavior. Section 1 illustrates basic usage of loadXML. Section 2 illustrates how loadXML can be used synchronously with non-linear events. Section 3 illustrates how the 'docID' attribute can be used to retrieve data from outside document fragments. The example is provided below:

```xml
<?xml version="1.0" standalone="no"?>
<!DOCTYPE svg SYSTEM "../SVGdSVG.dtd">
<svg xmlns:dsvg="http://www.corel.com/schemas/2002/dSVG11"
xmlns:xlink="http://www.w3.org/1999/xlink"
xmlns:vp="http://www.corel.com/schemas/2002/VP" height="410px" width="744px"
onload="init(evt)" viewBox="0 0 744 410">
    <script type="text/ecmascript" xlink:href="dsvg11/dSVG.js"/>
    <script type="text/ecmascript" xlink:href="dsvg11/baseUI.js"/>
    <script type="text/ecmascript" xlink:href="dsvg11/constraint.js"/>
    <script type="text/ecmascript" xlink:href="dsvg11/button.js"/>
    <script type="text/ecmascript" xlink:href="dsvg11/loadXML.js"/>
    <script type="text/ecmascript" xlink:href="dsvg11/setData.js"/>
    <script type="text/ecmascript" xlink:href="dsvg11/setAttribute.js"/>
    <script type="text/ecmascript" xlink:href="dsvg11/if.js"/>
    <script type="text/ecmascript" xlink:href="dsvg11/switch.js"/>
    <script type="text/ecmascript" xlink:href="dsvg11/findElements.js"/>
    <script type="text/ecmascript" xlink:href="dsvg11/loop.js"/>
    <script type="text/ecmascript" xlink:href="dsvg11/alert.js"/>
    <script type="text/ecmascript" xlink:href="dsvg11/setTransform.js"/>
    <script type="text/ecmascript" xlink:href="dsvg11/spinBox.js"/>
```

```xml
<script type="text/ecmascript" xlink:href="dsvg11/textbox.js"/>
<script type="text/ecmascript" xlink:href="dsvg11/setData.js"/>

<!-- Template -->

<g id="template">
    <rect height="40" width="744" y="0" x="0" fill="#5f86B1" id="title_rect"/>
    <text y="25" x="20" font-weight="bold" font-size="18" fill="white" id="text_label">dSVG sample behavior: loadXML
    </text>
    <line y2="350" x2="744" y1="350" x1="0" stroke-width="2" stroke="#5f86B1" fill="#5f86B1" id="bottom_line"/>
    <text y="365" x="20" font-size="12" id="content">Section 1 illustrates basic usage of dsvg:loadXML.
    </text>
    <text y="380" x="20" font-size="12" id="expected">Section 2 illustrates how loadXML can be used synchronously with non-linear events.
    </text>
    <text y="395" x="20" font-size="12" id="expected_2">Section 3 illustrates how the 'docID' attribute can be used to retrieve data from outside document fragments.
    </text>
    <line y2="350" x2="400" y1="40" x1="400" stroke-width="2" stroke="#5f86B1" fill="#5f86B1" id="vert_line"/>
    <line y2="205" x2="744" y1="205" x1="400" stroke-width="2" stroke="#5f86B1" fill="#5f86B1" id="midR_line"/>
</g>
<g transform="translate(-30,0)" id="groups">
    <g id="group_1">
```

```xml
<rect height="62" width="100" y="40" x="50" stroke-width="2" stroke="#5f86B1" fill-opacity=".2" fill="none" id="rect_1"/>
    <text y="70" x="80" id="text_1">group 1
    </text>
</g>
<g id="group_2">
    <rect height="62" width="100" y="102" x="50" stroke-width="2" stroke="#5f86B1" fill-opacity=".2" fill="none" id="rect_2"/>
    <text y="132" x="80" id="text_2">group 2
    </text>
</g>
<g id="group_3">
    <rect height="62" width="100" y="164" x="50" stroke-width="2" stroke="#5f86B1" fill-opacity=".2" fill="none" id="rect_3"/>
    <text y="194" x="80" id="text_3">group 3
    </text>
</g>
<g id="group_4">
    <rect height="62" width="100" y="226" x="50" stroke-width="2" stroke="#5f86B1" fill-opacity=".2" fill="none" id="rect_4"/>
    <text y="256" x="80" id="text_4">group 4
    </text>
</g>
<g id="group_5">
    <rect height="62" width="100" y="288" x="50" stroke-width="2" stroke="#5f86B1" fill-opacity=".2" fill="none" id="rect_5"/>
    <text y="318" x="80" id="text_5">group 5
    </text>
</g>
</g>
```

```xml
<g id="group_text">
    <text y="300" x="140" font-weight="bold" font-size="12" id="text_result_label">Resulting load order
    </text>
    <text y="320" x="140" id="text_result">.....
    </text>
</g>
<g id="group_buttons">
    <dsvg:button xlink:href="dsvg11/skinButton_Windows.svg#skinButton" autoScale="true" height="18" width="100" y="70" x="190" label="basic" id="button_load1">
        <dsvg:loadXML insertAs="replacement" elementID="group_1" synchronous="true" xlink:href="311_loadXML.svg#group_1" id="dsvgUniqueID_a"/>

<dsvg:setData value="%'text_1'@cdata%" elementID="text_result" id="dsvgUniqueID_2"/>
        <dsvg:setAttribute value="#5f86B1" attribute="fill" elementID="rect_1" id="dsvgUniqueID_3"/>
        <dsvg:loadXML insertAs="replacement" elementID="group_2" synchronous="true" xlink:href="311_loadXML.svg#group_2" id="dsvgUniqueID_b"/>

<dsvg:setData value="%'text_1'@cdata, 'text_2'@cdata%" elementID="text_result" id="dsvgUniqueID_2"/>
        <dsvg:setAttribute value="#5f86B1" attribute="fill" elementID="rect_2" id="dsvgUniqueID_3"/>
        <dsvg:loadXML insertAs="replacement" elementID="group_3" synchronous="true" xlink:href="311_loadXML.svg#group_3" id="dsvgUniqueID_1"/>

<dsvg:setData value="%'text_1'@cdata, 'text_2'@cdata, 'text_3'@cdata%" elementID="text_result" id="dsvgUniqueID_2"/>
```

```xml
<dsvg:setAttribute value="#5f86B1" attribute="fill"
elementID="rect_3" id="dsvgUniqueID_3"/>
                <dsvg:loadXML insertAs="replacement" elementID="group_4"
synchronous="true" xlink:href="311_loadXML.svg#group_4" id="dsvgUniqueID_1"/>

<dsvg:setData value="%'text_1'@cdata, 'text_2'@cdata,
'text_3'@cdata, 'text_4'@cdata%" elementID="text_result" id="dsvgUniqueID_2"/>

<dsvg:setAttribute value="#5f86B1" attribute="fill"
elementID="rect_4" id="dsvgUniqueID_3"/>
                <dsvg:loadXML insertAs="replacement" elementID="group_5"
synchronous="true" xlink:href="311_loadXML.svg#group_5" id="dsvgUniqueID_1"/>
                <dsvg:setData value="%'text_1'@cdata, 'text_2'@cdata,
'text_3'@cdata, 'text_4'@cdata, 'text_5'@cdata%" elementID="text_result"
id="dsvgUniqueID_2"/>
                <dsvg:setAttribute value="#5f86B1" attribute="fill"
elementID="rect_5" id="dsvgUniqueID_3"/>
            </dsvg:button>
            <dsvg:button xlink:href="dsvg11/skinButton_Windows.svg#skinButton"
autoScale="true" height="18" width="100" y="100" x="190" label="w/ if"
id="button_load2">
                <dsvg:if value2="none" op="equal" value1="%rect_1@fill%"
id="if_none">
                    <dsvg:loadXML insertAs="replacement"
elementID="group_1" synchronous="true" xlink:href="311_loadXML.svg#group_1"
id="dsvgUniqueID_a"/>
                    <dsvg:setData value="%'text_1'@cdata%"
elementID="text_result" id="dsvgUniqueID_2"/>
                    <dsvg:setAttribute value="red" attribute="fill"
elementID="rect_1" id="dsvgUniqueID_3"/>
```

```
<dsvg:loadXML insertAs="replacement"
elementID="group_2" synchronous="true" xlink:href="311_loadXML.svg#group_2"
id="dsvgUniqueID_b"/>
            <dsvg:setData value="%'text_1'@cdata, 'text_2'@cdata%"
elementID="text_result" id="dsvgUniqueID_2"/>
            <dsvg:setAttribute value="red" attribute="fill"
elementID="rect_2" id="dsvgUniqueID_3"/>
            <dsvg:loadXML insertAs="replacement"
elementID="group_3" synchronous="true" xlink:href="311_loadXML.svg#group_3"
id="dsvgUniqueID_1"/>
            <dsvg:setData value="%'text_1'@cdata, 'text_2'@cdata,
'text_3'@cdata%" elementID="text_result" id="dsvgUniqueID_2"/>
            <dsvg:setAttribute value="red" attribute="fill"
elementID="rect_3" id="dsvgUniqueID_3"/>
            <dsvg:loadXML insertAs="replacement"
elementID="group_4" synchronous="true" xlink:href="311_loadXML.svg#group_4"
id="dsvgUniqueID_1"/>
            <dsvg:setData value="%'text_1'@cdata, 'text_2'@cdata,
'text_3'@cdata, 'text_4'@cdata%" elementID="text_result" id="dsvgUniqueID_2"/>

<dsvg:setAttribute value="red" attribute="fill"
elementID="rect_4" id="dsvgUniqueID_3"/>
            <dsvg:loadXML insertAs="replacement"
elementID="group_5" synchronous="true" xlink:href="311_loadXML.svg#group_5"
id="dsvgUniqueID_1"/>
            <dsvg:setData value="%'text_1'@cdata, 'text_2'@cdata,
'text_3'@cdata, 'text_4'@cdata, 'text_5'@cdata%" elementID="text_result"
id="dsvgUniqueID_2"/>
            <dsvg:setAttribute value="red" attribute="fill"
elementID="rect_5" id="dsvgUniqueID_3"/>
```

```
</dsvg:if>
<dsvg:if value2="#5f86B1" op="equal" value1="%rect_1@fill%" id="if_blue">
    <dsvg:loadXML insertAs="replacement" elementID="group_1" synchronous="true" xlink:href="311_loadXML.svg#group_1" id="dsvgUniqueID_a"/>
    <dsvg:setData value="%'text_1'@cdata%" elementID="text_result" id="dsvgUniqueID_2"/>
    <dsvg:setAttribute value="yellow" attribute="fill" elementID="rect_1" id="dsvgUniqueID_3"/>
    <dsvg:loadXML insertAs="replacement" elementID="group_2" synchronous="true" xlink:href="311_loadXML.svg#group_2" id="dsvgUniqueID_b"/>
    <dsvg:setData value="%'text_1'@cdata, 'text_2'@cdata%" elementID="text_result" id="dsvgUniqueID_2"/>
    <dsvg:setAttribute value="yellow" attribute="fill" elementID="rect_2" id="dsvgUniqueID_3"/>
    <dsvg:loadXML insertAs="replacement" elementID="group_3" synchronous="true" xlink:href="311_loadXML.svg#group_3" id="dsvgUniqueID_1"/>
    <dsvg:setData value="%'text_1'@cdata, 'text_2'@cdata, 'text_3'@cdata%" elementID="text_result" id="dsvgUniqueID_2"/>
    <dsvg:setAttribute value="yellow" attribute="fill" elementID="rect_3" id="dsvgUniqueID_3"/>
    <dsvg:loadXML insertAs="replacement" elementID="group_4" synchronous="true" xlink:href="311_loadXML.svg#group_4" id="dsvgUniqueID_1"/>
    <dsvg:setData value="%'text_1'@cdata, 'text_2'@cdata, 'text_3'@cdata, 'text_4'@cdata%" elementID="text_result" id="dsvgUniqueID_2"/>
```

```
<dsvg:setAttribute value="yellow" attribute="fill"
elementID="rect_4" id="dsvgUniqueID_3"/>
                <dsvg:loadXML insertAs="replacement"
elementID="group_5" synchronous="true" xlink:href="311_loadXML.svg#group_5"
id="dsvgUniqueID_1"/>
                <dsvg:setData value="%'text_1'@cdata, 'text_2'@cdata,
'text_3'@cdata, 'text_4'@cdata, 'text_5'@cdata%" elementID="text_result"
id="dsvgUniqueID_2"/>
                <dsvg:setAttribute value="yellow" attribute="fill"
elementID="rect_5" id="dsvgUniqueID_3"/>
            </dsvg:if>
        </dsvg:button>
        <dsvg:button xlink:href="dsvg11/skinButton_Windows.svg#skinButton"
autoScale="true" height="18" width="100" y="130" x="190" label="w/ loop"
id="button_load3">
            <dsvg:findElements nodeList="group_numbers"
parentID="groups" id="dsvgUniqueID_52">
                <dsvg:elementCondition nodeID="group*"
id="dsvgUniqueID_53"/>
            </dsvg:findElements>
            <dsvg:loop nodeList="group_numbers" id="groupLoop">
                <dsvg:setData value="%groupLoop@elementID%"
elementID="text_result" id="dsvgUniqueID_2"/>
                <dsvg:loadXML insertAs="replacement"
elementID="%groupLoop@elementID%" synchronous="true"
xlink:href="311_loadXML.svg#%groupLoop@elementID%" id="dsvgUniqueID_57"/>
                <dsvg:setAttribute value="blue" attribute="fill"
elementID="%groupLoop@elementID%" id="dsvgUniqueID_56"/>
                <dsvg:setTransform scale="0.8" vAlign="middle"
hAlign="middle" elementID="%groupLoop@elementID%" id="dsvgUniqueID_57"/>
```

```
            </dsvg:loop>
        </dsvg:button>
        <dsvg:button xlink:href="dsvg11/skinButton_Windows.svg#skinButton"
autoScale="true" height="18" width="100" y="250" x="190" label="reset default"
id="button_reset">
            <dsvg:findElements recursive="true" nodeList="group_numbers"
parentID="groups" id="find_rect">
                <dsvg:elementCondition nodeID="group*"
id="dsvgUniqueID_60"/>
            </dsvg:findElements>
            <dsvg:loop nodeList="group_numbers" id="loopGroup">
                <dsvg:loadXML insertAs="replacement"
elementID="%loopGroup@elementID%" synchronous="true"
xlink:href="311_loadXML.svg#%loopGroup@elementID%" id="dsvgUniqueID_61"/>

<dsvg:setData value="......" elementID="text_result"
id="dsvgUniqueID_2"/>
            </dsvg:loop>
        </dsvg:button>
        <text y="55" x="160" id="button_label">1. Basic loadXML samples
        </text>
    </g>

<!-- Testing w and w/out loadXML -->

<g id="w_wOut">
        <text y="55" x="470" id="sync_text">2. Synchronization of non-linear
events</text>
        <text y="190" x="420" font-size="10" id="sync_text">This sample goes
through a series of loops / conditional statements.</text>
```

```
            <text y="200" x="420" font-size="10" id="sync_text">The resulting
location is returned to an alert.</text>
            <g id="calData">
                <text id="A">1st value</text>
                <text id="B">2nd value</text>
            </g>
            <g id="calendar1">
                <circle id="circ" r="7" cy="150" cx="575" stroke="#5f86B1" fill="none"/>
            </g>
            <dsvg:button dsvg:share="shareFind" xlink:href="dsvg11/skinButton_Windows.svg#skinButton" autoScale="true" height="18" width="100" y="70" x="525" label="with loadXML" id="bmjan">
                <dsvg:setAttribute value="visible" attribute="visibility" elementID="pleaseWaitBox" id="dsvgUniqueID_54"/>
                <dsvg:loadXML insertAs="replacement" elementID="calendar1" synchronous="true" xlink:href="load_sample.svg#ListIcon1" id="dsvgUniqueID_36b"/>
                <dsvg:setAttribute value="hidden" attribute="visibility" elementID="pleaseWaitBox" id="dsvgUniqueID_55"/>
                <dsvg:setAttribute value="calendar1" attribute="id" elementID="ListIcon1" id="foo1"/>
            </dsvg:button>
            <dsvg:button dsvg:share="shareFind" xlink:href="dsvg11/skinButton_Windows.svg#skinButton" autoScale="true" height="18" width="100" y="100" x="525" label="without loadXML" id="bmjanb">
                <dsvg:setAttribute value="visible" attribute="visibility" elementID="pleaseWaitBox" id="dsvgUniqueID_54b"/>
                <dsvg:setAttribute value="hidden" attribute="visibility" elementID="pleaseWaitBox" id="dsvgUniqueID_55b"/>
            </dsvg:button>
```

```
                <dsvg:share id="shareFind">
                        <dsvg:findElements nodeList="calItems" parentID="calData"
id="dsvgUniqueID_99">
                                <dsvg:elementCondition nodeID="*"
id="dsvgUniqueID_100"/>
                        </dsvg:findElements>
                        <dsvg:loop increment="1" to="1" from="0" id="calItemsLoop">
                                <dsvg:alert message="alert1:%calItemsLoop@value + '"
id="dsvgUniqueID_1b"/>
                                <dsvg:loadXML insertAs="replacement"
elementID="calendar1" synchronous="true" xlink:href="load_sample.svg#ListIcon2"
id="dsvgUniqueID_36extra"/>
                                <dsvg:setAttribute value="calendar1" attribute="id"
elementID="ListIcon2" id="foo2"/>
                                <dsvg:if value2="a" op="equal" value1="a"
id="dsvgUniqueID_2b">
                                        <dsvg:alert message="alert2:%calItemsLoop@value
+ '%" id="dsvgUniqueID_3b"/>
                                </dsvg:if>
                                <dsvg:loop increment="1" to="2" from="0" id="test">

<dsvg:alert message="alert3:%test@value + '%"
id="dsvgUniqueID_1c"/>
                                        <dsvg:loadXML insertAs="replacement"
elementID="calendar1" synchronous="true" xlink:href="load_sample.svg#ListIcon3"
id="dsvgUniqueID_36extraextra"/>

<dsvg:setAttribute value="calendar1" attribute="id"
elementID="ListIcon1" id="foo3"/>
```

```
                    <dsvg:if value2="a" op="equal" value1="a"
id="dsvgUniqueID_2c">
                        <dsvg:alert message="alert4:%test@value +
'%" id="dsvgUniqueID_3c"/>
                    </dsvg:if>
                    <dsvg:loop nodeList="calItems" id="byEl">

<dsvg:alert
message="alert_item:%byEl@elementID%" id="fooal"/>
                    </dsvg:loop>
                </dsvg:loop>

<dsvg:if value2="b" op="equal" value1="b"
id="dsvgUniqueID_2b">
                    <dsvg:alert message="alert5:%calItemsLoop@value
+ '%" id="dsvgUniqueID_3b"/>
                </dsvg:if>
            </dsvg:loop>

</dsvg:share>
        <g id="groupDocID">
            <text y="225" x="575" text-anchor="middle" id="sync_text">3.
dsvg:loadXML using docID attribute.</text>
            <text y="240" x="465" font-size="10" id="sync_texta">- The
docID attribute is intended for arbitrary XML</text>
            <text y="250" x="465" font-size="10" id="sync_textb">- Allows
access to data that resides in an outside fragment.</text>
            <dsvg:button
xlink:href="dsvg11/skinButton_Windows.svg#skinButton" autoScale="true" height="18"
width="100" y="270" x="525" label="load DocID" id="buttonDocID">
```

```
                <dsvg:loadXML docID="frag" synchronous="true"
xlink:href="fragment.svg" id="dsvgUniqueID_1" />
                <dsvg:setData elementID="sync_text2" value="The 'cx'
value for the ellipse within fragment.svg is: %frag.fragellipse1@cx%"
id="dsvgUniqueID_0"/>
            </dsvg:button>
            <text y="320" x="575" font-size="10" text-anchor="middle"
id="sync_textc">the cx value from fragment (fragment.svg#ellipse1) will be placed
here.</text>
            <text y="340" x="575" text-anchor="middle" font-weight="bold"
font-size="10" fill="#5f86B1" id="sync_text2"></text>
        </g>
        <g visibility="hidden" id="pleaseWaitBox">
            <rect height="75" width="216" y="167.5" x="457"
stroke-width="1.5" stroke="#222222" fill="white"/>
            <rect height="75" width="216" y="166.5" x="456"
stroke-width="1.5" stroke="#999999" fill="white"/>
            <rect height="65" width="206" y="170" x="461"
fill="#5D80D5"/>
            <text startOffset="0" y="205" x="525" text-anchor="center"
font-weight="bold" font-size="16" font-family="verdana" fill="WHITE">Loading...
            </text>
        </g>
    </g>
</svg>
```

<modifyEvent>

Modifies whatever event triggered this action-element and dispatches (sends) it to the desired target.

<modifyEvent

\<modifyEvent\>
Modifies whatever event triggered this action-element and dispatches (sends) it to the desired target.
\<modifyEvent
   id="string"
   event="string"
   eventName="string"
   {source="xpath"|sourceFrameID="string"
     sourceObjectID="string"     sourceDocID="string"
     sourceElementID="string"}
   {target="xpath"|targetFrameID="string"
     targetObjectID="string"     targetDocID="string"
     targetElementID="string"}
   eventPhase="string"
   bubbles="{true|false}"
   cancelable="{true|false}"
   timeStamp="string"
   stopPropagation="{true|false}"
   preventDefault="{true|false}"
/\>

Attributes:
   'id' allows this action element to be referenced later.
   'event' specifies the event that triggers this action.
   'eventName' specifies the type of the event, e.g. mouseover. Note that only events that are supported by the software (e.g., the SVG Viewer) can be created.
   'source' specifies the xpath to the element that the target will "think" created the event. If not specified, and sourceElementID is also not specified, the source will be the \<createElement\> itself. If specified, then sourceFrameID, sourceObjectID, sourceDocID and sourceElementID are ignored.
   'sourceFrameID' specifies the 'id' attribute of the frame (e.g., an HTML \<frame\> element) in which to find the element that the target will "think" created the event. If not provided, the current frame is assumed. If 'source' is provided, this attribute is ignored.
   'sourceObjectID' specifies the 'id' attribute of the object (e.g., an HTML \<object\> or \<embed\> element) in which to find the element that the target will "think" created the event. If not provided, the current object is assumed. If 'source' is provided, this attribute is ignored.
   'sourceDocID' specifies the 'id' attribute of the document (e.g., an SVG or XHTML document) in which to find the element that the target will "think" created the event. If not provided, the current document is assumed. If 'source' is provided, this attribute is ignored.
   'sourceElementID' specifies the 'id' attribute of the element_that the target will "think" created the event. If 'source' is provided, this attribute is ignored.
   'target' specifies the xpath to the element that the event is being dispatched to. If specified, then targetFrameID, targetObjectID, targetDocID and targetElementID are ignored.
   'targetFrameID' specifies the 'id' attribute of the frame (e.g., an HTML \<frame\> element) in which to find the element that the event is being dispatched to. If not provided, the current frame is assumed. If 'source' is provided, this attribute is ignored.
   'targetObjectID' specifies the 'id' attribute of the object (e.g., an HTML \<object\> or \<embed\> element) in which to find the element that the event is being dispatched to. If not provided, the current object is assumed. If 'source' is provided, this attribute is ignored.
   'targetDocID' specifies the 'id' attribute of the document (e.g., an SVG or XHTML document) in which to find the element that the event is being dispatched to. If not provided, the current document is assumed. If 'source' is provided, this attribute is ignored.
   'targetElementID' specifies the 'id' attribute of the element that the event is being dispatched to. If 'source' is provided, this attribute is ignored.
   'eventPhase' specifies which phase of event flow is currently being evaluated.
   'bubbles' specifies whether the event can bubble (true) or not (false).
   'cancelable' specifies whether the event can have its default actions prevented (true) or not (false).
   'timeStamp' specifies the time (in milliseconds since the epoch) at which the event was created. If not supplied, the current system time is used. If not available, zero is used. Examples of epoch time are the time of the system start or 0:0:0 UTC 1 Jan. 1970.
   'stopPropagation' prevents further propagation of an event during event flow. If true, the event will complete its dispatch to all listeners and then cease propagating through the tree.
   'preventDefault' specifies (if true) that the event is to be cancelled, so that any default action normally taken by the implementation as a result of the event will not occur. This has no effect, however, on non-cancelable events, i.e., it has no effect if 'cancelable' is false.

\<moveElement\>
The 'moveElement' element moves an existing element to a specified location in the DOM.

```
<!ENTITY % moveElementExt "" >
<!ELEMENT dsvg:moveElement ANY >
<!ATTLIST dsvg:move Element
%stdBehaviorAttrs;
sourceElementID    ID;            #IMPLIED
targetElementID    ID;            #IMPLIED
insertAs           %InsertAs;     child
offset             %Integer;      #IMPLIED
from               %From;         #IMPLIED
ignoreText         %Boolean;      'false'
ignoreCData        %Boolean;      'false'
ignoreComments     %Boolean;      'false' >
```

Attribute definitions:
sourceElementID="name"
   The 'id' attribute of the element to be moved.
targetElementID="name"
   The 'id' attribute of the target element where the moved element will be inserted.
insertAs="(parent | sibling | child | replacement)"
   Specifies whether the moved element is to be inserted as a child of the target element, as the parent of the target element, as a sibling of the target element, or as a replacement to the target element.
   If this attribute is not provided, the default is "child".
offset="\<integer\>"
   If inserting as a child, 'offset' specifies the number of nodes (not including comment nodes) from the top or bottom where the new element will be inserted. A negative value specifies up towards the first child. A positive value specifies down towards the last child. If there are fewer nodes than specified by 'offset', the element will be inserted as either the first child or the last child.
   If inserting as a sibling, 'offset' specifies the number of nodes (not including comment nodes) before (if 'offset' is negative) or after (if 'offset' is positive) the target element where the new element will be inserted. If there are fewer nodes than specified by 'offset', the element will be inserted as either the first child or the last child of the parent.

If inserting as a parent or replacement, 'offset' is ignored.

If this attribute is not provided, the default is zero.

offset="(top | bottom)"

If inserting as a child, 'from' specifies whether 'offset' is relative to the top (first child) or bottom (last child).

If inserting as a parent, sibling or replacement, 'from' is ignored.

If this attribute is not provided, the default is "bottom".

ignoreText="(true | false)"

Specifies whether text nodes should be ignored or not when counting 'offset' nodes from the target element.

If this attribute is not provided, the default is 'false'.

ignoreCData="(true | false)"

Specifies whether CDATA nodes should be ignored or not when counting 'offset' nodes from the target element.

If this attribute is not provided, the default is 'false'.

ignoreComments="(true | false)"

Specifies whether comment nodes should be ignored or not when counting 'offset' nodes from the target element.

If this attribute is not provided, the default is 'false'.

Figure 16:
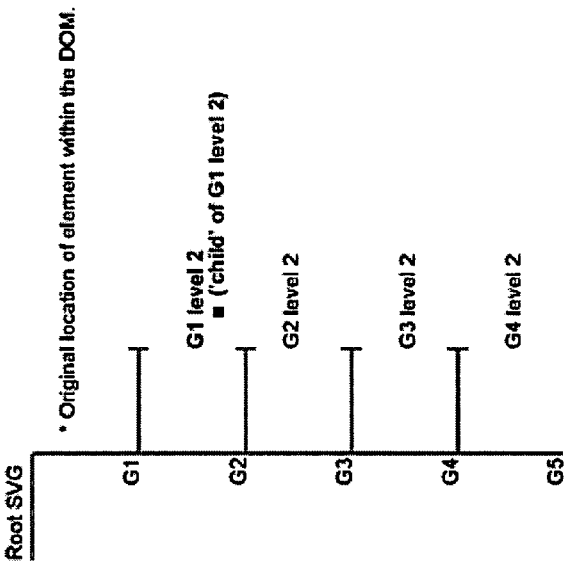
FIG. 16 is a screen shot of an example of a printElement element, in accordance with the document object model manipulation system.

FIG. 16 shows radioButtons 250 that invoke different 'moveElement' behaviors. The moveElement will move the source element to a specified target location within the DOM. The rectangle within the chart will track the location where the element is being inserted. The example is provided below:

```
<?xml version="1.0" standalone="no"?>
<!DOCTYPE svg SYSTEM "../SVGdSVG.dtd">
<svg xmlns:dsvg="http://www.corel.com/schemas/2002/dSVG11"
xmlns:xlink="http://www.w3.org/1999/xlink" height="410px" width="744px"
onload="init(evt)" viewBox="0 0 744 410">
    <script type="text/ecmascript" xlink:href="dsvg11/dSVG.js"/>
    <script type="text/ecmascript" xlink:href="dsvg11/baseUI.js"/>
    <script type="text/ecmascript" xlink:href="dsvg11/constraint.js"/>
    <script type="text/ecmascript" xlink:href="dsvg11/moveElement.js"/>
    <script type="text/ecmascript" xlink:href="dsvg11/button.js"/>
    <script type="text/ecmascript" xlink:href="dsvg11/setAttribute.js"/>
    <script type="text/ecmascript" xlink:href="dsvg11/if.js"/>
    <script type="text/ecmascript" xlink:href="dsvg11/alert.js"/>
    <!-- template -->
    <rect height="40" width="744" y="0" x="0" fill="#5f86B1" id="title_rect"/>
    <text y="25" x="20" font-weight="bold" font-size="18" fill="white"
id="text_title">dSVG sample behavior: moveElement
    </text>
    <text y="365" x="20" font-size="12" id="content">Content of file:
dsvg:moveElement
    </text>
    <text y="380" x="20" font-size="12" id="expected">The dsvg:moveElement will
move the source element to a specified target location within the DOM.
    </text>
    <text y="395" x="20" font-size="12" id="depend">The rectangle within the chart
will track the location where the element is being inserted.
    </text>
    <line y2="340" x2="744" y1="340" x1="0" stroke-width="2" stroke="#5f86B1"
fill="#5f86B1" id="bottom_line"/>
    <!-- adding chart -->
    <g id="chart">
        <text y="65" x="400" font-size="10" id="g1">Root SVG
        </text>
        <line y2="320" x2="450" y1="70" x1="450" stroke="black"
id="tree_vert2"/>
        <line y2="70" x2="400" y1="70" x1="450" stroke="black"
id="svg_horz"/>
        <line y2="120" x2="450" y1="120" x1="500" stroke="black"
id="_horz"/>
        <text y="120" x="435" font-size="10" id="g1_text">G1
        </text>
        <text y="160" x="525" visibility="hidden" font-weight="bold"
font-size="10" fill="blue" id="g1_level1text">('child' of G1 level 2)
        </text>
        <text y="150" x="500" visibility="visible" font-weight="bold"
font-size="10" fill="black" id="g1_level2text">G1 level 2
        </text>
        <line y2="125" x2="500" y1="115" x1="500" stroke="black"
id="g1_marker1"/>
        <line y2="170" x2="450" y1="170" x1="500" stroke="black"
id="g2_horz"/>
        <text y="170" x="435" font-size="10" id="g2_text">G2
        </text>
        <text y="195" x="500" font-size="10" id="g2_level2text">G2 level 2
        </text>
        <text y="205" x="500" visibility="hidden" font-weight="bold"
font-size="10" fill="green" id="g2_level2textsibling">('sibling' of G2 level 2)
        </text>
        <line y2="165" x2="500" y1="175" x1="500" stroke="black"
```

-continued

```
id="g2_marker1"/>
        <line y2="220" x2="450" y1="220" x1="500" stroke="black"
id="g3_horz"/>
        <text y="220" x="435" font-size="10" id="g3_text">G3
        </text>
        <text y="240" x="475" visibility="hidden" font-weight="bold"
font-size="10" fill="orange" id="g3_level2text2a">('parent' of G3 level 2)
        </text>
        <text y="250" x="500" font-size="10" id="g3_level2text2b">G3 level 2
        </text>
        <line y2="215" x2="500" y1="225" x1="500" stroke="black"
id="g3_marker1"/>
        <line y2="270" x2="450" y1="270" x1="500" stroke="black"
id="g4_horz"/>
        <text y="270" x="435" font-size="10" id="g4_text">G4
        </text>
        <text y="300" x="500" font-size="10" id="g4_level2text">G4 level 2
        </text>
        <text y="320" x="435" font-size="10" id="g5_textNode">G5
        </text>
        <text y="285" x="450" visibility="hidden" font-weight="bold"
font-size="10" fill="red" id="g4_replacetext">('replacement' of G4)
        </text>
        <line y2="275" x2="500" y1="265" x1="500" stroke="black"
id="g4_marker1"/>
    </g>
    <rect height="5" width="5" y="85" x="440" id="rect_1"/>
    <text y="90" x="460" font-size="10" id="g5_text">* Original location of element
within the DOM.
    </text>
    <g id="sampleGroup"/>
    <g id="group1">
        <g id="group1_level2"/>
    </g>
    <g id="group2">
        <g id="group2_level2"/>
    </g>
    <g id="group3">
        <g id="group3_level2">
            <g id="group3_level3a"/>
            <g id="group3_level3b">
                <rect height="5" width="5" y="265" x="515"
visibility="hidden" fill="orange" id="rect_2"/>
            </g>
        </g>
    </g>
    <g id="group4"/>
    <g id="group5"/>
    <!-- adding behavior -->
    <g id="radioGroup">
        <dsvg:radioButton
xlink:href="dsvg11/skinRadioButton_Default.svg#skinRadioButton" autoScale="true"
group="default" height="14" width="14" y="110" x="100" label="moveElement: child"
id="rb_child">
            <dsvg:if value2="true" op="equal"
value1="%rb_child@selected%" id="dsvgUniqueID_33">
                <dsvg:moveElement from="top" offset="1"
insertAs="child" targetElementID="group1_level2" sourceElementID="sampleGroup"
event="onclick"/>
                <dsvg:setAttribute value="blue" attribute="fill"
elementID="rect_1" id="set_fill"/>
                <dsvg:setAttribute value="515" attribute="x"
elementID="rect_1" id="set_x"/>
                <dsvg:setAttribute value="155" attribute="y"
elementID="rect_1" id="set_y"/>
                <dsvg:setAttribute value="visible" attribute="visibility"
elementID="g1_level1text" id="set_text"/>
            </dsvg:if>
        </dsvg:radioButton>
        <dsvg:radioButton
xlink:href="dsvg11/skinRadioButton_Default.svg#skinRadioButton" autoScale="true"
group="default" height="14" width="14" y="150" x="100" label="moveElement:
sibling" id="rb_sibling">
            <dsvg:if value2="true" op="equal"
value1="%rb_sibling@selected%" id="dsvgUniqueID_39">
                <dsvg:moveElement from="top" offset="1"
insertAs="sibling" targetElementID="group2_level2" sourceElementID="sampleGroup"
event="onclick"/>
                <dsvg:setAttribute value="green" attribute="fill"
```

-continued

```
elementID="rect_1" id="set_fill"/>
                <dsvg:setAttribute value="490" attribute="x"
elementID="rect_1" id="set_x"/>
                <dsvg:setAttribute value="200" attribute="y"
elementID="rect_1" id="set_y"/>
                <dsvg:setAttribute value="visible" attribute="visibility"
elementID="g2_level2textsibling" id="set_text"/>
            </dsvg:if>
        </dsvg:radioButton>
        <dsvg:radioButton
xlink:href="dsvg11/skinRadioButton_Default.svg#skinRadioButttton" autoScale="true"
group="default" height="14" width="14" y="190" x="100" label="moveElement: parent"
id="rb_parent">
            <dsvg:if value2="true" op="equal"
value1="%rb_parent@selected%" id="dsvgUniqueID_40">
                <dsvg:moveElement insertAs="parent"
targetElementID="group3_level2" sourceElementID="sampleGroup" event="onclick"/>
                <dsvg:setAttribute value="orange" attribute="fill"
elementID="rect_1" id="set_fill"/>
                <dsvg:setAttribute value="465" attribute="x"
elementID="rect_1" id="set_x"/>
                <dsvg:setAttribute value="235" attribute="y"
elementID="rect_1" id="set_y"/>
                <dsvg:setAttribute value="visible" attribute="visibility"
elementID="g3_level2text2a" id="set_text"/>
            </dsvg:if>
        </dsvg:radioButton>
        <dsvg:radioButton
xlink:href="dsvg11/skinRadioButton_Default.svg#skinRadioButton" autoScale="true"
group="default" height="14" width="14" y="230" x="100" label="moveElement:
replacement" id="rb_replace">
            <dsvg:if value2="true" op="equal"
value1="%rb_replace@selected%" id="dsvgUniqueID_41">
                <dsvg:moveElement insertAs="replacement"
targetElementID="group4" sourceElementID="sampleGroup" event="onclick"/>
                <dsvg:setAttribute value="red" attribute="fill"
elementID="rect_1" id="set_fill"/>
                <dsvg:setAttribute value="440" attribute="x"
elementID="rect_1" id="set_x"/>
                <dsvg:setAttribute value="265" attribute="y"
elementID="rect_1" id="set_y"/>
                <dsvg:setAttribute value="visible" attribute="visibility"
elementID="g4_replacetext" id="set_text"/>
                <dsvg:setAttribute value="hidden" attribute="visibility"
elementID="g4_text" id="set_text"/>
                <dsvg:setAttribute value="hidden" attribute="visibility"
elementID="g4_level1text" id="set_text"/>
                <dsvg:setAttribute value="hidden" attribute="visibility"
elementID="g4_level2text" id="set_text"/>
            </dsvg:if>
        </dsvg:radioButton>
        <text y="70" x="50" font-size="12" id="text_dom">
        Select radio buttons to move element within the DOM.
        </text>
        <text y ="320" x="50" font-size="12" id="text_illustrate">*Note: The
        chart on the right illustrates the corresponding DOM.
        </text>
    </g>
</svg>
```

<parseXML>

Parses a string (text) containing valid XML data (a fragment or a full document) and from it, either inserts the fragment in the DOM or creates a full document.

```
<parseXML
  id="string"
  event="string"
  string="string"
  {target="xpath" | frameID="string" objectID="string" docID="string"
elementID="string"}
  insertAs="{child | parent | sibling | replacement}"
  offset="signed integer"
```

-continued

```
  from="{top | bottom}"
  preserveTargetChildren="{true | false}"
  preserveTargetEvents="{true | false}"
  preserveTargetAttributes="{all | none | attr1;attr2;...attrN}"
/>
```

Attributes:

'id' allows this action element to be referenced later.

'event' specifies the event that triggers this action.

'string' is the text containing the valid XML data.

'target' is the xpath pointing to wherever the fragment or document is to be placed. If provided, 'frameID', 'objectID', 'docID' and 'elementID' are ignored.

'frameID' specifies the 'id' attribute of the frame (e.g., an HTML <frame> element) in which to place the new fragment or document. If not provided, the current frame is assumed. If 'target' is provided, this attribute is ignored.

'objectID' specifies the 'id' attribute of the object (e.g., an HTML <object> or <embed> element) in which to place the new fragment or document. If not provided, the current object is assumed. If 'target' is provided, this attribute is ignored.

'docID' specifies the 'id' attribute of the document (e.g., an SVG or XHTML document) or documentFragment in which to place the new fragment or document. If not provided, the current document is assumed. If 'target' is provided, this attribute is ignored. Note that if the XML data being loaded is of a different grammar than the current document, inserting it into the current document could cause problems, depending on what the XML Viewer allows. It is safer to provide a 'docID', which will be the ID of the documentFragment used to store this XML data. The data can then be referenced by any other behavior element 22, such as <setAttribute>, as described above.

'elementID' specifies the 'id' attribute of the element at which to insert the new fragment. If 'target' is provided, this attribute is ignored. If an entire document is being loaded, this attribute will be ignored.

'insertAs' specifies whether the new fragment is to be inserted as a child of the target element (the default), as the parent of the target element or as a sibling of the target element. If an entire document is being loaded or if 'docID' exists but 'elementID' does not, 'insertAs' is set to "replacement", which causes any document or documentFragment with an ID of 'docID' to be replaced with the new document or, if no such document exists, causes a new documentFragment to be created with an ID of 'docID'.

If inserting as a child:

'offset' specifies the number of nodes (not including comment nodes) from the top or bottom at which to insert the new fragment. A negative value specifies up towards the first child. A positive value specifies down towards the last child. If there are fewer nodes than specified by 'offset', the fragment will be inserted as either the first child or the last child. If an entire document is being loaded, or if 'docID' exists but 'elementID' does not, this attribute is ignored.

'from' specifies whether 'offset' is relative to the top (first child) or bottom (last child). If an entire document is being loaded, or if 'docID' exists but 'elementID' does not, this attribute is ignored.

'preserveTargetChildren', 'preserveTargetEvents' and 'preserveTargetAttributes' are ignored.

If inserting as the parent:

'offset' is ignored.

'from' is ignored.

'preserveTargetChildren', 'preserveTargetEvents' and 'preserveTargetAttributes' are ignored.

If inserting as a sibling:

'offset' specifies the number of nodes (not including comment nodes) before (if 'offset' is negative) or after (if 'offset' is positive) the target element at which to insert the new element. If there are fewer nodes than specified by 'offset', the element will be inserted as either the first child or the last child of the parent. If an entire document is being loaded, or if 'docID' exists but 'elementID' does not, this attribute is ignored.

'from' is ignored.

'preserveTargetChildren', 'preserveTargetEvents' and 'preserveTargetAttributes' are ignored.

If inserting as a replacement (to an element, not to a document or documentFragment), in which the target element is removed and replaced:

'preserveTargetChildren' specifies whether to copy the target element's children (true) or not (false).

'preserveTargetEvents' specifies whether to copy the target element's events (e.g., onmouseover) (true) or not (false).

'preserveTargetAttributes' specifies that all of the target element's attributes, none of them, or a list of specific attributes should be copied.

<printElement>

The 'printElement' element loads a document or fragment (an element, possibly with children) and inserts it into the specified location of the DOM or into a new documentFragment (a lightweight document useful for storing XML data of a non-native format).

```
<!ENTITY % printElementExt "" >
<!ELEMENT dsvg:printElement     (%Behaviors;) >
<!ATTLIST dsvg:printElement
%stdBehaviorAttrs;
elementID           ID;             #IMPLIED
insertLineBreaks    %Boolean;       "false"
string              %Text;          #IMPLIED >
```

Attribute definitions:

elementID="name"

The 'id' attribute of the element to be converted to text. All children of the element will also be converted to text.

insertLineBreaks="(true | false)"

Specifies whether each element should have a line break character placed after it (true) or not (false).

If this attribute is not provided, the default is "false".

string='<string>'

The attribute used for storing the target element(s) after being converted to text format.

The printElement example below shows a circle that, when clicked on, converts the 'circle' element and its children to text and displays it.

```
<script type="text/ecmascript" xlink:href="dsvg11/dSVG.js"/>
<script type="text/ecmascript" xlink:href="dsvg11/baseUI.js"/>
<script type="text/ecmascript" xlink:href="dsvg11/constraint.js"/>
<script type="text/ecmascript" xlink:href="dsvg11/printElement.js"/>
<script type="text/ecmascript" xlink:href="dsvg11/setData.js"/>
```

-continued

```
<!-- template -->
<rect height="40" width="744" y="0" x="0" fill="#5f86B1" id="title_rect"/>
<text y="25" x="20" font-weight="bold" font-size="18" fill="white"
id="text_1">dSVG sample behavior: printElement
</text>
<text y="365" x="20" font-size="12" id="content">Content of file:
dsvg:printElement
</text>
<text y="380" x="20" font-size="12" id="expected">The dsvg:printElement will print
the specified target node.
</text>
<text y="395" x="20" font-size="12" id="depend"/>
<line y2="340" x2="744" y1="340" x1="0" stroke-width="2" stroke="#5f86B1"
fill="#5f86B1" id="bottom_line"/>
<!-- adding behavior -->
<text y="70" x="40" font-size="12" style="" id="text_dir">Click the circle to
print the selected node.
</text>
<circle r="50" cy="150" cx="150" stroke-width="5" stroke="black"
fill="#5f86B1" id="myCircle">
    <dsvg:printElement insertLineBreaks="true" elementID="myCircle"
event="onclick" id="markup"/>
    <dsvg:setData value="%markup@string%" elementID="textMarkup"
event="onclick"/>
</circle>
<text y="220" x="5" font-size="10" id="textMarkup">
</text>
</svg>
```

<removeAttribute>

Removes the specified attribute from the target element, which is different from setting the attribute to an empty string (""). Equivalent to <setAttribute> with the modify="remove" attribute.

```
<removeAttribute
    id="string"
    event="string"
    {target="xpath" | frameID="string" objectID="string" docID="string"}
    name="string"
    ns="string"
/>
```

Attributes:
- 'id' allows this action element to be referenced later.
- 'event' specifies the event that triggers this action.
- 'target' is the xpath pointing to the location of the element whose attribute is to be removed. If provided, 'frameID', 'objectID', 'docID' and 'elementID' are ignored.
- 'frameID' specifies the 'id' attribute of the frame (e.g., an HTML <frame> element) in which to find the element whose attribute is to be removed. If not provided, the current frame is assumed. If 'target' is provided, this attribute is ignored.
- 'objectID' specifies the 'id' attribute of the object (e.g., an HTML <object> or <embed> element) in which to find the element whose attribute is to be removed. If not provided, the current object is assumed. If 'target' is provided, this attribute is ignored.
- 'docID' specifies the 'id' attribute of the document (e.g., an SVG or XHTML document) in which to find the element whose attribute is to be removed. If not provided, the current document is assumed. If 'target' is provided, this attribute is ignored.
- 'elementID' specifies the 'id' attribute of the element whose attribute is to be removed. If 'target' is provided, this attribute is ignored.
- 'name' specifies the name of the attribute to be removed.
- 'ns' specifies the namespace of the attribute to be removed. The namespace is prefixed to the attribute name, separated by a colon.

<removeClass>

Removes the specified CSS rule from the 'class' attribute for the target element. Equivalent to <setClass> with the modify="remove" attribute.

```
id="string"
event="string"
{target="xpath" | frameID="string" objectID="string" docID="string"
elementID="string"}
cssName="string"
/>
```

Attributes:
- 'id' allows this action element to be referenced later.
- 'event' specifies the event that triggers this action.
- 'target' is the xpath pointing to the location of the element whose 'class' attribute is to have the CSS rule removed. If provided, 'frameID', 'objectID', 'docID' and 'elementID' are ignored.
- 'frameID' specifies the 'id' attribute of the frame (e.g., an HTML <frame> element) in which to find the element whose 'class' attribute is to have the CSS rule removed. If not provided, the current frame is assumed. If 'target' is provided, this attribute is ignored.
- 'objectID' specifies the 'id' attribute of the object (e.g., an HTML <object> or <embed> element) in which to find the element whose 'class' attribute is to have the CSS rule removed. If not provided, the current object is assumed. If 'target' is provided, this attribute is ignored.
- 'docID' specifies the 'id' attribute of the document (e.g., an SVG or XHTML document) in which to find the element whose 'class' attribute is to have the CSS rule removed.

If not provided, the current document is assumed. If 'target' is provided, this attribute is ignored.

'elementID' specifies the 'id' attribute of the element whose 'class' attribute is to have the CSS rule removed. If 'target' is provided, this attribute is ignored.

'cssName' specifies the name of the CSS rule to remove from the element's 'class' attribute.

<removeData>

Removes all data or the specified data from the target element. Equivalent to <setData> with the modify="remove" attribute.

```
id="string"
event="string"
{target="xpath" | frameID="string" objectID="string" docID="string"
elementID="string"}
offset="signed integer"
from="{top | bottom}"
count="integer"
substring="string"
occurrence="string"
/>
```

Attributes:
  'id' allows this action element to be referenced later.
  'event' specifies the event that triggers this action.
  'target' is the xpath pointing to the location of the element whose data is to be removed. If provided, 'frameID', 'objectID', 'docID' and 'elementID' are ignored.
  'frameID' specifies the 'id' attribute of the frame (e.g.; an HTML <frame> element) in which to find the element whose data is to be removed. If not provided, the current frame is assumed. If 'target' is provided, this attribute is ignored.
  'objectID' specifies the 'id' attribute of the object (e.g., an HTML <object> or <embed> element) in which to find the element whose data is to be removed. If not provided, the current object is assumed. If 'target' is provided, this attribute is ignored.
  'docID' specifies the 'id' attribute of the document (e.g., an SVG or XHTML document) in which to find the element whose data is to be removed. If not provided, the current document is assumed. If 'target' is provided, this attribute is ignored.
  'elementID' specifies the 'id'.attribute of the element whose data is to be removed. If 'target' is provided, this attribute is ignored.
  'offset' specifies the number of characters from the beginning or end of the data (as specified by the 'from' attribute) at which to remove data. If 'count' is not provided, this attribute is ignored. The default is 0.
  'from' specifies whether the 'offset' attribute is relative to the beginning (top), which is the default, or end (bottom) of the data.
  'count' specifies the number of consecutive characters after the 'offset' that is to be removed.
  'substring' specifies text to search for in the element's data, which, if found, will be removed.
  'occurrence' specifies which occurrence of 'substring' should be removed. The default is 1, signifying the first occurrence. If 'substring' is not provided, this attribute is ignored.

<removeDocument>

Removes the specified document or documentFragment.

```
id="string"
event="string"
{target="xpath" | frameID="string" objectID="string" docID="string"
/>
```

Attributes:
  'id' allows this action element to be referenced later.
  'event' specifies the event that triggers this action.
  'target' is the xpath pointing to the location of the document or documentFragment to be removed. If provided, 'frameID', 'objectID' and 'docID' are ignored.
  'frameID' specifies the 'id' attribute of the frame (e.g., an HTML <frame> element) in which to find the document or documentFragment to be removed. If not provided, the current frame is assumed. If 'target' is provided, this attribute is ignored.
  'objectID' specifies the 'id' attribute of the object (e.g., an HTML <object> or <embed> element) in which to find the document or documentFragment to be removed. If not provided, the current object is assumed. If 'target' is provided, this attribute is ignored.
  'docID' specifies the 'id' attribute of the document or documentFragment (e.g., an SVG or XHTML document) to be removed. If not provided, the current document is assumed. If 'target' is provided, this attribute is ignored.

<removeElement>

The 'removeElement' element removes an element and its children from the DOM.

```
<!ENTITY % removeElementExt "" >
<!ELEMENT dsvg:removeElement  (%Behaviors;) >
<!ATTLIST dsvg:removeElement
%stdBehaviorAttrs;
elementID           ID;           #IMPLIED >
```

Attribute definitions:
elementID="name"
  The 'id' attribute of the element to be removed from the DOM.

The removeElement example below shows a button which invokes the 'removeElement' behavior to remove an ellipse.

```
<?xml version="1.0" standalone="no"?>
<!DOCTYPE svg SYSTEM "../SVGdSVG.dtd">
<svg xmlns:dsvg="http://www.corel.com/schemas/2002/dSVG11"
xmlns:xlink="http://www.w3.org/1999/xlink" height="410px" width="744px"
onload="init(evt)" viewBox="0 0 744 410">
    <script type="text/ecmascript" xlink:href="dsvg11/dSVG.js"/>
```

-continued

```
<script type="text/ecmascript" xlink:href="dsvg11/baseUI.js"/>
<script type="text/ecmascript" xlink:href="dsvg11/constraint.js"/>
<script type="text/ecmascript" xlink:href="dsvg11/button.js"/>
<script type="text/ecmascript" xlink:href="dsvg11/removeElement.js"/>
<!-- template -->
<rect height="40" width="744" y="0" x="0" fill="#5f86B1" id="title_rect"/>
<text y="25" x="20" font-weight="bold" font-size="18" fill="white"
id="text_1">dSVG sample behavior: removeElement
</text>
<text y="365" x="20" font-size="12" id="content">Content of file:
dsvg:removeElement
</text>
<text y="380" x="20" font-size="12" id="expected">The dsvg:removeElement
will remove the specified target element from the DOM.
</text>
<text y="395" x="20" font-size="12" id="depend">The element that will be
removed is referenced by its ID.
</text>
<line y2="340" x2="744" y1="340" x1="0" stroke-width="2" stroke="#5f86B1"
fill="#5f86B1" id="bottom_line"/>
<!-- adding behavior -->
<ellipse ry="25" rx="50" cy="150" cx="250" stroke-width="5" stroke="darkblue"
fill="#5f86B1" id="shape1"/>
<dsvg:button xlink:href="dsvg11/skinButton_Windows.svg#skinButton"
autoScale="true" disabled="false" selected="false" toggle="false" height="18"
width="100" y="100" x="50" label="remove" id="dsvgUniqueID_0">
    <dsvg:removeElement elementID="shape1" id="dsvgUniqueID_1"/>
</dsvg:button>
</svg>
```

<removeLink>

Removes the associated link for the target element, in effect removing the <a xlink:href=""></a> that surrounds the target element. Equivalent to <setLink> with the modify="remove" attribute.

```
<removeLink
    id="string"
    event="string"
    {target="xpath" | frameID="string" objectID="string" docID="string"
    elementID="string"}
/>
```

Attributes:

'id' allows this action element to be referenced later.

'event' specifies the event that triggers this action.

'target' is the xpath pointing to the location of the element to have its associated link removed. If provided, 'frameID', 'objectID', 'docID' and 'elementID' are ignored.

'frameID' specifies the 'id' attribute of the frame (e.g., an HTML <frame> element) in which to find the element to have its associated link removed. If not provided, the current frame is assumed. If 'target' is provided, this attribute is ignored.

'objectID' specifies the 'id' attribute of the object (e.g., an HTML <object> or <embed> element) in which to find the element to have its associated link removed. If not provided, the current object is assumed. If 'target' is provided, this attribute is ignored.

'docID' specifies the 'id' attribute of the document (e.g., an SVG or XHTML document) in which to find the element to have its associated link removed. If not provided, the current document is assumed. If 'target' is provided, this attribute is ignored.

'elementID' specifies the 'id' attribute of the element to have its associated link removed. If 'target' is provided, this attribute is ignored.

<removeProcessingInstruction>

Removes a processingInstruction from the document, e.g., <? xml version="1.0"?>

```
<removeProcessingInstruction
    id="string"
    event="string"
    data="string"
/>
```

Attributes:

'id' allows this action element to be referenced later.

'event' specifies the event that triggers this action.

'data' specifies the processingInstruction to be removed, e.g., xml version="1.0".

<removeStyle>

Removes the specified style property and/or entity from the 'style' attribute for the target element. Equivalent to <setStyle> with the modify="remove" attribute.

```
<removeStyle
    id="string"
    event="string"
    {target="xpath" | frameID="string" objectID="string" docID="string"
    elementID="string"}
    {name="string" | entityName="string"}
/>
```

Attributes:

'id' allows this action element to be referenced later.

'event' specifies the event that triggers this action.

'target' is the xpath pointing to the location of the element whose 'style' attribute is to have the specified property removed. If provided, 'frameID', 'objectID', 'docID' and 'elementID' are ignored.

'frameID' specifies the 'id' attribute of the frame (e.g., an HTML <frame> element) in which to find the element whose 'style' attribute is to have the specified property removed. If not provided, the current frame is assumed. If 'target' is provided, this attribute is ignored.

'objectID' specifies the 'id' attribute of the object (e.g., an HTML <object> or <embed> element) in which to find the element whose 'style' attribute is to be set. If not provided, the current object is assumed. If 'target' is provided, this attribute is ignored.

'docID' specifies the 'id' attribute of the document (e.g., an SVG or XHTML document) in which to find the element whose 'style' attribute is to have the specified property removed. If not provided, the current document is assumed. If 'target' is provided, this attribute is ignored.

'elementID' specifies the 'id' attribute of the element whose 'style' attribute is to have the specified property removed. If 'target' is provided, this attribute is ignored.

'name' specifies the name of the style property to be removed from the element's 'style' attribute. e.g., stroke-width, stroke, fill, font-size, etc.

'entityName' specifies the name of the entity to be removed from the element's 'style' attribute. If 'name' is provided, then both the 'name' and 'entityName' will be removed.

<removeStyleSheet>

Removes the specified CSS rule from the CDATA block of a <style> element Equivalent to <setStyleSheet> with the modify="remove" attribute.

```
<removeStyleSheet
    id="string"
    event="string"
    cssName="string"
/>
```

Attributes:

'id' allows this action element to be referenced later.

'event' specifies the event that triggers this action.

'cssName' specifies the reference name of the CSS rule, e.g., ".stro" or "text.info"

<replaceElement>

The 'replaceElement' element replaces a specified element in the DOM with a new element.

```
<!ENTITY % replaceElementExt "" >
<!ELEMENT dsvg:replaceElement   (%Behaviors;) >
<!ATTLIST dsvg:replaceElement
%stdBehaviorAttrs;
elementID           ID;             #IMPLIED
preserveChildren    %boolean;       "false"
preserveEvents      %boolean;       "false"
preserveStyle       %boolean;       "false" >
```

Attribute definitions:

elementID="name"

The 'id' attribute of the element to be replaced.

preserveChildren="(true | false)"

Specifies whether to copy the child elements of the original element and append them as children of the new element (true) or remove them along with the original element (false).

preserveEvents="(true | false)"

Specifies whether to copy the event attributes (onmouseover, onclick, etc.) from the original element to the new element (true) or not (false).

preserveStyle="(true | false)"

Specifies whether to copy the 'style' attribute from the original element to the new element (true) or not (false).

The replaceElement example below shows a button which invokes the 'replaceElement' behavior to remove an ellipse.

```
<?xml version="1.0" standalone="no"?>
<!DOCTYPE svg SYSTEM "../SVGdSVG.dtd">
<svg xmlns:dsvg="http://www.corel.com/schemas/2002/dSVG11"
xmlns:xlink="http://www.w3.org/1999/xlink" height="410px" width="744px"
onload="init(evt)" viewBox="0 0 744 410">
    <script type="text/ecmascript" xlink:href="dsvg11/dSVG.js"/>
    <script type="text/ecmascript" xlink:href="dsvg11/baseUI.js"/>
    <script type="text/ecmascript" xlink:href="dsvg11/constraint.js"/>
    <script type="text/ecmascript" xlink:href="dsvg11/button.js"/>
    <script type="text/ecmascript" xlink:href="dsvg11/replaceElement.js"/>
    <script type="text/ecmascript" xlink:href="dsvg11/setAttribute.js"/>
    <!-- template -->
    <rect height="40" width="744" y="0" x="0" fill="#5f86B1" id="title_rect"/>
    <text y="25" x="20" font-weight="bold" font-size="18" fill="white"
id="text_1">dSVG sample behavior: replaceElement
    </text>
    <text y="365" x="20" font-size="12" id="content">Content of file:
dsvg:replaceElement
    </text>
    <text y="380" x="20" font-size="12" id="expected">The dsvg:replaceElement
will replace a specified target element in the DOM with another element.
    </text>
    <text y="395" x="20" font-size="12" id="depend"/>
    <line y2="340" x2="744" y1="340" x1="0" stroke-width="2" stroke="#5f86B1"
fill="#5f86B1" id="bottom_line"/>
```

```
        <!-- adding behavior -->
        <ellipse ry="50" rx="25" cy="150" cx="250" stroke-width="5" stroke="darkblue"
fill="#5f86B1" id="shape1"/>
        <dsvg:button xlink:href="dsvg11/skinButton_Windows.svg#skinButton"
autoScale="true" disabled="false" selected="false" toggle="false" height="18"
width="100" y="100" x="50" label="replace" id="dsvgUniqueID_0">
                <dsvg:replaceElement elementID="shape1" elementName="rect"
id="dsvgUniqueID_1"/>
                <dsvg:setAttribute value="100" attribute="width" elementID="shape1"
id="dsvgUniqueID_2"/>
                <dsvg:setAttribute value="50" attribute="height" elementID="shape1"
id="dsvgUniqueID_3"/>
                <dsvg:setAttribute value="darkblue" attribute="fill" elementID="shape1"
id="dsvgUniqueID_2"/>
                <dsvg:setAttribute value="#5f86B1" attribute="stroke"
elementID="shape1" id="dsvgUniqueID_3"/>
                <dsvg:setAttribute value="250" attribute="x" elementID="shape1"
id="dsvgUniqueID_2"/>
                <dsvg:setAttribute value="150" attribute="y" elementID="shape1"
id="dsvgUniqueID_3"/>
                <dsvg:setAttribute value="5" attribute="stroke-width"
elementID="shape1" id="dsvgUniqueID_2"/>
        </dsvg:button>
</svg>
```

<setAttribute>

The 'setAttribute' element sets the value of the target element's specified attribute.

```
<!ENTITY % setAttributeExt "" >
<!ELEMENT dsvg:setAttribute ANY >
<!ATTLIST dsvg:setAttribute
%stdBehaviorAttrs;
elementID       ID;        #IMPLIED
attribute       %Text;     #IMPLIED
value           %Text;     #IMPLIED >
```

Attribute definitions:
elementID="name"

The 'id' attribute of the element whose attribute is to be set. If this attribute is not provided, no action will occur.

attribute='<string>'

The name of the attribute to be set.

value='<string>'

The value to set the specified attribute to.

Figure 17B:
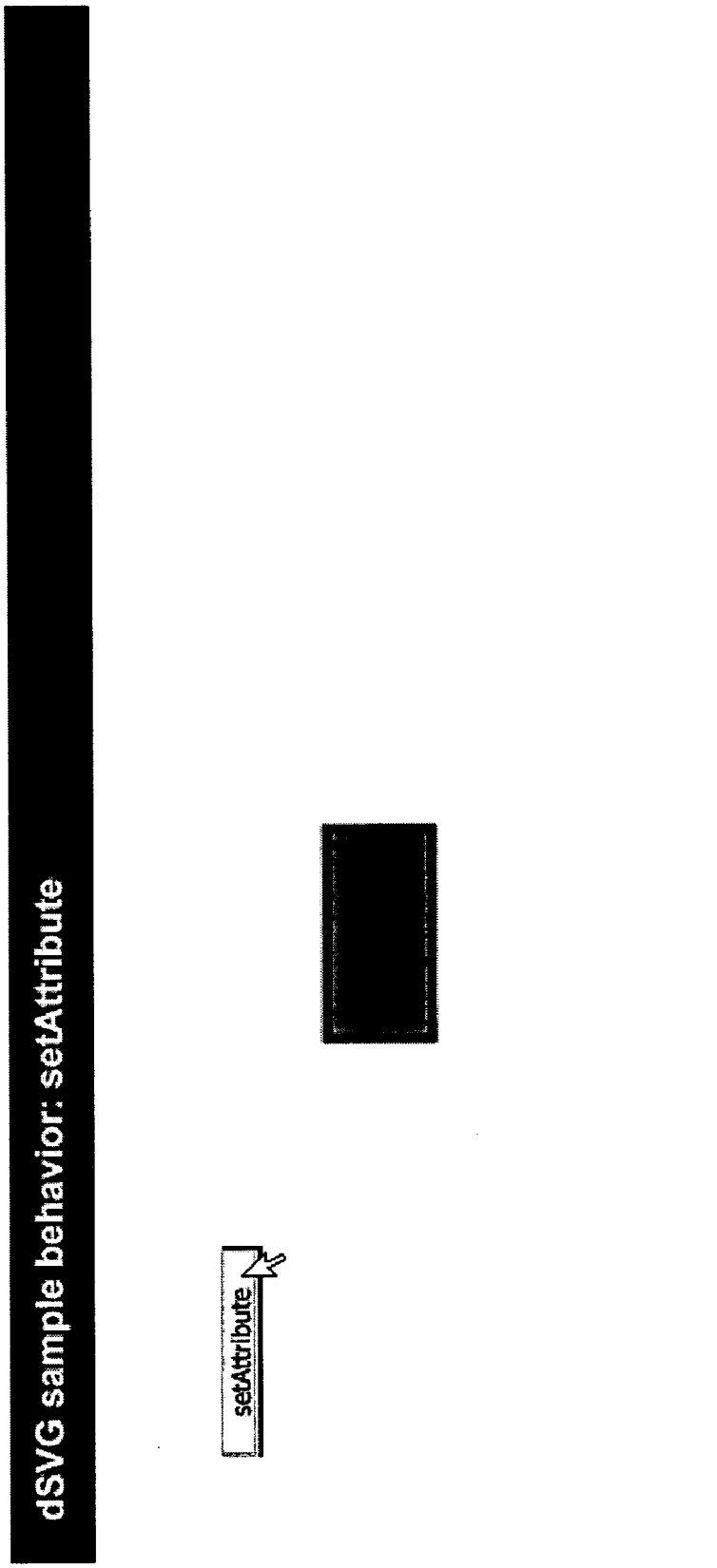

FIGS. 17A and 17B show a button that invokes three 'setAttribute' behaviors to set the 'fill', 'stroke' and 'stroke-width' attributes of a rectangle. The setAttribute element 255 will set the attributes of the specified target element 256. The example is provided below:

```
<?xml version="1.0" standalone="no"?>
<!DOCTYPE svg SYSTEM "../SVGdSVG.dtd">
<svg xmlns:dsvg="http://www.corel.com/schemas/2002/dSVG11"
xmlns:xlink="http://www.w3.org/1999/xlink" height="410px" width="744px"
onload="init(evt)" viewBox="0 0 744 410">
        <script type="text/ecmascript" xlink:href="dsvg11/dSVG.js"/>
        <script type="text/ecmascript" xlink:href="dsvg11/baseUI.js"/>
        <script type="text/ecmascript" xlink:href="dsvg11/constraint.js"/>
        <script type="text/ecmascript" xlink:href="dsvg11/button.js"/>
        <script type="text/ecmascript" xlink:href="dsvg11/setAttribute.js"/>
        <!-- template -->
        <rect height="40" width="744" y="0" x="0" fill="#5f86B1" id="title_rect"/>
        <text y="25" x="20" font-weight="bold" font-size="18" fill="white"
id="text_1">dSVG sample behavior: setAttribute
        </text>
        <text y="365" x="20" font-size="12" id="content">Content of file:
dsvg:setAttribute
        </text>
        <text y="380" x="20" font-size="12" id="expected">The dsvg:setAttribute
element will set the attributes of the specified target element.
        </text>
        <text y="395" x="20" font-size="12" id="depend"/>
        <line y2="340" x2="744" y1="340" x1="0" stroke-width="2" stroke="#5f86B1"
fill="#5f86B1" id="bottom_line"/>
        <!-- adding behavior -->
        <dsvg:button xlink:href="dsvg11/skinButton_Windows.svg#skinButton"
autoScale="true" disabled="false" selected="false" toggle="false" height="18"
width="100" y="100" x="50" label="setAttribute" id="dsvgUniqueID_0">
                <dsvg:setAttribute value="#5f86B1" attribute="fill" elementID="shape1"
```

-continued

```
id="dsvgUniqueID_20"/>
        <dsvg:setAttribute value="darkblue" attribute="stroke"
elementID="shape1" id="dsvgUniqueID_31"/>
        <dsvg:setAttribute value="5" attribute="stroke-width"
elementID="shape1" id="dsvgUniqueID_24"/>
    </dsvg:button>
    <rect height="50" width="100" y="150" x="250" id="shape1"/>
</svg>
```

<setClass>

Adds or removes a CSS rule in the 'class' attribute for the target element, or replaces the contents of the 'class' attribute entirely. If adding or replacing, the 'class' attribute will be created, if not already there.

```
<setClass
    id="string"
    event="string"
    {target="xpath" | frameID="string" objectID="string" docID="string"
    elementID="string"}
    cssName="string"
    modify="{append | precede | remove | replace}"
    savePrevious="{true | false}"
/>
```

Attributes:
  'id' allows this action element to be referenced later.
  'event' specifies the event that triggers this action.
  'target' is the xpath pointing to the location of the element whose 'class' attribute is to be set. If provided, 'frameID', 'objectID', 'docID' and 'elementID' are ignored.
  'frameID' specifies the 'id' attribute of the frame (e.g., an HTML <frame> element) in which to find the element whose 'class' attribute is to be set. If not provided, the current frame is assumed. If 'target' is provided, this attribute is ignored.
  'objectID' specifies the 'id' attribute of the object (e.g., an HTML <object> or <embed> element) in which to find the element whose 'class' attribute is to be set. If not provided, the current object is assumed. If 'target' is provided, this attribute is ignored.
  'docID' specifies the 'id' attribute of the document (e.g., an SVG or XHTML document) in which to find the element whose 'class' attribute is to be set. If not provided, the current document is assumed. If 'target' is provided, this attribute is ignored.
  'elementID' specifies the 'id' attribute of the element whose 'class' attribute is to be set. If 'target' is provided, this attribute is ignored.
  'cssName' specifies the name of the CSS rule (contained within a CDATA block, as a child of a <style type="text/css"> element) to replace, be added to, or be removed from the element's 'class' attribute
  'modify' specifies whether the CSS rule should be inserted at the beginning (precede), inserted at the end (append), or removed from (remove) the existing 'class' value, or whether it should replace the contents of the 'class' attribute entirely. If adding or replacing, the 'class' attribute will be created, if not already there. If adding ("append" or "precede"), a whitespace character is used for the delimiter.
  'savePreviousValue' specifies whether to save the previous value of the 'class' attribute (true) or not (false). If saved, the previous value will be stored in the 'previous_class' attribute for the target element.

<setComment>

Creates, removes or modifies a comment (i.e., <!--comment-->) in the desired location.

```
<setComment
    id="string"
    event="string"
    {target="xpath" | frameID="string" objectID="string" docID="string"
    elementID="string"}
    offset="signed integer"
    value="string"
    modify="{append | create | precede | remove | replace}"
/>
```

Attributes:
  'id' allows this action element to be referenced later.
  'event' specifies the event that triggers this action.
  'target' is the xpath pointing to the location at which the comment is to be created, removed or modified. If provided, 'frameID', 'objectID', 'docID' and 'elementID' are ignored.
  'frameID' specifies the 'id' attribute of the frame (e.g., an HTML <frame> element) in which to find the reference element. If not provided, the current frame is assumed. If 'source' is provided, this attribute is ignored.
  'objectID' specifies the 'id' attribute of the document (e.g., an HTML <object> or <embed> element) in which to find the reference element. If not provided, the current object is assumed. If 'source' is provided, this attribute is ignored.
  'docID' specifies the 'id' attribute of the document (e.g., an SVG or XHTML document) in which to find the reference element. If not provided, the current document is assumed. If 'source' is provided, this attribute is ignored.
  'elementID' specifies the reference element. If 'source' is provided, this attribute is ignored.
  'offset' specifies the number of comment nodes before (if 'offset' is negative) or after (if 'offset' is positive) the target element at which to insert, remove or modify a comment. If there are fewer consecutive comment nodes than specified by 'offset', the first or last comment node will be created/removed/modified.
  'value' specifies the comment's actual text.
  'modify' specifies whether a new comment is to be inserted before the target (create), or whether the existing target comment node is to be removed (remove), replaced entirely (replace) or modified, with the new text added to the beginning (precede) or the end (append) of the existing text.

<setData>

The 'setData' element sets the data of the target element (i.e. the text between the opening and closing tags).

```
<!ENTITY % setDataExt "" >
<!ELEMENT dsvg:setData ANY >
<!ATTLIST dsvg:setData
%stdBehaviorAttrs;
elementID       ID;         #IMPLIED
value           %Text;      #IMPLIED >
```

Figure 18A:
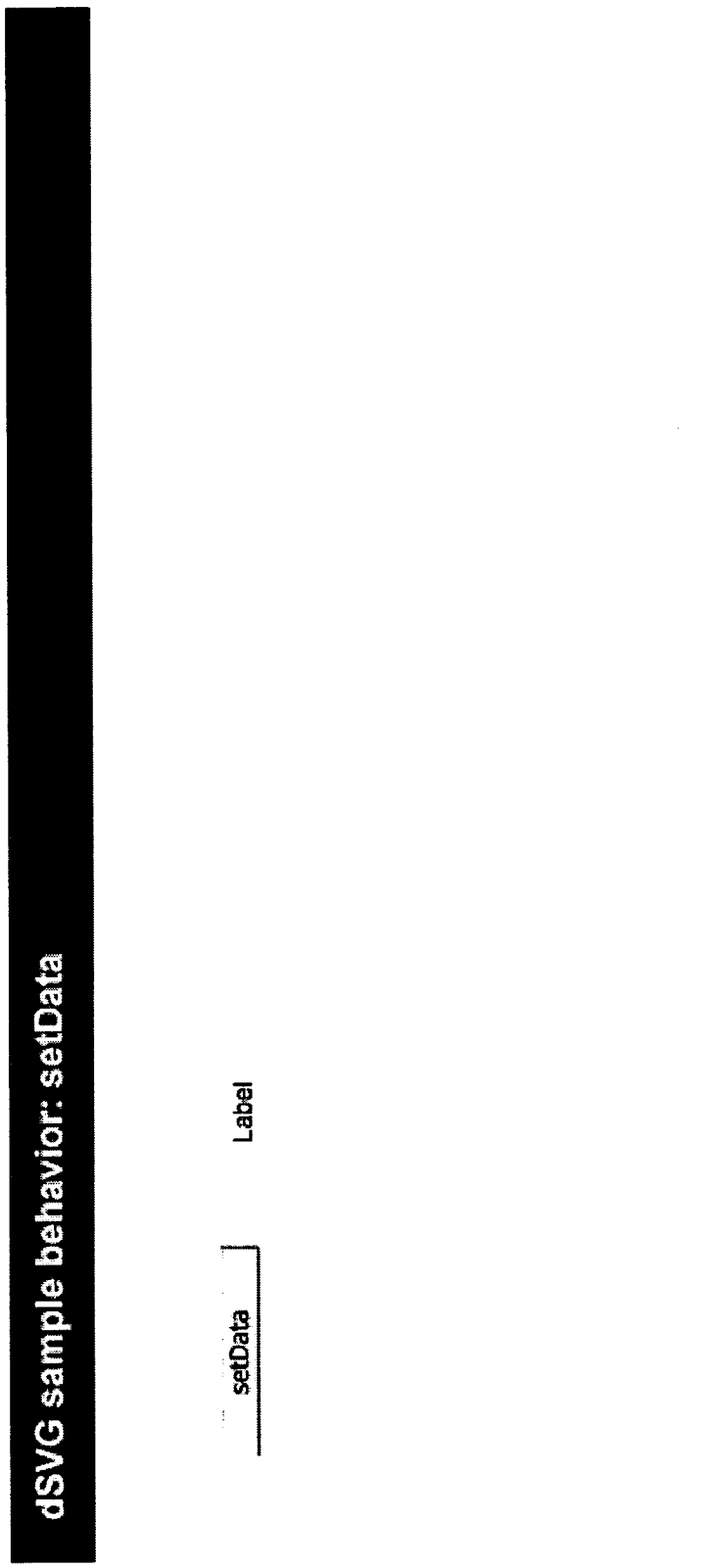

Attribute definitions:
elementID="name"
　The 'id' attribute of the element whose data is to be set.
　If this attribute is not provided, no action will occur.
value='<string>'
　The value to set the target element's data to.
　FIGS. 18A and 18B show a button 260 that invokes a 'setData' behavior to set the data of a 'text' element. The setData element will set a text node with the specified data. The example is provided below:

```
<?xml version="1.0" standalone="no"?>
<!DOCTYPE svg SYSTEM "../SVGdSVG.dtd">
<svg xmlns:dsvg="http://www.corel.Com/schemas/2002/dSVG11"
xmlns:xlink="http://www.w3.org/1999/xlink" height="410px" width="744px"
onload="init(evt)" viewBox="0 0 744 410">
    <script type="text/ecmascript" xlink:href="dsvg11/dSVG.js"/>
    <script type="text/ecmascript" xlink:href="dsvg11/baseUI.js"/>
    <script type="text/ecmascript" xlink:href="dsvg11/constraint.js"/>
    <script type="text/ecmascript" xlink:href="dsvg11/button.js"/>
    <script type="text/ecmascript" xlink:href="dsvg11/setData.js"/>
    <!-- template -->
    <rect height="40" width="744" y="0" x="0" fill="#5f86B1" id="title_rect"/>
    <text y="25" x="20" font-weight="bold" font-size="18" fill="white"
id="text_1">dSVG sample behavior: setData
    </text>
    <text y="365" x="20" font-size="12" id="content">Content of file: dsvg:setData
    </text>
    <text y="380" x="20" font-size="12" id="expected">The dsvg:setData element
will set a text node with the specified data.
    </text>
    <text y="395" x="20" font-size="12" id="depend"/>
    <line y2="340" x2="744" y1="340" x1="0" stroke-width="2" stroke="#5f86B1"
fill="#5f86B1" id="bottom_line"/>
    <!-- adding behavior -->
    <dsvg:button xlink:href="dsvg11/skinButton_Windows.svg#skinButton"
autoScale="true" disabled="false" selected="false" toggle="false" height="18"
width="100" y="100" x="50" label="setData" id="dsvgUniqueID_0">
        <dsvg:setData value="This is a sample of setData." elementID="label1"
id="dsvgUniqueID_1"/>
    </dsvg:button>
    <text y="115" x="200" id="label1">Label
    </text>
</svg>
```

<setEntity>

Creates, modifies or removes an entity, e.g., <!ENTITY st0 "fill:none;stroke:black;">.

```
<setEntity
    id="string"
    event="string"
    name="string"
    value="string"
    modify="{append | remove | replace}"
/>
```

Attributes:
　'id' allows this action element to be referenced later.
　'event' specifies the event that triggers this action.
　'name' specifies the reference name of the entity, e.g., "st0"
　'value' specifies the string that the entity resolves to, e.g., "fill:none;stroke:black;". This is ignored if 'modify' is set to 'remove'.
　'modify' specifies whether to append to the entity's current value, replace the entity's value, or remove the entity altogether. If 'modify' is set to 'remove', then 'value' is ignored.

<setEventListner>

Sets an event listener on the desired element. This does not add an event attribute (e.g., onmouseover) to the element.

```
<setEventListener
    id="string"
    event="string"
    eventName="string"
    {target="xpath" | frameID="string" objectID="string" docID="string"
```

-continued

```
    elementID="string"}
    handlerID="string"
    handlerFunction="string"
    modify="{add | remove | replace}"
/>
```

Attributes:
　'id' allows this action element to be referenced later.
　'event' specifies the event that triggers this action.

'eventName' specifies the name of the event that the element should listen for (e.g., mouseover).

'target' is the xpath pointing to the location of the element to set an event listener on. If provided, 'frameID', 'objectID', 'docID' and 'elementID' are ignored.

'frameID' specifies the 'id' attribute of the frame (e.g., an HTML <frame> element) in which to find the element to set an event listener on. If not provided, the current frame is assumed. If 'target' is provided, this attribute is ignored.

'objectID' specifies the 'id' attribute of the object (e.g., an HTML <object> or <embed> element) in which to find the element to set an event listener on. If not provided, the current object is assumed. If 'target' is provided, this attribute is ignored.

'docID' specifies the 'id' attribute of the document (e.g., an SVG or XHTML document) in which to find the element to set an event listener on. If not provided, the current document is assumed. If 'target' is provided, this attribute is ignored.

'elementID' specifies the 'id' attribute of the element to set an event listener on. If 'target' is provided, this attribute is ignored.

'handlerID' specifies the 'id' attribute of the behaviour element or <action> container for behaviours to handle the event. If 'handlerFunction' is also defined, it will handle the event after the action element is done.

'handlerFunction' specifies the JavaScript function name to handle the event. If 'handlerID' is also defined, it will handle the event first before passing control on to the JavaScript function.

'modify' specifies whether to remove, replace or add to any existing event listener(s).

<setLink>

Sets or removes a link for the target element, in effect creating or removing an <a xlink:href=""></a> around the target element.

```
<setLink
  id="string"
  event="string"
  {target="xpath" | frameID="string" objectID="string" docID="string" elementID="string"}
  xlink:href="URL"
  modify="{remove | set}"
  savePreviousValue="{true | false}"
/>
```

Attributes:

'id' allows this action element to be referenced later.

'event' specifies the event that triggers this action.

'target' is the xpath pointing to the location of the element to have an associated link set or removed. If provided, 'frameID', 'objectID', 'docID' and 'elementID' are ignored.

'frameID' specifies the 'id' attribute of the frame (e.g., an HTML <frame> element) in which to find the element to have an associated link set or removed. If not provided, the current frame is assumed. If 'target' is provided, this attribute is ignored.

'objectID' specifies the 'id' attribute of the object (e.g., an HTML <object> or <embed> element) in which to find the element whose attribute is to have an associated link set or removed. If not provided, the current object is assumed. If 'target' is provided, this attribute is ignored.

'docID' specifies the 'id' attribute of the document (e.g., an SVG or XHTML document) in which to find the element to have an associated link set or removed. If not provided, the current document is assumed. If 'target' is provided, this attribute is ignored.

'elementID' specifies the 'id' attribute of the element to have an associated link set or removed. If 'target' is provided, this attribute is ignored.

'xlink:href' specifies the URL (the link) to be associated with the target element.

If modify="remove", this attribute is ignored.

'modify' specifies whether the attribute is to be created or replaced (replace), removed (remove) or modified, with the new text added to the beginning (precede) or the end (append) of the existing text.

'savePreviousValue' specifies whether to save the previous value of the link (true) or not (false). If saved, the previous value will be stored in the attribute 'previousLink' for the target element, not for the <a> element, since <setLink> effectively abstracts the author from needing to understand how links really work.

<setStyle>

The 'setStyle' element sets the value of the target element's specified style property (i.e. the property within the 'style' attribute) without removing any other existing properties.

```
<!ENTITY % setStyleExt "" >
<!ELEMENT dsvg:setStyle ANY >
<!ATTLIST dsvg:setStyle
  %stdBehaviorAttrs;
  elementID    ID;       #IMPLIED
  property     %Text;    #IMPLIED
  value        %Text;    #IMPLIED >
```

Attribute definitions:

elementID="name"

The 'id' attribute of the element whose attribute is to be set. If this attribute is not provided, no action will occur.

property='<string>'

The name of the style property to be set (e.g. 'fill', 'opacity', etc.).

value='<string>'

The value to set the specified style property to.

Figure 19A:
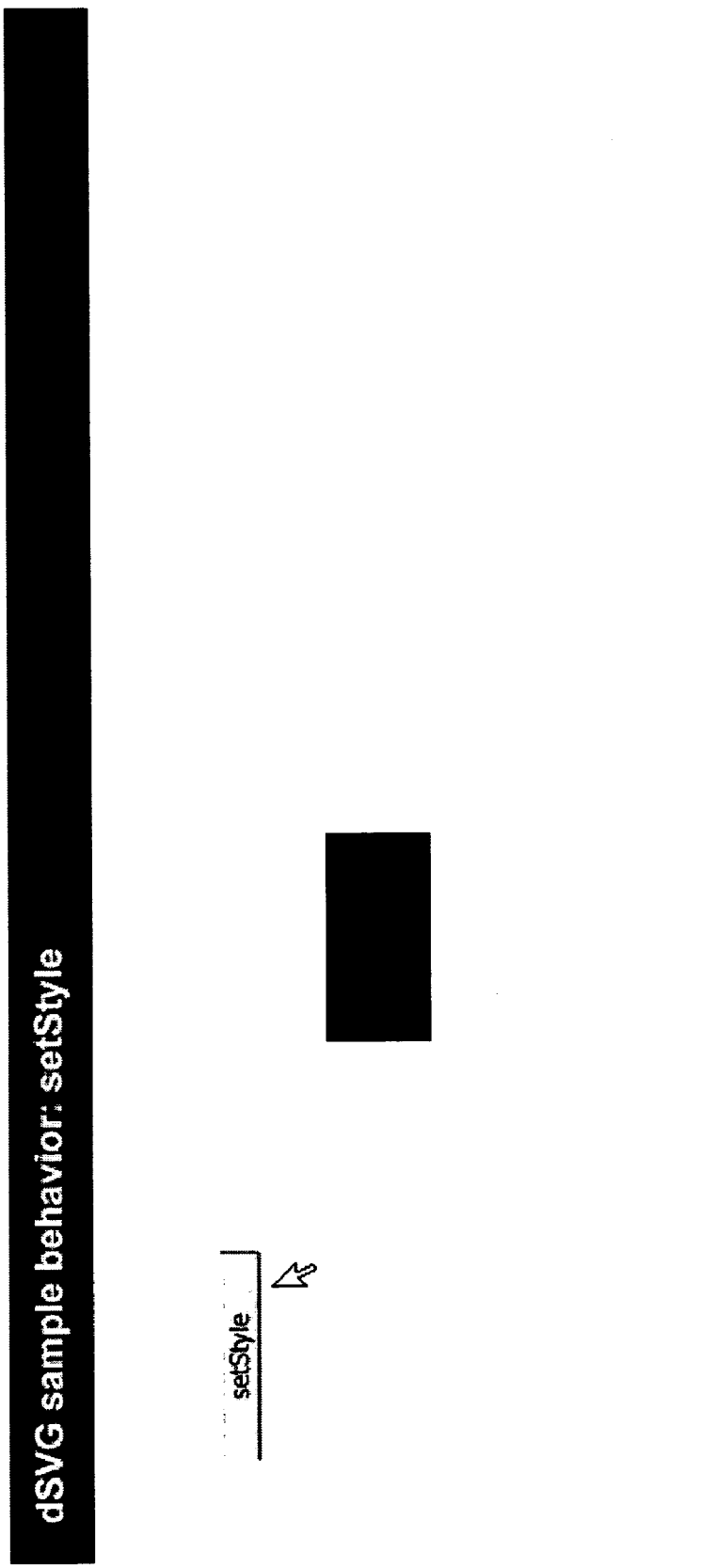
FIGS. 19A and 19B are before and after screen shots of an example of a setStyle element, in accordance with the document object model manipulation system.
Figure 19B:
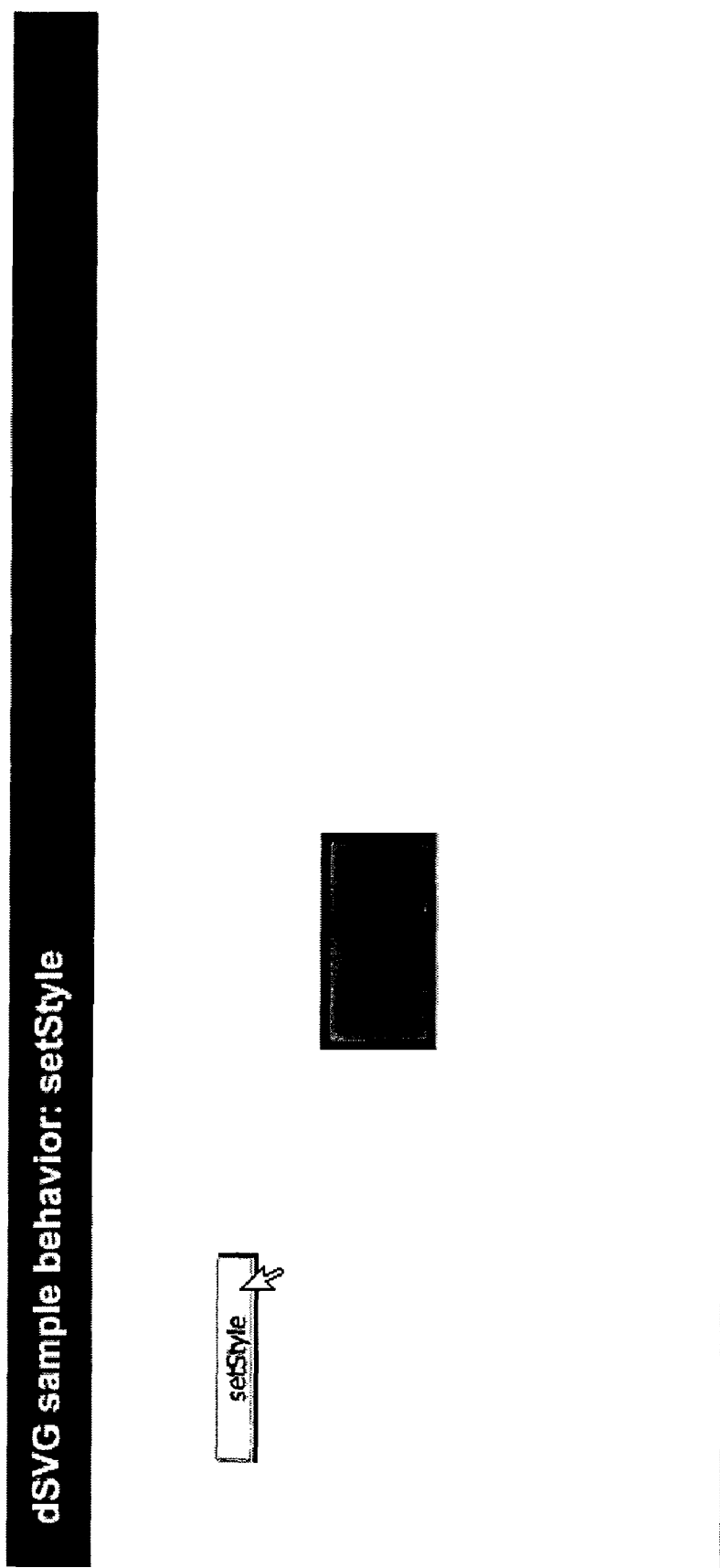

FIGS. 19A and 19B show a button 265 that invokes three 'setStyle' behaviors to set the 'fill', 'stroke' and 'stroke-width' properties of a rectangle's 'style' attribute. The setStyle element will set the style of a specified target element 266. The example is provided below:

```
<?xml version="1.0" standalone="no"?>
<!DOCTYPE svg SYSTEM "../SVGdSVG.dtd">
<svg xmlns:dsvg="http://www.corel.com/schemas/2002/dSVG11"
xmlns:xlink="http://www.w3.org/1999/xlink" height="410px" width="744px"
```

-continued

```
onload="init(evt)" viewBox="0 0 744 410">
  <script type="text/ecmascript" xlink:href="dsvg11/dSVG.js"/>
  <script type="text/ecmascript" xlink:href="dsvg11/baseUI.js"/>
  <script type="text/ecmascript" xlink:href="dsvg11/constraint.js"/>
  <script type="text/ecmascript" xlink:href="dsvg11/button.js"/>
  <script type="text/ecmascript" xlink:href="dsvg11/setStyle.js"/>
  <!-- template -->
  <rect height="40" width="744" y="0" x="0" fill="#5f86B1" id="title__rect"/>
  <text y="25" x="20" font-weight="bold" font-size="18" fill="white"
id="text__1">dSVG sample behavior: setStyle
  </text>
  <text y="365" x="20" font-size="12" id="content">Content of file: dsvg:setStyle
  </text>
  <text y="380" x="20" font-size="12" id="expected">The dsvg:setStyle element
will set the style of a specified target element.
  </text>
  <text y="395" x="20" font-size="12" id="depend"/>
  <line y2="340" x2="744" y1="340" x1="0" stroke-width="2" stroke="#5f86B1"
fill="#5f86B1" id="bottom__line"/>
  <!-- adding behavior -->
  <dsvg:button xlink:href="dsvg11/skinButton__Windows.svg#skinButton"
autoScale="true" disabled="false" selected="false" toggle="false" height="18"
width="100" y="100" x="50" label="setStyle" id="dsvgUniqueID__0">
      <dsvg:setStyle value="#5f86B1" property="fill" elementID="shape1"
id="dsvgUniqueID__1"/>
      <dsvg:setStyle value="darkblue" property="stroke" elementID="shape1"
id="dsvgUniqueID__2"/>
      <dsvg:setStyle value="5" property="stroke-width" elementID="shape1"
id="dsvgUniqueID__3"/>
  </dsvg:button>
  <rect height="50" width="100" y="150" x="250" id="shape1"/>
</svg>
```

<setStyleSheet>

Creates, modifies or removes a CSS rule within the CDATA block of a <style> element, e.g.,

```
<style type="text/css">
    <![CDATA[ .str0    { stroke:red;stroke-width:2 }
    text.info { color:green }
    text.error { color:red } ]]>
</style>
<setStyleSheet
    id="string"
    event="string"
    cssName="string"
    value="string"
    modify="{append | precede | remove | replace}"
/>
```

Attributes:

'id' allows this action element to be referenced later.

'event' specifies the event that triggers this action.

'cssName' specifies the reference name of the CSS rule, e.g., ".stro" or "text.info"

'value' specifies the string that the CSS rule resolves to, e.g., "stroke:red;stroke-width:2". This is ignored if 'modify' is set to 'remove'.

'modify' specifies whether to append to the rule's current value, replace the rule's value, or remove the rule altogether. If 'modify' is set to 'remove', then 'value' is ignored.

<setTransform>

The 'setTransform' element sets the transformation of the target element, either relative to its current transformation or replacing its current transformation.

```
<!ENTITY % setTransformExt "" >
<!ELEMENT dsvg:setTransform ANY >
<!ATTLIST dsvg:setTransform
%stdBehaviorAttrs;
elementID      ID;         #IMPLIED
referenceID    ID;         #IMPLIED
absolute       %Boolean;   "false"
hAlign         %Integer;   #IMPLIED
vAlign         %Integer;   #IMPLIED
matrix         %Text;      #IMPLIED
scale          %Number;    #IMPLIED
scaleX         %Number;    #IMPLIED
scaleY         %Number;    #IMPLIED
translateX     %Number;    #IMPLIED
translateY     %Number;    #IMPLIED
rotate         %Number;    #IMPLIED
cx             %Integer;   #IMPLIED
cy             %Integer;   #IMPLIED
skewX          %Number;    #IMPLIED
skewY          %Number;    #IMPLIED >
```

Attribute definitions:
elementID="name"

The 'id' attribute of the target element whose 'transform' attribute is to be set.

If this attribute is not provided, no action will occur.

referenceID="name"

The 'id' attribute of the element that the 'hAlign' and 'vAlign' attributes are with respect to.

If this attribute is not provided, the 'hAlign' and 'vAlign' are with respect to the target element.

absolute="(true | false)"

Specifies whether the transformation should be applied to the element's current transformation (false) or should replace the element's current transformation (true).

If this attribute is not provided, its default is "false".

hAlign="(left | middle | right | none | integer)"
  Specifies that a translation should be automatically calculated and applied to the target element so that after the transformation, anything at the coordinates occupied by the target element's left edge, middle, or right edge will have its pre-transformed position preserved. If 'referenceID' is supplied, then the element with that ID will have its position preserved, as specified by the 'hAlign' attribute, rather than the target element. If hAlign equals an integer, that integer represents the pre-transformed x-coordinate of the position that you wish to be preserved after the transformation.
  If this attribute is not provided, its default is "none".
vAlign="(top | middle | bottom | none | integer)"
  Specifies that a translation should be automatically calculated and applied to the target element so that after the transformation, anything at the coordinates occupied by the target element's top edge, middle, or bottom edge will have its pre-transformed position preserved. If 'referenceID' is supplied, then the element with that ID will have its position preserved, as specified by the 'vAlign' attribute, rather than the target element. If vAlign equals an integer, that integer represents the pre-transformed y-coordinate of the position that you wish to be preserved after the transformation.
  If this attribute is not provided, its default is "none".
matrix='<string>'
  The matrix transformation to be applied to the target element. The matrix is of the form "a b c d e f", where a, b, c, d, e and f are coefficients of the 3×3 transformation matrix (see http://www.w3.org/TR/SVG/coords.html#EstablishingANewUserSpace).
scale="<number>"
  The scale factor to be applied to the target element along both the x and y axes.
scaleX="<number>"
  The scale factor to be applied to the target element along the x-axis.
scaleY="<number>"
  The scale factor to be applied to the target element along the y-axis.
translateX="<number>"
  The translation to be applied to the target element along the x-axis.
translateY="<number>"
  The translation to be applied to the target element along the y-axis.
rotate="rotate"
  The rotation, in degrees, to be applied to the target element along the y-axis.
cx="<number>"
  The x-coordinate of the point about which to rotate the element. If either 'rotate' or 'cy' is not defined, this attribute is ignored.
cy="<number>"
  The y-coordinate of the point about which to rotate the element. If either 'rotate' or 'cx' is not defined, this attribute is ignored.
skewX="<number>"
  The skew, in degrees, to be applied to the target element along the x-axis.
skewY="<number>"
  The skew, in degrees, to be applied to the target element along the y-axis.

Figure 20A:
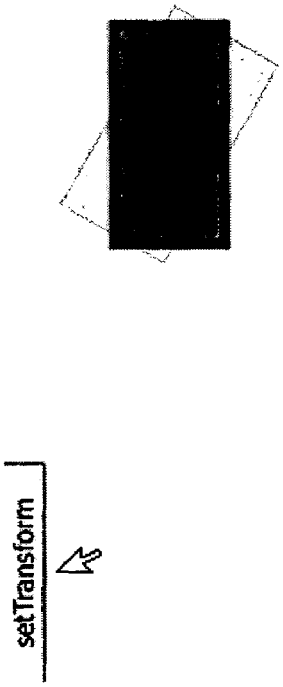
FIGS. 20A and 20B are before and after screen shots of an example of a setTransform element, in accordance with the document object model manipulation system.
Figure 20B:
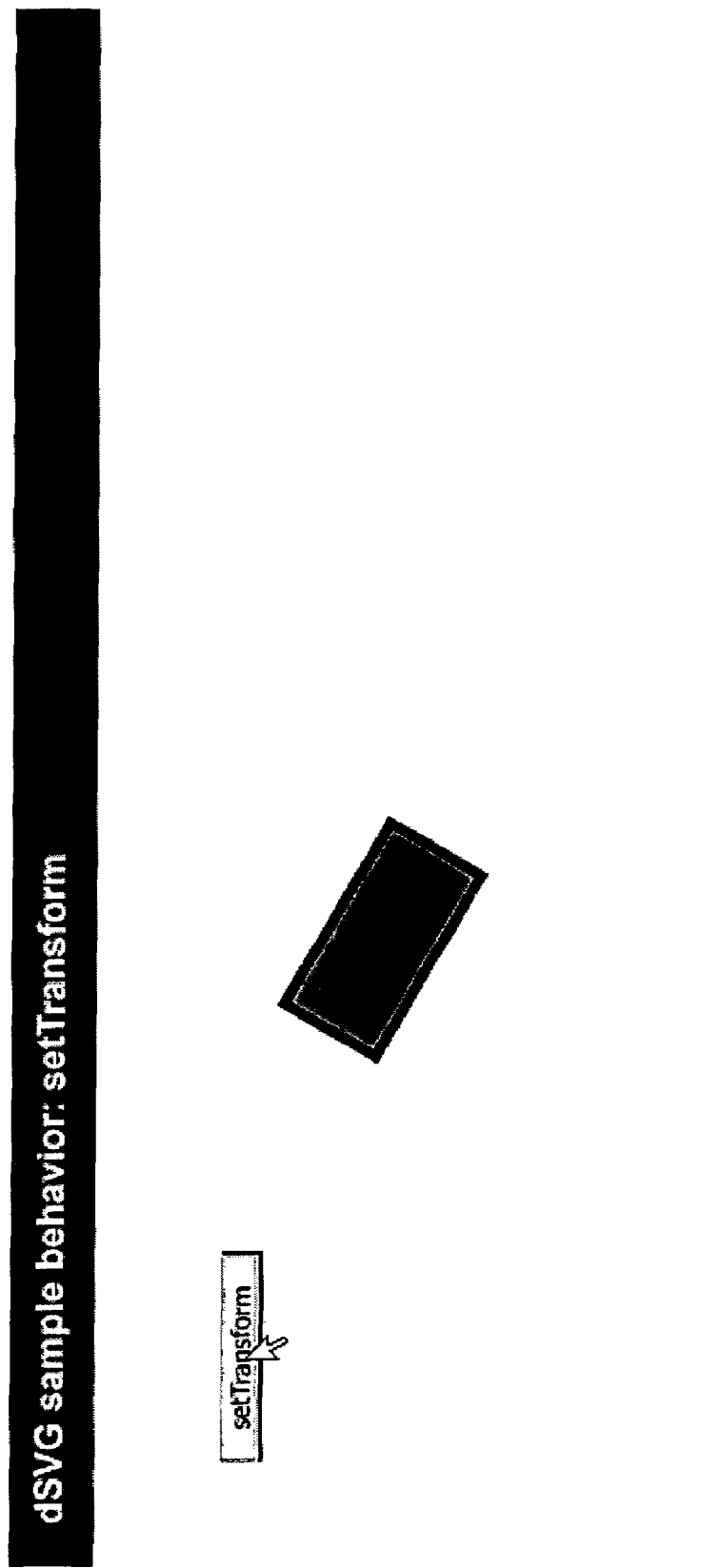

FIGS. 20A and 20B show a button 270 that invokes a 'setTransform' behaviors to rotate the rectangle 271 by 30 degrees. The setTransform element will transform the specified target element 271.

```
<?xml version="1.0" standalone="no"?>
<!DOCTYPE svg SYSTEM "../SVGdSVG.dtd">
<svg xmlns:dsvg="http://www.corel.com/schemas/2002/dSVG11"
xmlns:xlink="http://www.w3.org/1999/xlink" height="410px" width="744px"
onload="init(evt)" viewBox="0 0 744 410">
    <script type="text/ecmascript" xlink:href="dsvg11/dSVG.js"/>
    <script type="text/ecmascript" xlink:href="dsvg11/baseUI.js"/>
    <script type="text/ecmascript" xlink:href="dsvg11/constraint.js"/>
    <script type="text/ecmascript" xlink:href="dsvg11/button.js"/>
    <script type="text/ecmascript" xlink:href="dsvg11/setTransform.js"/>
    <!-- template -->
    <rect height="40" width="744" y="0" x="0" fill="#5f86B1" id="title__rect"/>
    <text y="25" x="20" font-weight="bold" font-size="18" fill="white"
id="text__1">dSVG sample behavior: setTransform
    </text>
    <text y="365" x="20" font-size="12" id="content">Content of file:
dsvg:setTransform
    </text>
    <text y="380" x="20" font-size="12" id="expected">The dsvg:setTransform
element will transform the specified target element.
    </text>
    <text y="395" x="20" font-size="12" id="depend"/>
    <line y2="340" x2="744" y1="340" x1="0" stroke-width="2" stroke="#5f86B1"
fill="#5f86B1" id="bottom__line"/>
    <!-- adding behavior -->
    <dsvg:button xlink:href="dsvg11/skinButton__Windows.svg#skinButton"
autoScale="true" disabled="false" selected="false" toggle="false" height="18"
width="100" y="100" x="50" label="setTransform" id="dsvgUniqueID__0">
        <dsvg:setTransform cy="175" cx="300" rotate="30" vAlign="middle"
hAlign="middle" absolute="false" elementID="shape1" id="dsvgUniqueID__1"/>
    </dsvg:button>
    <rect height="50" width="100" y="150" x="250" stroke-width="5"
stroke="darkblue" fill="#5f86B1" id="shape1"/>
```

-continued

```
<rect height="50" width="100" y="150" x="250" transform="rotate(30,300,175)"
opacity="0.2" stroke-width="5" stroke="darkblue" fill="#5f86B1" id="shape2"/>
</svg>
```

\<viewDocument\>

Causes the viewer to view the target document, while still preserving the current document.

```
<viewDocument
    id="string"
    event="string"
    {target="xpath" | frameID="string" objectID="string" docID="string"}
/>
```

Attributes:
- 'id' allows this action element to be referenced later.
- 'event' specifies the event that triggers this action.
- 'target' is the xpath pointing to the location of the document to be viewed.
- 'frameID' specifies the 'id' attribute of the frame (e.g., an HTML \<frame\> element) in which to find the document to be viewed. If not provided, the current frame is assumed. If 'target' is provided, this attribute is ignored.
- 'objectID' specifies the 'id' attribute of the object (e.g., an HTML \<object\> or \<embed\> element) in which to find the document to be viewed. If not provided, the current object is assumed. If 'target' is provided, this attribute is ignored.
- 'docID' specifies the 'id' attribute of the document (e.g., an SVG or XHTML document) to be viewed. If not provided, the current document is assumed. If 'target' is provided, this attribute is ignored.

What is claimed is:

1. A system for manipulating a document object model, the system comprising:
    a memory for storing instructions;
    a processor for executing the instructions stored in the memory, the executed instructions configuring the processor and memory to provide:
    a viewer for creating, manipulating and displaying a document object model from a received markup file describing a user interface including an instance of at least one behavior element, the viewer including:
    a collection of predefined document object model behavior elements, the collection of predefined behavior elements including the at least one behavior element of the received markup file, each behavior element comprising:
        a namespace for identifying the behavior element;
        an event attribute for associating the behavior element to an event monitored by the viewer; and
        other attributes for describing features of the behavior element; and
    a collection of scripts for performing actions associated with the collection of behavior elements, each script of the collection of scripts being associated with a behavior element of the collection of behavior elements through the event attribute of the behavior element and manipulating the document object model in a predefined manner according to the other attributes of the behavior element when the viewer detects the occurrence of the event associated with the behavior element.

2. The system as claimed in claim 1, wherein the behavior element is associated with an extensible markup language element.

3. The system as claimed in claim 2, wherein the behavior element is a child of the extensible markup language element.

4. The system as claimed in claim 2, wherein the behavior element is a parent of the extensible markup language element.

5. The system as claimed in claim 1, wherein the actions comprise behavioral mutations of an output of extensible markup language elements.

6. The system as claimed in claim 1, further comprising an initialization function for directing the processing of one or more behavior elements in a document object model, the initialization function having instructions for traversing each node in the document object model and for searching and calling functions associated with behavior elements having names following the predetermined naming convention.

7. The system as claimed in claim 6, further comprising:
    a collection of behavior attributes for adding to existing regular extensible markup language elements in a document object model, the behavior attributes following the predetermined naming convention; and
    a collection of scripts for performing actions associated with the collection of behavior attributes, each script associated with a behavior attribute.

8. The system as claimed in claim 7, wherein the initialization function contains instructions for traversing each node in the document object model and for searching and calling functions associated with behavior elements and behavior attributes having names following the predetermined naming convention.

9. The system as claimed in claim 1, wherein the collection of behavior elements comprises a markup language.

10. The system as claimed in claim 1, wherein the markup file describing the user interface is based on Scalar Vector Graphics (SVG) that has been extended to include tags for the behavior elements of the collection of behavior elements.

11. A system for manipulating a document object model, the system comprising:
    a memory for storing instructions;
    a processor for executing the instructions stored in the memory, the executed instructions configuring the processor and memory to provide:
    a viewer for creating, manipulating and displaying a document object model from a received markup file describing a user interface including an instance of at least one behavior element, the viewer including:
    a collection of predefined document object model behavior elements, the collection of predefined behavior elements including the at least one behavior element of the received markup file, each behavior element comprising:
        a namespace for identifying the behavior element;
        an event attribute for associating the behavior element to an event monitored by the viewer; and other attributes for describing features of the behavior element; and a collection of scripts for performing actions associated with the collection of behavior elements, each script of the collection of scripts being associated with a behavior element of the collection of behavior elements through the event attribute of the behavior element and manipulating the document object model in a predefined manner according to the other attributes of the behavior element when the viewer detects the occurrence of the event associated with the behavior element, wherein the collection of behavior elements comprises one or more of:

a dsvg:createElement behavior element for creating a new element and inserting the newly created element in a desired location in the document object model, the dsvg:createElement behavior element comprising:

a namespace;

an event attribute for specifying the event that triggers the behavior element, the event attribute settable to a string;

a collection of other attributes comprising:

an identification attribute for referencing the behavior element;

a new element identification attribute for specifying the value of an identification attribute of the newly created element;

an element name attribute for specifying the name of the element to be created;

an attributes attribute for containing all of the attributes for the newly created element;

a namespace attribute for specifying the namespace of the newly created element;

a target attribute for specifying the xpath pointing to the location at which the new element is to be inserted;

an insert as attribute for specifying whether the new element is to be inserted as a child, parent or sibling of a target element;

an offset attribute for specifying the number of nodes before or after the target element;

a from attribute for specifying whether the offset attribute is relative to first child or last child of the target element;

a preserve target children attribute for specifying whether to copy the children of the target element;

a preserve target events attribute for specifying whether to copy the events of the target element; and a preserve target attributes attribute for specifying the attributes of the target element;

a dsvg:createEvent behavior element for creating an event and dispatching the event to a desired target in the document object model, the dsvg:createEvent behavior element comprising:

a namespace following the predetermined naming convention;

an event attribute for specifying the event that triggers the behavior element, the event attribute settable to a string;

a collection of other attributes comprising:

an identification attribute for referencing the behavior element;

an event name attribute for specifying the type of the event;

a source attribute for specifying the xpath to the element that the target will believe created the event;

a target attribute for specifying the xpath to the element to which the event is dispatched;

an event phase attribute for specifying a phase of event flow that is currently being evaluated;

a bubbles attribute for specifying whether or not the event can bubble;

a cancelable attribute for specifying whether or not the event can have its default actions prevented;

a time stamp attribute for specifying the time at which the event was created;

a stop propagation attribute for preventing further propagation of an event during event flow; and a prevent default attribute for specifying whether or not the event is to be cancelled, so that any default action normally taken by an implementation as a result of the event will not occur;

a dsvg:loadXML behavior element for creating a new element and inserting the newly created element in a desired location in the document object model, the dsvg:loadXML behavior element comprising:

a namespace following the predetermined naming convention;

an event attribute for specifying the event that triggers the behavior element, the event attribute settable to a string;

a collection of other attributes comprising:

an identification attribute for referencing the behavior element;

a source attribute for specifying an xpath to a document or element within a document in an external file;

a target attribute for specifying an xpath pointing to where the document or fragment is to be placed;

an insert as attribute for specifying whether the new fragment is to be inserted as a child, a parent or a sibling of the target element;

an offset attribute for specifying the number of nodes before or after the target element at which to insert the new element;

a from attribute for specifying whether the offset attribute is relative to the first child or last child of the target element;

a preserve target children attribute for specifying whether to copy the children of the target element;

a preserve target events attribute for specifying whether to copy the events of the target element; and a preserve target attributes attribute for specifying the attributes of the target element;

a dsvg:setAttribute behavior element for creating, modifying, replacing or removing an attribute for a target element in the document object model, the dsvg:setAttribute behavior element comprising:

a namespace following the predetermined naming convention;

an event attribute for specifying the event that triggers the behavior element, the event attribute settable to a string;

a collection of other attributes comprising:

an identification attribute for referencing the behavior element;

a target attribute for specifying an xpath pointing to a location of the target element;

a name attribute for specifying the name of the attribute to be set;

a namespace attribute for specifying a namespace of the attribute to be set;

a modify attribute for specifying whether the attribute is to be created, replaced, removed or modified, with new text added to the beginning or the end of existing text;

a delimiter attribute for specifying text that is to separate a previous value from a new value;

a value attribute for specifying a value that the attribute is to be given; and a save previous value attribute for specifying whether to save the previous value of the attribute;

a dsvg:setClass behavior element for modifying contents of a class attribute of a target element in the document object model, the dsvg:setClass behavior element comprising:

a namespace following the predetermined naming convention;

an event attribute for specifying the event that triggers the behavior element, the event attribute settable to a string;

a collection of other attributes comprising:

an identification attribute for referencing the behavior element;

a target element for specifying an xpath pointing to a location of the target element;

an element identification attribute for specifying the identification attribute of the target element;

a css name attribute for specifying the name of a CSS rule to replace, be added to, or be removed from the class attribute of the target element;

a modify attribute for specifying how the CSS rule should modify the class attribute of the target element; and a save previous value attribute for specifying whether to save the previous value of the class attribute of the target element;

a dsvg:setData behavior element for modifying data of a target element in the document object model, the dsvg:setData behavior element comprising:

a namespace following the predetermined naming convention;

an event attribute for specifying the event that triggers the behavior element, the event attribute settable to a string;

a collection of other attributes comprising:

an identification attribute for referencing the behavior element;

a target attribute for specifying an xpath pointing to a location of the target element;

an element identification attribute for specifying the identification attribute of the target element;

a value attribute for specifying the string to replace or add to data of the target element;

a modify attribute for specifying how previous data it to be modified by new data;

an offset attribute for specifying the number of characters from the beginning or end of the data at which to insert new data;

a from attribute for specifying whether the offset attribute is relative to the beginning or end of the data;

a count attribute for specifying the number of consecutive characters after the offset attribute to be replaced by the new data or to have the new data appended after;

a substring attribute for specifying text to search for in the data of the target element;

an occurrence attribute for specifying which occurrence of the substring attribute should be removed, replaced or modified; and a save previous value attribute for specifying whether to save the previous data of the target element;

a dsvg:setStyle behavior element for modifying the contents of a style attribute of a target element and for replacing the contents of a class attribute in a target element in the document object model, the dsvg:setStyle behavior element comprising:

a namespace following the predetermined naming convention;

an event attribute for specifying the event that triggers the behavior element, the event attribute settable to a string;

a collection of other attributes comprising:

an identification attribute for referencing the behavior element;

a target attribute for specifying an xpath pointing to a location of the target element;

a name attribute for specifying the name of the style property to be added, removed or replaced;

a value attribute for specifying the value of the style property to be added, removed or replaced;

a modify attribute for specifying how to modify the style attribute of the target element; and a save previous value attribute for specifying whether to save the previous value of the style attribute of the target element; and a dsvg:setTransform behavior element for modifying a transform attribute of a target element in the document object model, the dsvg:setTransform behavior element comprising:

a namespace following the predetermined naming convention;

an event attribute for specifying the event that triggers the behavior element, the event attribute settable to a string;

a collection of other attributes comprising:

an identification attribute for referencing the behavior element;

a target attribute for specifying an xpath pointing to the location of the target element;

a matrix attribute for specifying a matrix transformation to be applied to the target element;

an absolute attribute for specifying how to apply a new transformation with respect a current transformation of the target element;

an hAlign attribute for specifying how to calculate and apply a translation to the target element;

a vAlign attribute for specifying how to calculate and apply a translation to the target element;

a reference identification attribute for specifying the identification attribute of the target element; and a save previous value attribute for specifying whether to save the previous value of the transform attribute of the target element.

12. A method of manipulating a document object model, the method comprising the steps of:
- receiving at a viewer, and storing in a computer readable memory, a markup file describing a user interface including an instance of at least one behavior element including an event attribute for associating the behavior element to an event monitored by the viewer;
- parsing the markup file to the document object model;
- monitoring for the occurrence of the event specified in the event attribute of the behavior element in the parsed document object model;
- detecting an event which is equal to the event attribute setting in the designated element being monitored; and
- calling a predefined script associated with the predefined behavior element having the event attribute matching the received event, the script performing actions including manipulating the document object model in a predefined manner based on other attributes of the behavior element.

13. The method as claimed in claim 12, wherein the step of calling a script includes the steps of:
- determining if the name of the designated element contains a designated prefix;
- generating a function name comprising of the name of the designated element;
- assigning an object associated with the designated element as the parameter of the function name; and
- assigning predetermined instructions of the designated element as steps for a function having the function name to perform.

14. The method as claimed in claim 12, wherein the step of calling a script includes the steps of:
- dynamically generating a function name associated with the designated element;
- passing an object associated with the designated element as a parameter of the generated function name;
- receiving the attributes of the object; and
- performing a function stored in memory having the generated function name.

15. The method as claimed in claim 12, wherein the markup file describing the user interface is based on Scalar Vector Graphics (SVG) that has been extended to include tags for the behavior elements of the collection of behavior elements.

* * * * *

UNITED STATES PATENT AND TRADEMARK OFFICE
CERTIFICATE OF CORRECTION

PATENT NO. : 7,669,183 B2 Page 1 of 1
APPLICATION NO. : 10/678846
DATED : February 23, 2010
INVENTOR(S) : Bowman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1293 days.

Signed and Sealed this

Seventh Day of December, 2010

David J. Kappos
*Director of the United States Patent and Trademark Office*